(12) United States Patent
Kubota et al.

(10) Patent No.: US 6,249,720 B1
(45) Date of Patent: Jun. 19, 2001

(54) DEVICE MOUNTED IN VEHICLE

(75) Inventors: Tomoki Kubota; Koji Hori, both of Tokyo-to; Manabu Mazda, Chiba-ken; Kazuhide Adachi; Kouji Mukai, both of Tokyo-to, all of (JP)

(73) Assignee: KabushikiKaisha Equos Research (JP)

( * ) Notice: Subject to any disclaimer, the term of this patent is extended or adjusted under 35 U.S.C. 154(b) by 0 days.

(21) Appl. No.: 09/119,238

(22) Filed: Jul. 21, 1998

(30) Foreign Application Priority Data

| Jul. 22, 1997 | (JP) | 9-212491 |
| Feb. 27, 1998 | (JP) | 10-064414 |
| Mar. 12, 1998 | (JP) | 10-082626 |
| Mar. 13, 1998 | (JP) | 10-082710 |
| Mar. 23, 1998 | (JP) | 10-095386 |
| Mar. 23, 1998 | (JP) | 10-095387 |

(51) Int. Cl.[7] .................................................. G06F 17/00
(52) U.S. Cl. .......................... 701/1; 701/200; 340/990; 340/995
(58) Field of Search .............................. 701/1, 200, 201, 701/202, 211, 96; 340/988, 990, 995

(56) References Cited

U.S. PATENT DOCUMENTS

| 5,343,399 | * | 8/1994 | Yokoyama et al. | ................... 701/211 |
| 5,555,502 | | 9/1996 | Opel | ................................. 364/424.05 |
| 5,935,193 | * | 8/1999 | saiki | ..................................... 701/211 |

OTHER PUBLICATIONS

Patent Abstracts Of Japan vol. 1997, No. 08, Aug. 29, 1997.

Patent Abstracts Of Japan vol. 015, No. 499 (P–1289) Dec. 17, 1991.

Patent Abstracts of Japan, Pub. No. 09102098, Date–Apr. 15, 1997, Information Display Device for Vehicle.

* cited by examiner

*Primary Examiner*—William A. Cuchlinski, Jr.
*Assistant Examiner*—Yonel Beaulieu
(74) *Attorney, Agent, or Firm*—Lorusso & Loud

(57) ABSTRACT

A device is mounted in a vehicle which allows one or more of personified agent or imaginary living body to appear before a driver or passengers in the vehicle for communication therewith. A current status sensor (40) detects predetermined vehicle current status data, and a memory (292, 293) stores study data in response to entry of the latest current status data. One of a plurality of communication programs stored in a program table (291) may be selected in accordance with the current status data and/or the study data. An agent control unit (11) controls activity of the agent in accordance with the selected communication program. The determined agent activity is outputted through a display (27) and a speaker (25) for communication with the driver.

40 Claims, 52 Drawing Sheets

FIG. 2

PROGRAM SELECT TABLE 291

| Program No. | Time 4~12h | Time 12~19h | Time 9~24h | Number of Today's IG-ON 1st | Number of Today's IG-ON 2nd≤ | Time Passage from Last Operation ≥5 min | Time Passage from Last Operation 5min–1week | Time Passage from Last Operation 1week≤ | Total Number of IG-ON ≥30 times | Total Number of IG-ON 31–300 times | Total Number of IG-ON 301 times | IG-ON Place Rest Position | IG-ON Place Home | IG-ON Place Other | Coolant Temp. Low | Coolant Temp. Warm |
|---|---|---|---|---|---|---|---|---|---|---|---|---|---|---|---|---|
| 00001 | — | — | — | O |   |   | — | — | O |   |   |   | — | — | — | — |
| 00002 | — | — | — |   | O |   | O |   | O |   |   |   | O |   | — | — |
| 00003 | — | — | — | — | — |   | — | — | O |   |   | O |   |   | — | — |
| 00004 | — | — | — |   | O |   | O |   | O |   |   |   |   | O | — | — |
| 00005 | — | — | — | — | — | O |   |   | O |   |   |   | — | — | — | — |
| 00006 | — | — | — | — | — | O |   |   | O |   |   | O |   |   | — | — |
| 00007 | O |   |   | O |   |   | O |   |   | O |   |   | — | — | — | O |
|   |   | O |   | O |   |   | O |   |   | O |   |   | — | — | — | O |
|   |   |   | O | O |   |   | O |   |   | O |   |   | — | — | — | O |
|   | O |   |   |   | O |   | O |   |   | O |   |   | O |   |   | O |
|   |   | O |   |   | O |   | O |   |   | O |   |   | O |   |   | O |
|   |   |   | O |   | O |   | O |   |   | O |   |   | O |   |   | O |
|   | — | — | — | — | — |   | O |   |   | O |   |   | O |   | — | — |
|   | — | — | — |   | O |   | O |   |   | O |   |   |   | O |   | O |
|   | O |   |   | O |   |   |   | O |   | O |   |   | — | — | — | O |
|   |   | O |   | O |   |   |   | O |   | O |   |   |   |   |   | O |
|   |   |   | O | O |   |   |   | O |   | O |   |   | — | — | — | O |
|   | — | — | — | — | — | O |   |   |   | O |   |   | — | — | — | — |
|   | — | — | — | — | — | O |   |   |   | O |   |   | O |   | — | — |
| 00020 | O |   |   | O |   |   | O |   |   | O |   |   |   |   | O |   |
|   |   | O |   | O |   |   | O |   |   | O |   |   | — | — | O |   |
|   |   |   | O | O |   |   | O |   |   | O |   |   | — | — | O |   |
|   | O |   |   |   | O |   | O |   |   | O |   |   | O |   | O |   |
|   |   | O |   |   | O |   | O |   |   | O |   |   | O |   | O |   |
|   |   |   | O |   | O |   | O |   |   | O |   |   | O |   | O |   |
|   | — | — | — |   | O |   | O |   |   | O |   |   |   | O | O |   |
|   | O |   |   | O |   |   |   | O |   | O |   |   | — | — | O |   |
|   |   | O |   | O |   |   |   | O |   | O |   |   | — | — | O |   |
|   |   |   | O | O |   |   |   | O |   | O |   |   | — | — | O |   |
|   | O |   |   | O |   |   | O |   |   |   | O |   | — | — |   | O |
|   |   | O |   | O |   |   | O |   |   |   | O |   | — | — |   | O |
|   |   |   | O | O |   |   | O |   |   |   | O |   | — | — |   | O |
|   | — | — | — |   | O |   | O |   |   |   | O |   | O |   |   | O |
|   | — | — | — | — | — |   | O |   |   |   | O |   | O |   | — | — |
|   | — | — | — |   | O |   | O |   |   |   | O |   |   | O |   | O |
|   | O |   |   | O |   |   |   | O |   |   | O |   | — | — |   | O |
|   |   | O |   | O |   |   |   | O |   |   | O |   | — | — |   | O |
|   |   |   | O | O |   |   |   | O |   |   | O |   | — | — |   | O |
|   | — | — | — | — | — | O |   |   |   |   | O |   | — | — | — | — |
|   | — | — | — | — | — | O |   |   |   |   | O |   | O |   | — | — |
|   | O |   |   | O |   |   | O |   |   |   |   | O | — | — |   | O |
|   |   | O |   | O |   |   | O |   |   |   |   | O | — | — |   | O |
|   |   |   | O | O |   |   | O |   |   |   |   | O | — | — |   | O |
|   | — | — | — |   | O |   | O |   |   |   |   | O | O |   |   | O |
|   | — | — | — |   | O |   | O |   |   |   |   | O |   | O |   | O |
|   | O |   |   | O |   |   |   | O |   |   |   | O | — | — |   | O |
|   |   | O |   | O |   |   |   | O |   |   |   | O | — | — |   | O |
|   |   |   | O | O |   |   |   | O |   |   |   | O | — | — |   | O |

FIG. 3

| Program No. | Agent's Activities | |
|---|---|---|
| | Action | Utterance |
| 00001 | Obeisance | "Nice to meet you. I'm Lisa. May I go with you ?" |
| 00002 | Obeisance | "Nice to meet you. I'm Lisa. May I go with you ?" |
| 00003 | Obeisance | "Hello, I'm Lisa. I will go with you again. Did you sleep well last night ?" |
| 00004 | Obeisance | "Hello, I'm Lisa. I will go with you again." |
| 00005 | Obeisance | "What happens with you ?" |
| 00006 | Obeisance | "Did you have a good rest ?" |
| 00007 | Bow | "Good morning, I'm Lisa. May I go with you ?" |
| • | Bow | "Good afternoon, I'm Lisa. May I go with you ?" |
| • | Bow | "Good evening, I'm Lisa. May I go with you ?" |
| • | Bow | "Good morning, I'm Lisa. May I go with you ?" |
| | Bow | "Good afternoon, I'm Lisa. May I go with you ?" |
| | Bow | "Good evening, I'm Lisa. May I go with you ?" |
| | Bow | "Hello, I'm Lisa. I will go with you again. Did you sleep well last night ?" |
| | Bow | "Hello, I'm Lisa. I will go with you again. Rest yourself." |
| | Bow | "Good morning, I'm Lisa. It's been a long time. May I go with you ?" |
| | Bow | "Good afternoon, I'm Lisa. It's been a long time. May I go with you ?" |
| • | Bow | "Good evening, I'm Lisa. It's been a long time. May I go with you ?" |
| • | Bow | "What happens with you ?" |
| • | Bow | "Did you have a good rest ?" |
| 00020 | Sleepy Bow | "Good morning, I'm Lisa. May I go with you ?" |
| • | Sleepy Bow | "Good afternoon, I'm Lisa. May I go with you ?" |
| • | Sleepy Bow | "Good evening, I'm Lisa. May I go with you ?" |
| • | Sleepy Bow | "Good morning, I'm Lisa. May I go with you ?" |
| | Sleepy Bow | "Good afternoon, I'm Lisa. May I go with you ?" |
| | Sleepy Bow | "Good evening, I'm Lisa. May I go with you ?" |
| | Sleepy Bow | "Hello, I'm Lisa. I will go with you again. Rest yourself." |
| | Sleepy Bow | "Good morning, I'm Lisa. It's been a long time. May I go with you ?" |
| | Sleepy Bow | "Good afternoon, I'm Lisa. It's been a long time. May I go with you ?" |
| | Sleepy Bow | "Good evening, I'm Lisa. It's been a long time. May I go with you ?" |
| | Cheerful | "Good morning ! Go with me cheerfully." |
| | Cheerful | "Good afternoon ! Go with me cheerfully." |
| | Cheerful | "Good evening ! Go with me cheerfully." |
| | Cheerful | "Hi !. Go with me cheerfully." |
| | Cheerful | "Hi !. Go with me cheerfully. Did you have a good rest ?" |
| | Cheerful | "Rest yourself. Go with me again cheerfully." |
| | Cheerful | "Good morning ! It's been a long time. Go with me again cheerfully." |
| | Cheerful | "Good afternoon ! It's been a long time. Go with me again cheerfully." |
| | Cheerful | "Good evening ! It's been a long time. Go with me again cheerfully." |
| | Doubtful | "What happens with you ?" |
| | Doubtful | "Are you alright ?" |
| | Sleepy | "Good morning ! Go with me cheerfully." |
| | Sleepy | "Good afternoon ! Go with me cheerfully." |
| | Sleepy | "Good evening ! Go with me cheerfully." |
| | Sleepy | "Hi !. Go with me cheerfully." |
| | Sleepy | "Rest yourself. Go with me again cheerfully." |
| | Sleepy | "Good morning ! It's been a long time. Go with me again cheerfully." |
| | Sleepy | "Good afternoon ! It's been a long time. Go with me again cheerfully." |
| | Sleepy | "Good evening ! It's been a long time. Go with me again cheerfully." |

FIG. 5

STUDY ITEM DATA 292

| Total Number of IG-ON | ... | | | | | | | |
|---|---|---|---|---|---|---|---|---|
| Last IG-OFF | Date : | Time : | | | | | | |
| Number of Today's IG-ON | | Times | Time : | 1 | | | | |
| ... | | | | | | | | |
| Fuel Remainder Record | | | 1 | 1 | 1 | | | |
| Skip Records | Program No. | 00123 | | | | Times | ... | |
| | | 00125 | | | | Times | | |
| | | ... | | | | | | |
| Default Values | | | | | | | | |

RESPONSE DATA 293

| Program No. | Contents | | | |
|---|---|---|---|---|
| ... | ... | | | |
| 00123 | 1997.07.11 11:20 C | 1997.07.12 13:10 C | | |
| 00124 | C | | | |
| 00125 | 1996.01.25 10:05 A | 1997.04.22 18:05 C | | |
| ... | ... | | | |

*FIG. 6A*

| Pattern | Symbol |
|---|---|
| Neglect | A |
| Refusal | B |
| Acceptance | C |

*FIG. 6B*

| Current Status | |
|---|---|
| IG | On |
| Place | Others |
| ... | ... |

+

| Study Item / Response Data | |
|---|---|
| Number of Today's IG-ON | 2nd |
| Last Operation Over | 1997.7.12 10:05 |
| Total Number of IG-ON | 30 times |
| ... | ... |

*FIG. 10A*

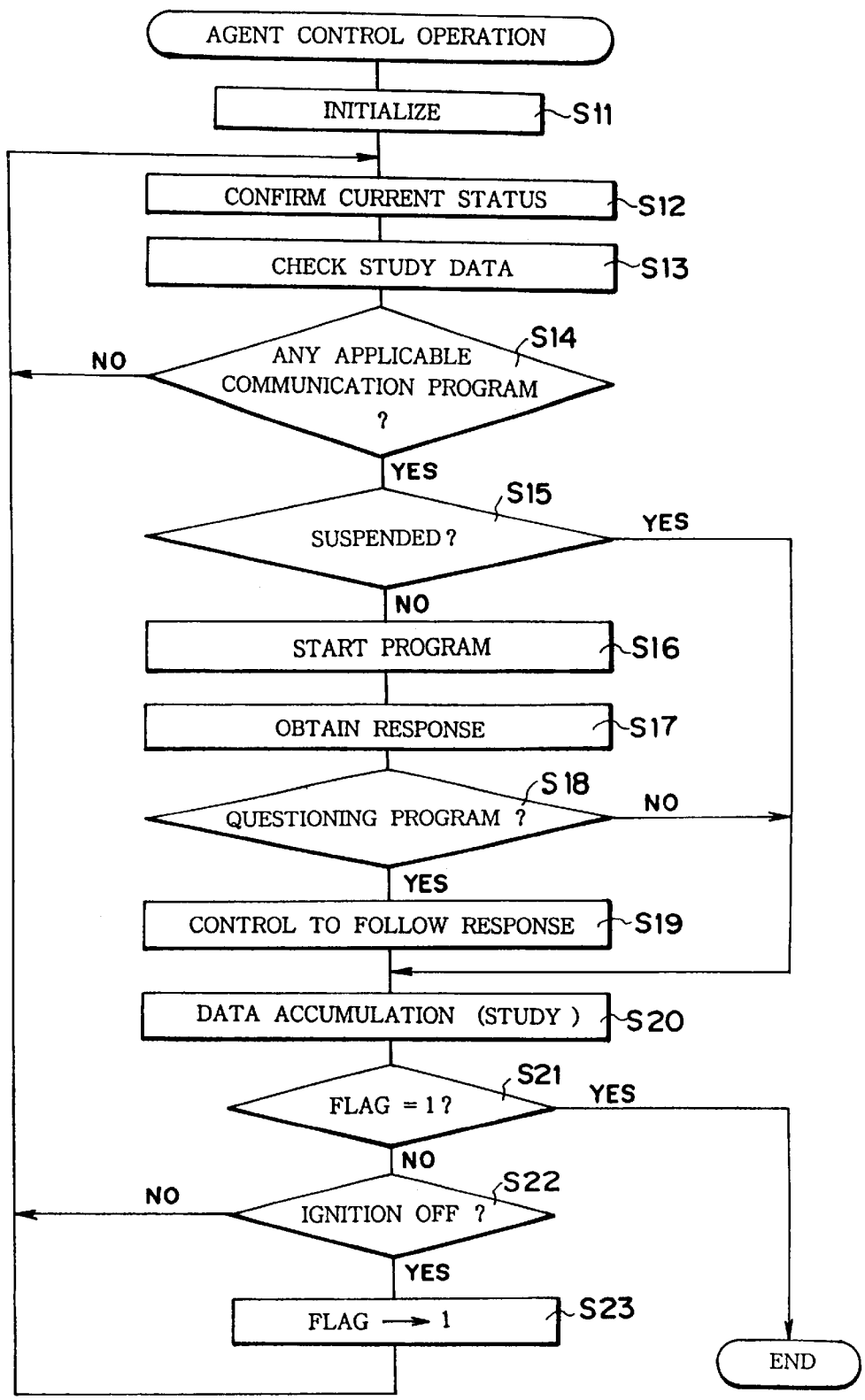

FIG. 10B
Program No.; 00004
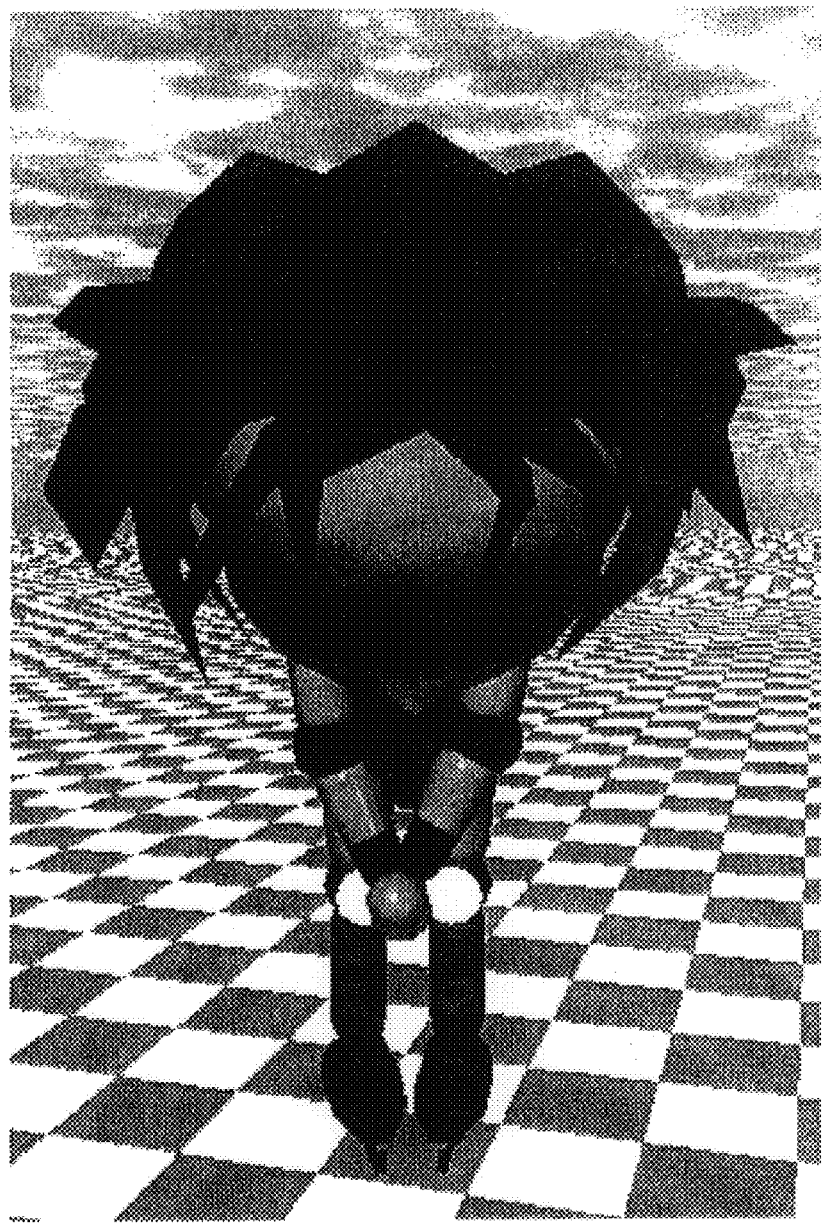
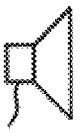

FIG. 10C

| Results of Study | |
|---|---|
| Numbers of Today's IG-ON | 2nd → 3rd |
| Total Number of IG-ON | 30 Times → 31 Times |

FIG. 11A

| Current Status | |
|---|---|
| Air-Conditioner | On |
| T1-T2 ≦ T3 | Yes |
| T2 ≦ T4 | Yes |
| ⋮ | ⋮ |

+

| Study Item / Response Data | |
|---|---|
| Response Records | C(T3=2, T4=24) |
| ⋮ | ⋮ |

FIG. 11C

| | Response Pattern | | |
|---|---|---|---|
| Results of Study | A : Neglect | B : Refusal | C : Acceptance |
| | T3=T3-1 | T3=T3-1 | T3=T3 |
| | T4=T4-1 | T4=T4-1 | T2=T2 |
| | 1 Time Suspended | 5 Times Suspended | |

FIG. 11B
Program No.; 00123
"It becomes cool. I may suggest introducing the open air."

FIG. 13

AGENT'S CHARACTER SELECT TABLE 296

| | | No. | ... | 10 | 11 | 12 | 13 | ... | 23 | 24 | 25 | 26 | ... | 41 | 42 | 43 | 44 | 45 | 46 | ... |
|---|---|---|---|---|---|---|---|---|---|---|---|---|---|---|---|---|---|---|---|---|
| VEHICLE CONDITION | TYPE | High-Grade | | | | | | | | | | | | O | O | | | | | |
| | | Sport Speciality | | | | | | | O | O | O | O | | | | | | O | | |
| | | RV | | | | | | | O | O | | | | | | | | O | | |
| | | Compact Sedan | | | | | | | O | O | | | | | | | | O | | |
| | | Small Car | | | | | | | O | O | | | | | | | | O | | |
| | | Taxi&Truck | | | | | | | | | | | | O | O | | | | | |
| | IG-ON | ≥30 | | O | | | | | | | | | | | | | | | | |
| | | 31-300 Times | | | | | | | | | | | | | | | | | | |
| | | 301 Times ≤ | | | | O | | | | | | | | | | | | | | |
| | o | o | | | | | | | | | | | | | | | | | | |
| | o | o | | | | | | | | | | | | | | | | | | |
| | o | o | | | | | | | | | | | | | | | | | | |
| USER'S DATA | AGE | 10-19 | | | | | | | | | O | O | | | | | | O | | |
| | | 20-29 | | | | | | | | | O | O | | | | | | O | | |
| | | 30-39 | | | | | | | | | | | | | | | | O | | |
| | | 40-49 | | | | | | | | | | | | | | | | | | |
| | | 50-59 | | | | | | | | | | | | | O | O | | | | |
| | | 60 ≤ | | | | | | | | | | | | | O | O | | | | |
| | SEX | MALE | | | | | | | | | | | | O | O | | | O | O | |
| | | FEMALE | | | | | | | | | | | | | | O | O | | | |
| | HOBBY | GOLF | | | | | | | | | | | | | | | | | | |
| | | BASEBALL | | | | | | | | | | | | | | | | | | |
| | | SOCCER | | | | | | | | | | | | | | | | | | |
| | | DRIVE | | | | | | | | | O | | | | | | | | | |
| | | UNKNOWN | | | | | | | | O | | | | | | | | | | |
| | CHARACTER | SHOWY | | | | | | | | | | O | | | | | | | O | |
| | | PLACID | | | | | | | | | | | | | | | | | | |
| | | RUDE | | | O | | | | | | | | | | | | | | | |
| | | UNKNOWN | | | | | | | | O | | | | | | | | | | |
| | | o | | | | | | | | | | | | | | | | | | |
| | | o | | | | | | | | | | | | | | | | | | |
| WEATHER | | FINE | | | | | | | | | | | | | | | | | | |
| | | CLOUDY | | | | | | | | | | | | | | | | | | |
| | | RAIN | | | | | | | | | | O | | | | | | | | |
| | | SNOW | | | | | | | | | | | | | | | | | | |
| TIME | | MORNING | | | | | | | | | | | | | | | | | | |
| | | DAYTIME | | | | | | | | | | | | | | | | | | |
| | | EVENING | | | | | O | | | | | | | | | | | | | |
| | | MIDNIGHT | | | | | O | | | | | | | | | | | | | |
| AGENT'S CHARACTER | | | ... | OBLIGING | MODERATE | ... | CRYBABY | STRONG SENSE OF JUSTICE | ... | BEAUTIFUL SECRETARY | COMPETENT MANAGER | HIGHSCHOOL GIRL | ... |

FIG. 14

VOICE PATTERN SELECT TABLE 297

| | No. | 5 | 15 | 16 | 17 | 18 | 19 | 20 | 34 | 38 | 40 | 56 | 57 | 58 | 59 |
|---|---|---|---|---|---|---|---|---|---|---|---|---|---|---|---|
| COMMUNI-CATION TYPE | A : ROUTE GUIDANCE | | O | | | | | | | | | | | | |
| | B : WARNING MESSAGE | | | | O | | | | | | O | | | | |
| | C : EXPLANATION | | | O | | | | | O | | | O | | | |
| | D : GREETINGS | | | | | O | | | | | | | | | |
| | E : CALL-BACK | | | | | | O | | | | | | | | |
| | F : CONVERSATION | | | | | | | O | | | | | | | |
| VEHICLE CONDITION | HIGH SPEED DRIVE | | | | | | | | | | | | | | |
| | OUT OF ROUTE | | | | | | | | | | O | | | | |
| | NOISY | O | | | | | | | | | | | | | |
| | IG-NO 1-30 | | | | | | | | O | | | | | | |
| | IG-NO 31-300 Times | | | | | | | | | | | | | | |
| | IG-NO 301 Times ≤ | | | | | | | | | | | | | | |
| AGENT'S CHARACTER | OBLIGING | | | | | | | | O | | | | | | |
| | MODERATE | | | | | | | | | | | | | | |
| | CRYBABY | | | | | | | | | O | | | | | |
| | STRONG SENSE OF JUSTICE | | | | | | | | | | | O | | | |
| | BEAUTIFUL SECRETARY | | O | O | O | O | O | O | | | | | | | |
| | COMPETENT MANAGER | | | | | | | | | | | | | | |
| | HIGH SCHOOL GIRL | | | | | | | | | | | O | O | O | O |
| USER'S FAVORITE | YOUNG LADY | | O | O | O | O | O | O | | | | O | O | O | O |
| | PLACID LADY | | O | O | O | O | O | O | | | | | | | |
| | SHOWY LADY | | | | | | | | | | | | | | |
| EXTERNAL FACTORS | WEATHER FINE | | | | | | | | | | | | O | | |
| | WEATHER CLOUDY | | | | | | | | | | | | | | |
| | WEATHER RAIN | | | | | | | | | | | | | | O |
| | WEATHER SNOW | | | | | | | | | | | | | | |
| | IN TRAFFIC JAM | | | | | | | | | | | | O | | |
| TIME | MORNING | | | | | | | | | | | | | | |
| | DAYTIME | | | | | | | | | | | | | | |
| | EVENING | | | | | | | | | | | | | | |
| | MIDNIGHT | | | | | | | | | | | | | | |
| VOICE OUTPUT PATTERN | | LOUD | PLACID | COOL | RESPECTFUL | TENDER | KIND | TREMBLING | ANGRY | RELUCTANT | CHEERFUL | | | | OUT OF HUMOR |

FIG. 19A

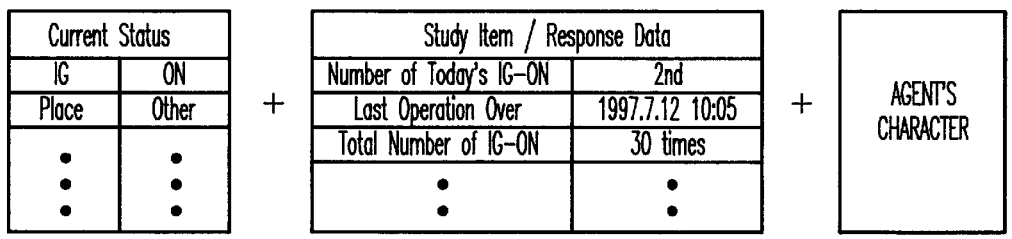

FIG. 19C

| Results of Study | |
|---|---|
| Number of Today's IG-ON | 2nd → 3rd |
| Total Number of IG-ON | 30 Times → 31 Times |

FIG. 20A

PROGRAM SELECT TABLE 291b

| Program No. | .... | ACCL ON | SIDE BRAKE ON | SHIFT LEVER POSITION OTHER THAN "P"&"N" | AGENT'S CHARACTER ||||| .... |
|---|---|---|---|---|---|---|---|---|---|---|
| | | | | | OBLIGING | PLACID | CRYBABY | BEAUTIFUL SECRETARY | HIGH SCHOOL GIRL | |
| 02000 | .... | O | O | O | O | | | | O | |
| 02001 | .... | O | O | O | | | | | O | |
| 02002 | .... | O | O | O | | | O | | | |
| 02003 | .... | O | O | O | | O | | | | |

FIG. 20B

| Program No. | AGENT'S ACTIVITY ||
|---|---|---|
| | ACTION | UTTERANCE |
| 02000 | Right hand is pulled back. | "The side brake is still in operation. Release it, please." |
| 02001 | Right hand is pulled back. | "Oh, no! The side brake is still working. Release it, please." |
| 02002 | Right hand is pulled back with tearful face. | "Ouch! The side brake is still working. Release it, please." |
| 02003 | Right hand is pulled back. | "May I suggest you releasing the side brake." |

FIG. 19B
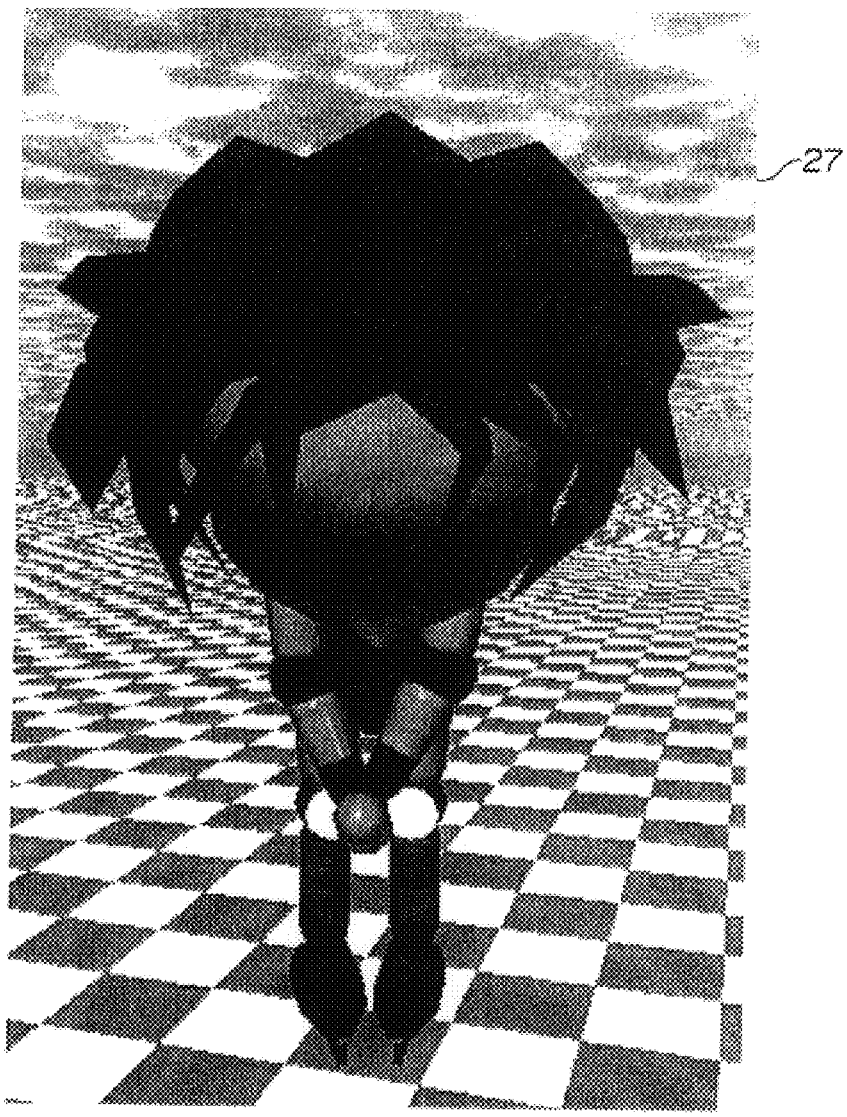
Program No.; 00004
CHARACTER : BEAUTIFUL SECRETARY
 "Hello, I'm Lisa. I will go with you again."
25  Program No.; ooo××
CHARACTER : HIGH SCHOOL GIRL
25
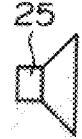 "Hi, I'm Lisa. Let's go with me."

FIG. 22

Familiarity Data 300

| Program No. | | | | | | |
|---|---|---|---|---|---|---|
| Flag | | | | | | |
| Last Five Time Response Period | | sec. | sec. | sec. | sec. | sec. |
| Average Response Period | | | | | | |
| Shortest Response Period | | | | | | |
| Number of Response Cancellation | | | | | | |
| Familiarity Level | | | | | | |

FIG. 24

HELP-AGENT PROGRAM TABLE 302

| AGENT PROGRAM No. | FAMILIARITY | HELP-AGENT PROGRAM No. |
|---|---|---|
| 00123 | 50 | 50010 |
| 00130 | 50 | 50011 |
| 00131 | 70 | 50012 |
| . . . | . . . | . . . |

FIG. 25

| HELP-AGENT PROGRAM No. | HELP-AGENT'S ACTIVITY | |
| --- | --- | --- |
| | ACTION | UTTERANCE |
| 50010 | Point at Agent | "Lisa stops the air-conditioner and opens the front windows half." |
| 50011 | Fold Arms | "You are asked again in ten minutes in the absence of your answer." |
| 50012 | Stand Upright | "Please answer through voice or button operation." |

FIG. 27A

| Current Status | | | + | Study Item / Response Data | | + | FAMILIARITY DATA | |
| --- | --- | --- | --- | --- | --- | --- | --- | --- |
| Air-Conditioner | On | Yes | | Response Records | $C(T3=2, T4=24)$ | | PROGRAM No. | FAMILIARITY |
| $T1 \sim T2 \leq T3$ | Yes | | | | ... | | 00123 | 25 |
| $T2 \leq T4$ | Yes | | | | | | ... | ... |
| ... | | | | | | | | |

FIG. 27C

| Results of Study | Response Pattern | | |
|---|---|---|---|
| | A: Neglect | B: Refusal | C: Acceptance |
| | T3=T3-1 | T3=T3-1 | T3=T3 |
| | T4=T4-1 | T4=T4-1 | T2=T2 |
| | 1 Time Suspended | 5 Times Suspended | |

FIG. 29

SUB-AGENT PROGRAM TABLE 304

| COMMUNICATION PROGRAM No. | FAMILIARITY | FREQUENT PROGRAM No. | SHORT-CUT AGENT PROGRAM No. |
|---|---|---|---|
| 00550 | 70 | 00580<br>00582<br>00584 | 80010<br>80020<br>80030 |
| 00560 | 60 | 00610<br>00615 | 80100<br>10105 |
| . . | | . . | . . |

FIG. 30

| SHORT-CUT AGENT PROGRAM No | SHORT-CUT AGENT'S ACTIVITY | |
|---|---|---|
| | ACTION | UTTERANCE |
| 80010 | WINK & LONG-SHOT | "You may select the category of the goal." |
| 80020 | ← | "You may input the phone number of the goal." |
| 80030 | ← | "You may input the first letter of the goal." |

FIG. 31

FREQUENT PROGRAM DATA 305

| COMMUNICATION PROGRAM No. | 00550 | | | | |
|---|---|---|---|---|---|
| LAST FIVE PROGRAMS | 00580 | 00580 | 00582 | 00584 | 00580 |
| FREQUENT PROGRAM | 00580 | | | | |

FIG. 39

STUDY ITEM DATA 292f

| Total Number of IG-ON | | | | | | | |
|---|---|---|---|---|---|---|---|
| Last IG-OFF | | Date : | | Time : | | | |
| Number of Today's IG-ON | | | Times | Time : | | | |
| ⋮ | | | ⋮ | | | | |
| Fuel Remainder Record | | | 1 | 1 | 1 | 1 | 1 |
| ⋮ | | | ⋮ | | | | |
| Skip Records | Program No. | ⋮ | ⋮ | | | | |
| | | 00123 | Times | | | | |
| | | 00125 | Times | | | | |
| | | ⋮ | ⋮ | | | | |
| ⋮ | | | ⋮ | | | | |
| Audio Instrument Operation | | Time | | | | | |
| | | Area | | | | | |
| | | Station | | | | | |
| Audio Instrument Type | | | | | | | |
| ⋮ | | | ⋮ | | | | |
| Default Values | | | | | | | |

RESPONSE RECOGNITION DATA 307

| RESULT OF RESPONSE RECOGNITION | AFFIRMATIVE | YES | | | | | | | | | |
| --- | --- | --- | --- | --- | --- | --- | --- | --- | --- | --- | --- |
| | | O.K. | | | | | | | | | |
| | | WELL | | | | | | | | | |
| | | . | | | | | | | | | |
| | NEGATIVE | NO | | | | | | | | | |
| | | You're kidding. | | | | | | | | | |
| | | . | | | | | | | | | |
| DISTRIBUTION | AFFIRMATIVE | YES | % |
| | | O.K. | % |
| | | WELL | % |
| | | . | |
| | NEGATIVE | NO | % |
| | | You're kidding. | % |
| | | . | |
| MOST RECOG-NIZABLE ANSWER | AFFIRMATIVE | YES | |
| | NEGATIVE | NO | |

○ : RECOGNIZED
× : NOT RECOGNIZED

| Current Status | | Study Item / Response Data | | | | | | |
| --- | --- | --- | --- | --- | --- | --- | --- | --- |
| TIME | 17:00 | AUDIO INSTRUMENT OPERATION | TIME | 17-18 | 17 - 18 | 10 - 11 | 17-18 | 16-17 |
| AREA | TOKYO | | AREA | TOKYO | TOKYO | KANAGAWA | CHIBA | TOKYO |
| | | + | STATION | J-WAVE | J-WAVE | — | — | J-WAVE |
| . | . | | AUDIO INSTRUMENT TYPE | RADIO | RADIO | CD | CD | RADIO |
| . | . | | . | | . | | | |

FIG. 44A

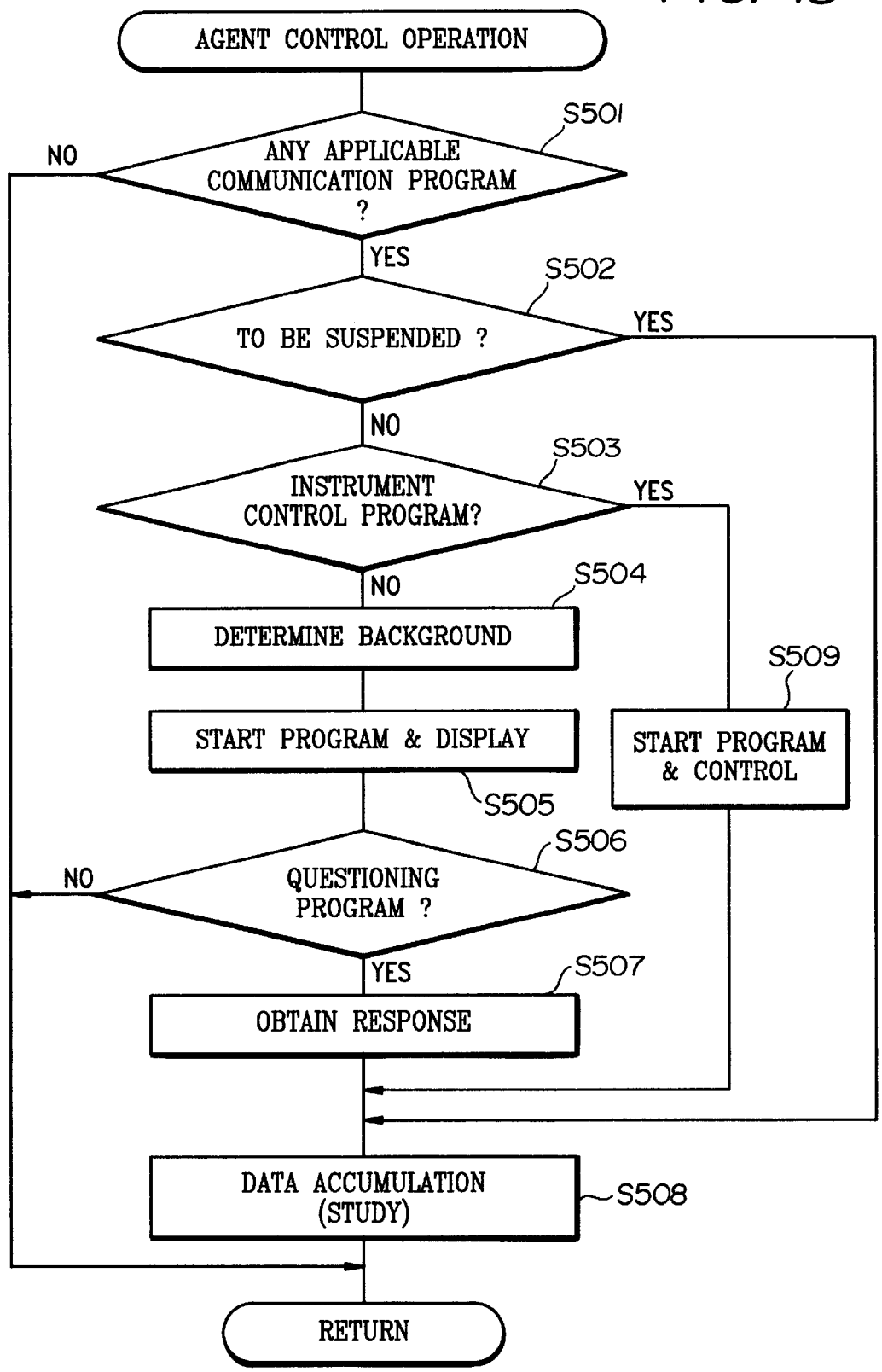

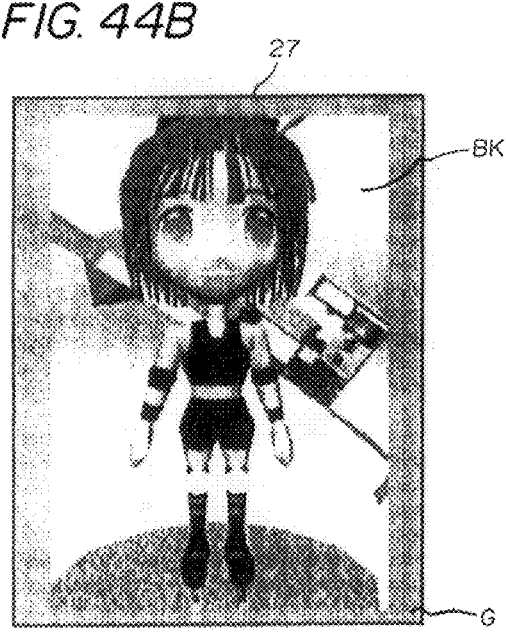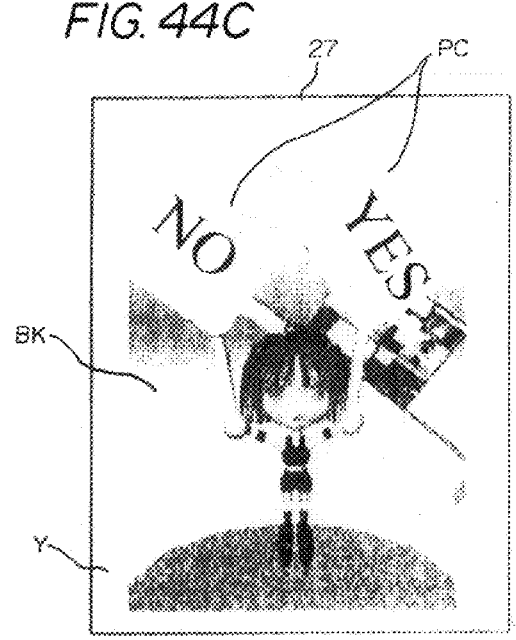
FIG. 44B
FIG. 44C
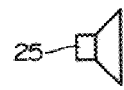 You may listen to the radio program?

FIG. 46

APPEARANCE SELECT TABLE

| | VEHICLE CONDITION | AGENT'S APPEARANCE | ORDER OF PRIORITY |
|---|---|---|---|
| VEHICLE DATA | Vehicle Speed ≥ 80KM/H<br>Vehicle Speed < 80KM/H | Hair is swayed to the wind<br>Hair falls down naturally | 8 |
| | Steering Angle ≥ Predetermined<br>Steering Angle < Predetermined | Inclined<br>Stand upright of fixed | 4 |
| | 3 Times or More Operation of VSC and ABS in 1 Month<br>2 Times or Less Operation of VSC and ABS in 1 Month | Looks annoyed<br><br>Usual appearance or<br>determined by other factor | 12 |
| | Radio Optionally Equipped<br>Radio Not Equipped | Carry a radio in one hand<br>Carry nothing or<br>as determined by the other factor | 7 |
| | Wiper On<br>Wiper Off | Wears raincoat<br>Wears as determined by other factor | 9 |
| | Voice Recognizable<br>Voice Unrecognizable | Full face<br>Face in profile | 2 |
| NAVIGATION DATA | Within 10km to Goal<br>Over 10km to Goal | Beaming Face<br>Usual face or determined by other factor | 13 |
| | Out of the Route<br>On the Route | Sit down<br>Standing upstanding or<br>as or determined by other factor | 3 |
| | Current Position Undetectable<br>Current Position Detectable | Fall down<br>Standing upstanding or<br>as or determined by other factor | 5 |
| ENVIRONMENTAL DATA | Rainfall or Snowfall<br>Fine or Cloudy | Carry Umbrella<br>Carry nothing or<br>as or determined by other factor | 6 |
| | Noise Level ≥ 100dB<br>Noise Level < 100dB | Stop ears with hands<br>Standing upstanding or<br>as or determined by other factor | 1 |
| | Spring of Fall<br>Summer<br>Winter | Wear one-piece dress<br>Wear swimsuit<br>Wear sweater | 11 |
| USER'S DATA | Driver's Familiarity ≥ 20<br>Driver's Familiarity < 20 | Tall<br>Short | 14 |
| DATE & TIME | Christmas Eve or Day<br>Other Day | Dressed as Santa Claus<br>Dressed as determined by other factor | 10 |

FIG. 48A

| CURRENT STATUS | |
|---|---|
| ELAPSED TIME AFTER IG-ON ≥ T0 | YES |
| VEHICLE SPEED | 35km/h |
| VOICE RECOGNITION | POSSIBLE |
| WIPER | OFF |
| SEASON | SUMMER |
| FAMILIARITY | 27 |
| ⋮ | ⋮ |

\+

| STUDY ITEM / RESPONSE DATA | |
|---|---|
| Response Records | C (Default Value T0=120 min.) |
| ⋮ | ⋮ |

FIG. 48C

| Results of Study | Response Pattern | | |
|---|---|---|---|
| | A : Neglect | B : Refusal | C : Acceptance |
| | T0=T0+10 1 Time Suspended | T0=T0+30 5 Time Suspended | T0=T0 |

FIG. 49A

| CURRENT STATUS | |
|---|---|
| ELAPSED TIME AFTER IG-ON ≥ T0 | YES |
| VEHICLE SPEED | 35km/h |
| VOICE RECOGNITION | IMPOSSIBLE |
| WIPER | OFF |
| SEASON | WINTER |
| FAMILIARITY | 18 |
| ⋮ | ⋮ |

\+

| STUDY ITEM / RESPONSE DATA | |
|---|---|
| Response Records | C (Default Value T0=120 min.) |
| ⋮ | ⋮ |

FIG. 48B
Program No. 000123
"Will you have a rest?"

FIG. 49B
Program No. 000123
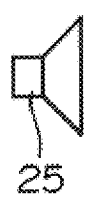
"Will you have a rest?"
25

FIG. 50
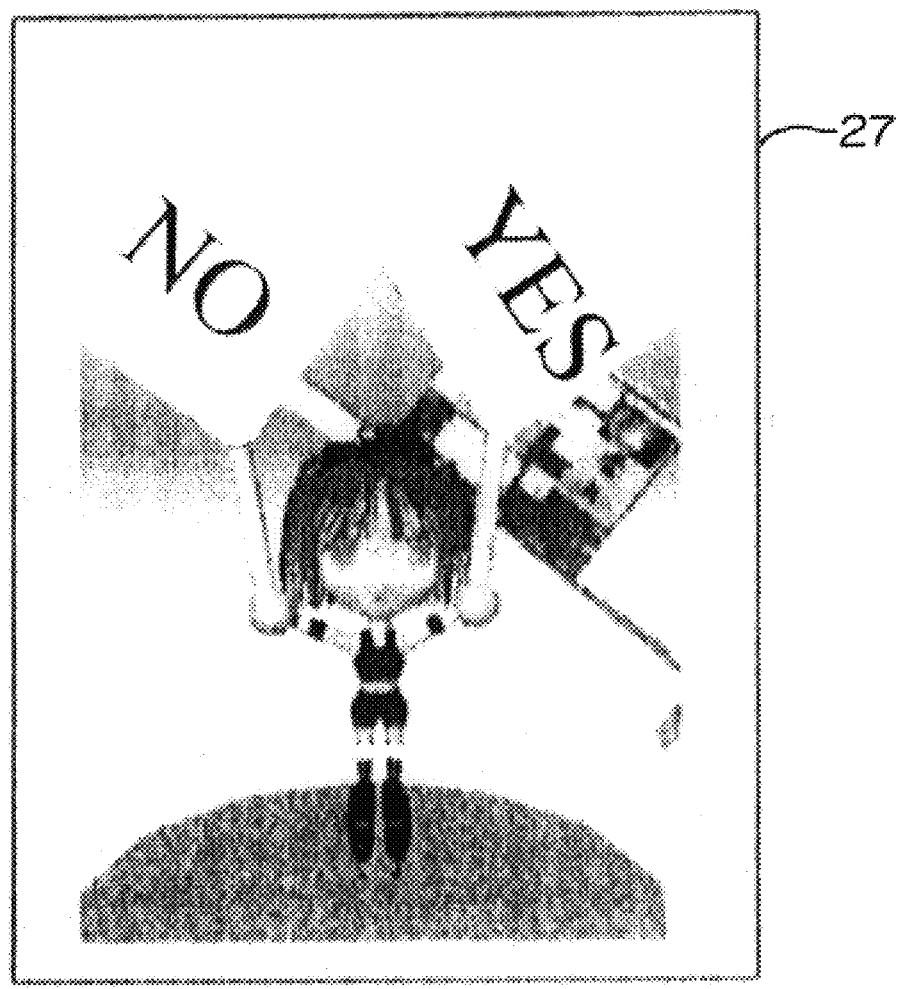
 Please respond by "Yes" or "No".

DEVICE MOUNTED IN VEHICLE

TECHNICAL FIELD

This invention relates to a device mounted in a vehicle, and more particularly to a device for controlling activity of a personified agent on a display in a vehicle room for communication with a user such as a driver.

BACKGROUND OF THE ART

Various audio instruments such as radio, cassette tape player, CD player, MD player, etc. are installed in a vehicle to provide comfort and relaxation to the driver while driving the vehicle. This is only one-way communication.

Bi-directional communication between the driver and his or her friends outside of the vehicle may be achieved by using radio communication medium such as radio transceiver and portable telephone. However, the driver have to find out a companion to talk to by operation of the radio communication medium, which might be dangerous during driving. The companion outside the vehicle can not understand the vehicle and driving condition that the driver meets with.

In Japanese patent laid-open publication No. 9-102098, specific information is transmitted to the driver through corresponding expression and/or activity of an agent appearing on a display. In accordance with this prior art, the same expression and/or activity of the agent is appearing in the same situation. Thus, this provides improved visual literacy but is still a kind of conventional meters.

Accordingly, it is an object of the present invention to provide a novel device mounted in a vehicle that provides bidirectional communication with the user in the vehicle.

Another object of the present invention is to provide bi-directional communication with the user in a vehicle by means of a personified agent whose activities are determined not only by the current vehicle condition but also by the results of past record study.

SUMMARY OF THE INVENTION

To achieve the above object, in accordance with the present invention, a device is mounted in a vehicle which allows one or more of personified agent or imaginary living body to appear before a driver or passengers in the vehicle for communication therewith.

In accordance with an aspect of the present invention, the device comprising first sensor means for detecting predetermined current status; first memory means for storing study data renewable in response to entry of the latest current status detected by the first sensor means; at least one personified agent communicatable with user in the vehicle; second memory means for storing a plurality of communication programs; communication program select means for determining one of the communication programs to be executed in accordance with the current status detected by the first sensor means and/or the study data currently stored in the first memory means; agent control means for controlling activity of the agent in accordance with the selected communication program; agent output means for outputting the agent's activity to the user in the vehicle determined by the agent control means.

In a preferred embodiment, the first sensor means detects at least one vehicle condition selected from the group consisting of a current vehicle position, a current vehicle speed, a current shift position, winker operation, wiper operation, a coolant temperature, an engine oil temperature, an engine oil pressure, a passenger room temperature, an open air temperature, ignition switch operation, a brake pedal stroke, an accelerator pedal stroke, side brake operation, horn operation, belt loosening, a fuel remainder, light or lamp operation, seat belt operation, door opening, window opening, ABS operation, air-conditioner operation, distance to the preceding and succeeding vehicles and decrease of air pressure in tire.

The user's own data may be included in the current status. The user's own data may also be considered in determining the communication program to be executed.

The device of the present invention may further comprises second sensor means for detecting user's response to the agent's activity outputted by the agent output means, and third memory means for storing user's response data detected by the second sensor means. In this embodiment, the user's response data is also considered in determining the communication program to be executed. The user's response data is subjected to study so that the study data in the first memory means is also renewable in response to entry of the latest user's response data.

The agent output means may comprise one or both of display means and speaker means. In a preferred embodiment, utterance pattern of the agent outputted by the speaker means is selectively determined by the agent control means. In another preferred embodiment, appearance pattern of the agent outputted by the display means is selectively determined by the agent control means.

The device may include agent's character select means for determining a specific character to be given to the agent. In this embodiment, the agent control means determines the agent's activity in consideration of the agent's character determined by the agent's character select means.

The device may include fourth memory means for storing data indicating user's familiarity to agent operation of the device. The agent control means determines the agent's activity in consideration of the agent's familiarity stored in the fourth memory means.

In another preferred embodiment, the agent output means allows a plurality of different agents to be distinguishably recognized one another by the user in the vehicle. For example, the device includes fifth memory means for storing sub-agent program, which is selected in correspondence to a specific communication program stored in the second memory means so that a sub-agent of the selected sub-agent program is outputted by the agent output means together with the main agent of the executed communication program. The sub-agent may be a help-agent explaining the activity of the main agent. The sub-agent may be a short-cut agent allowing short-cut of operation executed by the main agent communication program. Preferably, the sub-agent program becomes operative when data indicating user's familiarity to agent operation of the device is greater than a predetermined critical value.

In another preferred embodiment, a background of the display means is selectively determined so that the agent appears on the display means together with the selected background.

BRIEF DESCRIPTION OF DRAWINGS

The above and other objects of the present invention will become apparent from the following description when read in conjunction with the accompanying drawings in which:

FIG. 2 is an example of a program select table;

FIG. 3 is a table describing agent's activities to be outputted when a specific program number is selected in reference to FIG. 2;

FIG. 5 is an example of a study item data in an agent data memory of FIG. 1;

FIGS. 6A and 6B represent an example of response data in the agent data memory;

FIG. 9 is a flowchart of the agent control operation executed in this embodiment;

FIGS. 10A–10C show an example of the agent activity outputted in this embodiment;

FIGS. 11A–11C show another example of the agent activity outputted in this embodiment;

FIG. 13 is an example of an agent character select table in the second embodiment;

FIG. 14 is an example of a voice output pattern select table in the second embodiment;

FIGS. 19A–19C show an example of the agent activities outputted in this embodiment;

FIG. 20A represents a example of a program select table;

FIG. 20B represents the agent's activities to be outputted in the communication program selected by the table of FIG. 20A;

FIG. 22 shows an example of the familiarity data in the agent data of FIG. 21;

FIG. 24 is an example of the help-agent select table in the agent data memory of FIG. 23;

FIG. 25 shows the help-agent activities to be outputted in the corresponding help-agent program number in the table of FIG. 24;

FIGS. 27A–27C illustrate an example of the agent control operation made by the flowchart of FIG. 26;

FIG. 29 is an example of the sub-agent program table in the agent data memory of FIG. 28;

FIG. 30 shows short-cut agent activities to be outputted in the corresponding short-cut agent program number in the table of FIG. 29;

FIG. 31 is an example of the contents of the frequent program data in the agent data memory of FIG. 28;

FIG. 39 shows an example of the study item data in the agent data memory of FIG. 38;

FIG. 40 shows an example of the background select table in the agent data memory of FIG. 38;

FIG. 42 shows an example of the response recognition data in the agent data memory of FIG. 38;

FIG. 43 is a flowchart of the agent control operation to be executed in this embodiment as a sub-routine branched off from the main routine of FIG. 15;

FIGS. 44B and 44C show pictures successively appearing on the display on the conditions of FIG. 44A in this embodiment;

FIG. 46 shows an example of the appearance select table in the agent data memory in FIG. 45;

FIGS. 48A–48C show an example of the agent's appearance and activity appearing on the display in this embodiment;

FIGS. 49A–49B show another example of the agent's appearance and activity in this embodiment; and FIG. 50 show still another example of the agent's appearance and activity in a modified embodiment.

DESCRIPTION OF EMBODIMENTS OF THE INVENTION

The first embodiment of the present invention will be hereinbelow described in more detail in reference to FIGS. 1–11 of the accompanying drawings.

In this embodiment, a personified agent appears on a graphic display in a vehicle. The agent may be represented as a plane image or three-dimensional image by holography, for example. The activity (including utterance) of the agent is controlled in response to the vehicle condition and the result of past record study. The vehicle condition may include various condition of the vehicle itself, the driver, the passenger(s) and preceding and succeeding vehicles. The past record study means study of past record of the vehicle condition and may include reaction of the user (driver) to the agent's activity appearing on the display. Thus, the driver may communicates with the agent in the vehicle, even while driving.

The "agent" used herein is defined as an imaginary personified subject who can make judgement and study like a human body. Accordingly, the same agent makes different communication with the driver on the different vehicle condition. Even on the same vehicle condition, the past record study may result in different communication by the agent. The agent is not a superhuman and may sometime make mis-judgement and blunder as far as it does not affect the vehicle driving. Such mis-judgement and blunder made by the agent may be corrected in accordance with the driver's reaction, which is a kind of the past record study.

The agent represented on a display may be like a human body. It may also be like an animal such as a chick, dog, cat, frog, rat, etc. It may also be a robot or any character. The agent may be a child at the beginning and is grown with time. The appearance and voice of the agent may be selected from predetermined plural ones.

Figure 1:
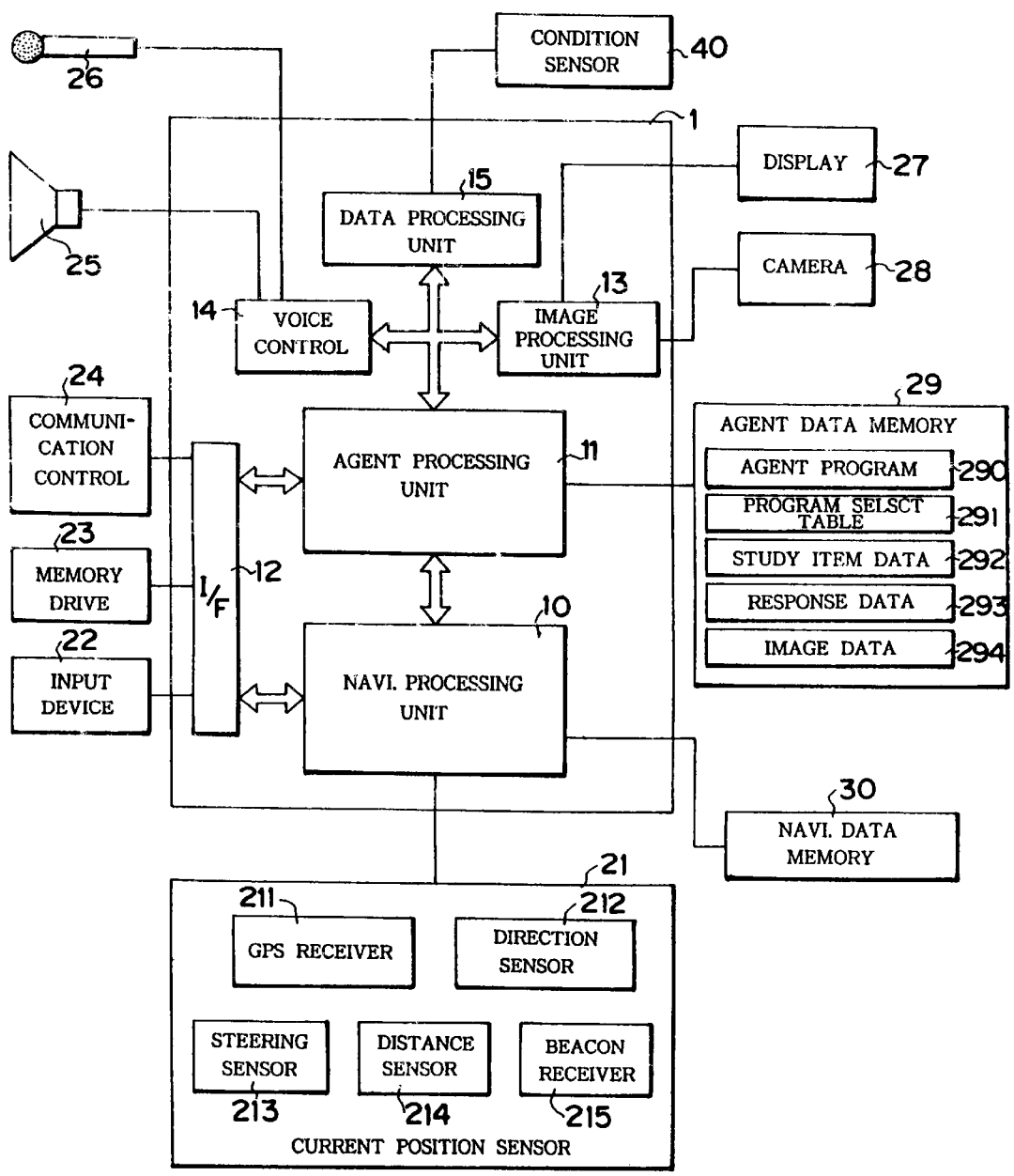
FIG. 1 is a block diagram showing an agent system in accordance with a first embodiment of the present invention.
Figure 4A:
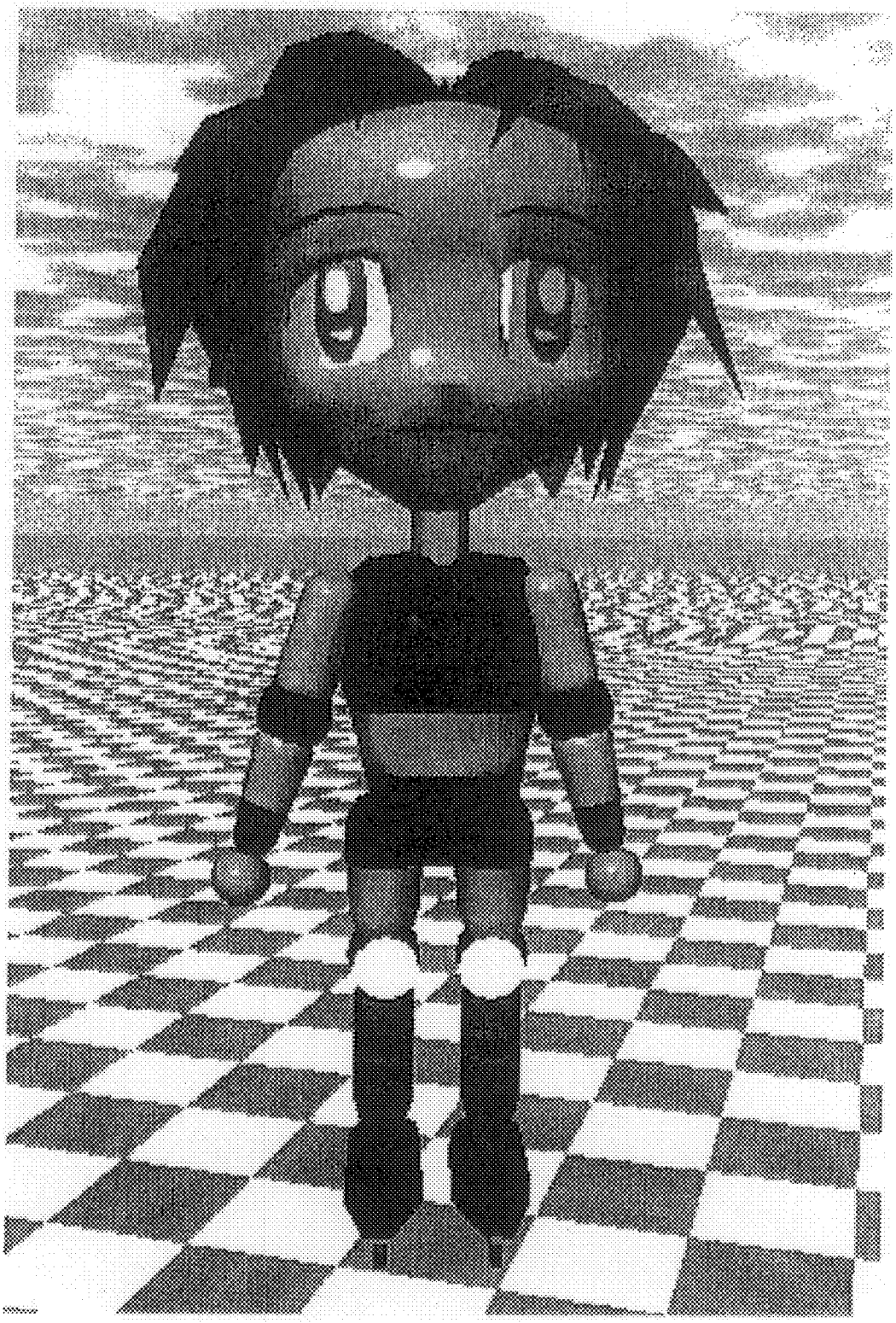
FIGS. 4A–4D represent a series of an agent's activity shown on a display by way of example.
Figure 4B:
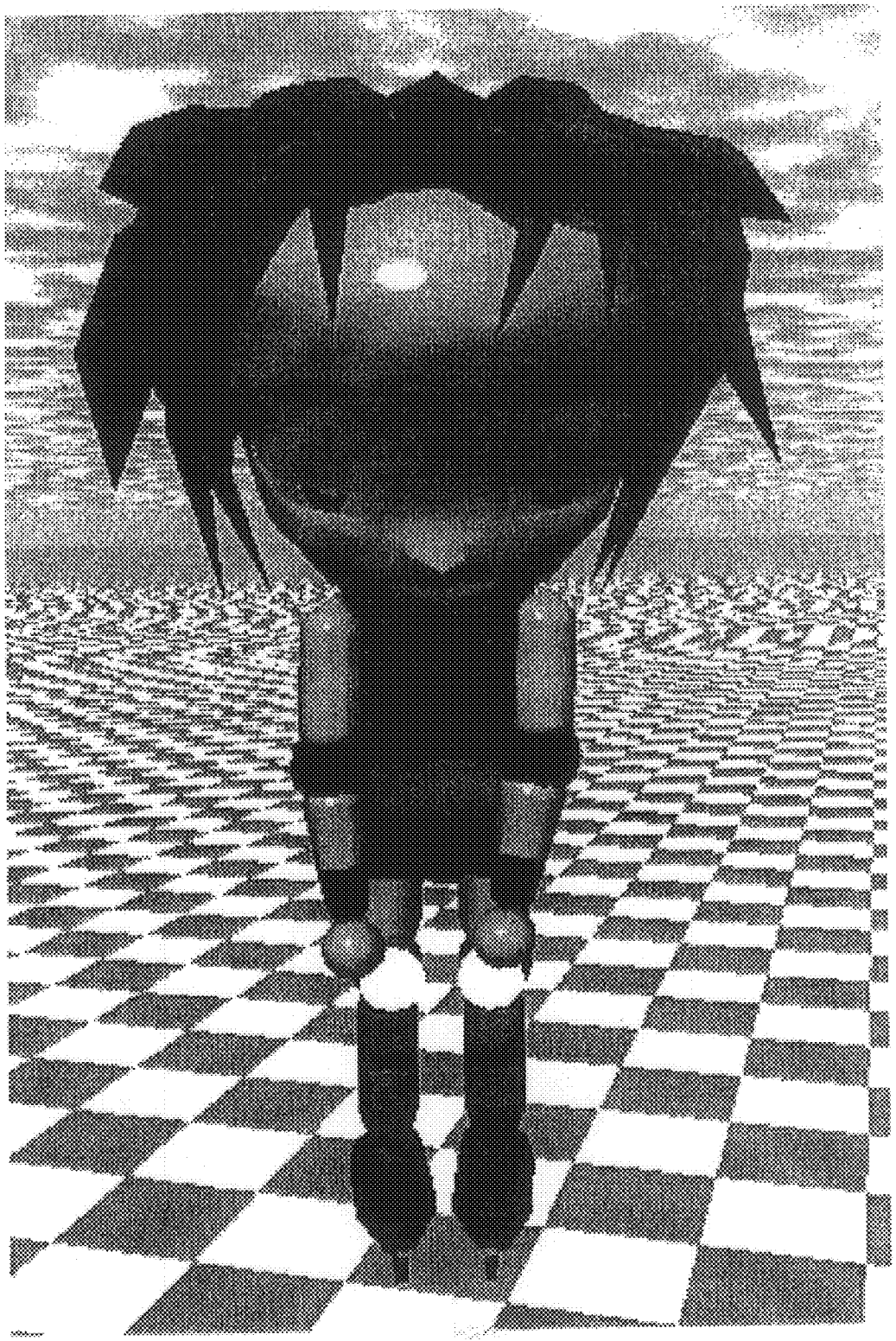
Figure 4C:
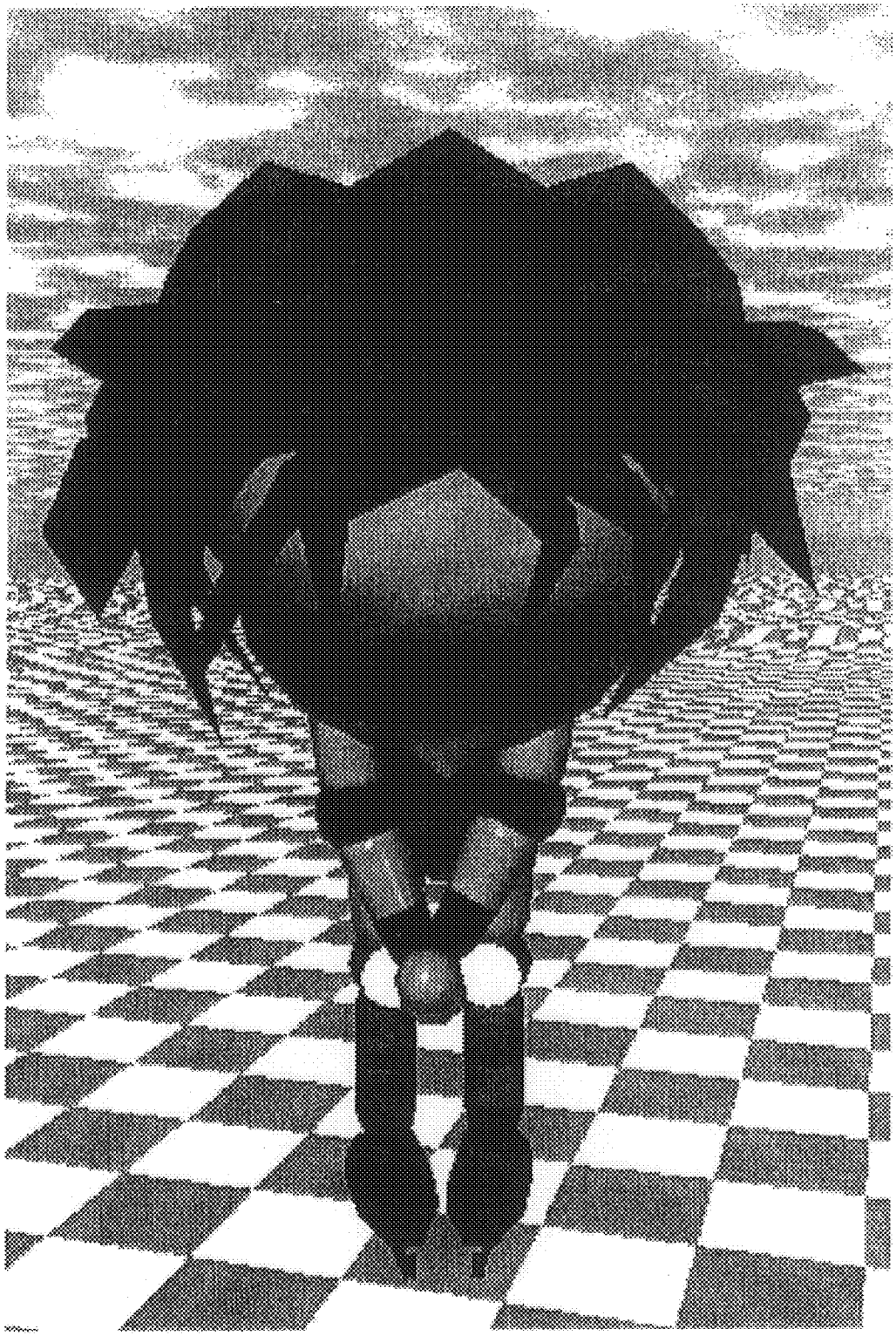
Figure 4D:

FIG. 1 is a block diagram of the device embodying the present invention. There is a processing unit 1 including a navigation processing unit 10 for finding out a drive route to a predetermined goal that is known to the driver by visual and/or voice message, an agent processing unit 11 for controlling the activity of the agent, an interface (I/F) 12, an image processing unit 13, a voice control unit 14 and a current status data processing section 15.

Navigation processing unit 10 and agent processing unit 11 have respectively a central processing unit (CPU) that operates in response to the input information to perform various data processing operation and control of parts. To CPU are connected ROM, RAM and timer through data bus lines. Navigation processing unit 10 and agent processing unit 11 are connected with each other by a network so that data processed in one unit may be given to the other unit. ROM is a read-only-memory storing various data and programs necessary to perform control in CPU. RAM is a random-access-memory to be used as a working memory when CPU performs data processing operation.

CPU of navigation processing unit 10 and agent processing unit 11 reads out the programs in ROM to conduct necessary operation. In modified embodiment, CPU reads out the programs from a memory medium in a memory drive 23, in which case the programs are then installed in an agent data memory 29, a navigation data memory 30, a hard disk (not shown) or any other memory. A necessary program is loaded from the memory to RAM for execution. It may be possible that CPU reads out the necessary program from the memory drive 23 to load it directly to RAM.

To navigation processing unit 10 are connected a current position sensor 21 and navigation data memory 30. To agent processing unit 11 is connected agent data memory 29. An input device 22, memory drive 23 and a communication control device 24 are connected to I/F 12. A display 27 and a camera 28 are connected to image processing unit 13. A voice processing unit 25 and a microphone 26 are connected to voice control unit 14. A current status sensors 40 are connected to current status data processing section 15.

Current position sensor 21 for detecting the current absolute position (its latitude and longitude) of the vehicle has a GPS (global positioning system) receiver 211, a direction sensor 212, a steering sensor 213, a distance sensor 214 and a beacon sensor 215 that receives the position signal from a beacon located on the road. GPS receiver 211 receives radio waves from earth satellites to determine the vehicle position. Beacon sensor 215 receives positional information from beacons arranged on roads. GPS receiver 211 and beacon sensor 215 can solely act to measure the vehicle position. Where GPS receiver 211 can not receive the radio waves and beacon sensor 215 can not receive the positional information, direction sensor 212 and distance sensor 214 cooperates with each other to infer the current position.

Direction sensor 212 includes a terrestrial magnetism sensor that detects terrestrial magnetism to determine orientation of the vehicle, a gyromagnetic sensor that detects a rotational angle velocity of the vehicle that is integrated to determine orientation of the vehicle, a pair of wheel sensors that detect an output pulse difference (a difference of movement between left and right wheels) to detect an angle of gyration of the vehicle. Steering sensor 213 employs an optical sensor or rotation resistance volume mounted to a rotating member of a steering to detect a steering angle. Distance sensor 214 detects a distance of movement by detecting revolution of the wheels or acceleration, for example.

Input device 22 is used to input any data, for example, the current position and the goal when starting navigation processing. Input device 22 also act as means for inputting the driver's response to the agent's message or question. An example of input device 22 is a touch panel arranged on display 27 and adapted to input any information by a touch on a key or menu represented thereon. Another example of Input device 22 is a keyboard, mouse, bar code reader, write pen, joy stick, infrared remote controllable input device and voice analyzer. An infrared remote controllable input device may cooperate with a receiver that receives signals from the input device. The remote controllable input device has a joy stick for moving a cursor on a display section, menu designating keys or buttons and ten keys.

Memory drive 23 drives memory medium storing the computer program that is required to perform operation of navigation processing unit 10 and agent processing unit 11. The computer program stored in the memory medium includes various programs and data. The memory medium may be any one capable of storing the computer program. For example, magnetic memory medium such as a floppy disk, hard disk and magnetic tape, semi-conductor memory medium such as a memory tip and IC card, magneto-optical memory medium such as CD-ROM, MO and PD, etc. may be examples of suitable memory medium. Any printed matter describing the computer program may also used in cooperation with a character analyzer.

When a rewritable memory medium such as a floppy disk and IC card is used, it may also be used to store data in RAM of navigation processing unit 10 and agent processing unit 11 or memory 29, 30. For example, study data (study item data and response data) regarding activities of the agent is stored in an IC card. The driver may use the IC card storing the driver's own data in common for two or more vehicles, as far as these vehicles have the same device. This means that the agent is peculiar not to the vehicle but to the driver.

Communication control device 24 transmits and receives data to and from a portable telephone and permits communication between the driver and his or her friend outside of the vehicle. Communication control device 24 also receives data regarding road information including traffic jams and traffic accident information that are supplied from a traffic information center. It also receives Karaoke data. The study data regarding activities of the agent may be received and transmitted through communication control device 24.

Voice output device 25 comprises a plurality of speakers arranged in the vehicle through which a voice controlled by voice control unit 14 is outputted. The outputted voice includes a voice message for guidance of the drive route and the agent's voice or sound that is a kind of the agent's activities. The speakers for audio instruments may be used as voice output device 25. Voice control unit 14 changes accent and tone quality of the voice outputted by voice output device 25 in response to the driver's tuning command.

A microphone 26 functions as voice input device for inputting any voice which is then processed by voice control unit 14. For example, a voice for inputting the goal of the drive route in navigation processing operation and the driver's voice in response to the agent's activities are inputted through microphone 26. A microphone for Karaoke may be used as microphone 26. However, microphone 26 should preferably have directionality enough to collect the driver's voice. A hand-free unit comprising speaker 25 and microphone 26 may be used for telecommunication.

Display 27 is used to represent the results of operation by navigation processing unit 10, for example, guidance to operation, operation menu, operation keys, a recommended drive route to the goal determined by the user's input through input device 22, and a guide map along the drive route. Display 27 also represents the results of operation by agent processing unit 11, for example, the activities of the agent. Any image taken by camera 28 is also shown on display 27 after being processed by image processing unit 13. As display 27 may be used a CRT display, a liquid crystal display, a plasma display or a hologram device that projects a hologram onto a front glass.

Camera 28 comprises CCD cameras that take photographs inside and outside of the vehicle. An inside CCD camera mounted in the vehicle take photographs of the driver. CCD cameras are also mounted at the front, rear, right side and left side for taking photographs of surroundings of the vehicle. The photographs taken by camera 28 are supplied to image processing unit 13 for image analyzing operation. The result of the image analyzing operation by image processing unit 13 is used to determine a program number by agent processing unit 11.

Agent data memory 29 stores data and program necessary for agent processing operation in accordance with this embodiment of the present invention. Memory 29 comprises memory medium such as a floppy disk, hard disk, CD-ROM, magneto-optical disk, magnetic tape, IC card, magneto-optical card, etc. and a drive for the memory medium used. In a preferred embodiment, study item data 292 and response data 293 are stored in a portable memory medium such as IC card and floppy disk, and other data is stored in a hard disk.

Agent data memory 29 stores agent program 290, program select table 291, study item data 292, response data 293 and image data 294. Study item data 292 and response data 293 represents the result of study of the agent through the driver's operation and/or response. Accordingly, study item data 292 and response data 293 are peculiar to each driver and renewed when the driver makes some operation and/or response.

Image data 294 stores the agent appearing on display 27. As described before, the agent represented on display 27 may be like a human body, like an animal such as a chick, dog, cat, frog, rat, etc., robot or any imaginary character. The agent may be a child at the beginning, which is grown with time as a result of study. Image data 294 stores a plurality of the agent appearance, one of which may be selected by the driver through input device 22.

Agent program 290 stores agent processing program and communication program in numerical order. Agent processing program commands activities of the agent. Communication program commands communication between the agent and the driver which is outputted through display 27 and speaker 25.

Agent program 290 stores plural kinds of voice patterns, for example, man's voice, woman's voice, child's voice, mechanical sound, animal voice, famous actor's or actress's voice, and popular character's voice. The driver can select favorite one of the voice patterns stored in agent program 290 through input device 22.

Program select table 291 is a table for use in selection of a specific one from communication programs stored in agent program 290. An example of program select table 291 is shown in FIG. 2. Once a specific program is selected in reference to program select table 291 in FIG. 2, the same program number is applied to an activity pattern select table, an example of which is shown in FIG. 3, to determine the activity (appearance and voice) of the agent. The program number of tables in FIGS. 2 and 3 are identical to the communication program number stored in agent program 290.

FIGS. 4A–4D show an example of the agent activities, which is shown on display 27 when one of the program Nos, 00001–00006 is selected (see FIG. 3). This activity start with the image of FIG. 4A which is changed to the images of FIGS. 4B and 4C, then to the image of FIG. 4D that is the same as the starting image of FIG. 4A. This activity is a respectful and ceremonious bow, because this is almost the first time that Lisa meets the driver. The name "Lisa" is only an example and any name may be inputted by the driver. With the agent's action of obeisance appearing on display 27, the agents says something that the driver can hear through speaker 25. In the program No. 00001 or 00002, the agent makes an obeisance while saying "Nice to meet you, I'm Lisa. I wish to go with you", which is, however, changed depending upon the vehicle's and driver's current status and as a result of the past record study.

In this embodiment, input device is also used to input the user-related information 298 to be stored in agent data memory 29a. The user-related information 298 may include the user's age, sex, hobby, character, favorite regarding the agent, etc. The user-related information 298 stored in agent data memory 29a is read out by agent processing unit 11 to determine the personal characteristic of the agent. The user-related information 298 is also used to determine utterance pattern of the agent to be outputted through voice output device or speaker 25. The user-related information 298 may be obtained from the user's response to the agent's question, which is inputted through microphone 25.

When current status sensor 40 detects that the coolant temperature is lower than a predetermined level, the agent shows a sleepy activity. For example, the agent gives or stifle a yawn before making a predetermined action (e.g., bow). In another example, the agent shows a slower movement and speaking. Such sleepy expression may be changed as a result of the study. A cheerful activity may be expressed by the agent who speaks loudly, appears on display while running, for example.

The respective items shown on the abscissa of table 291 of FIG. 2 determine the program number, on the ordinate, to be selected. The items on the abscissa may be classified into two groups, one being determined from the vehicle or driver's condition detected by current status sensor 40 which includes time, vehicle location where ignited, coolant temperature, etc. and the other being determined from the study results stored in study item data 292 and response data 293 which includes the number of today's ignition-on operation, time passage from the last ignition-off operation, the total number of ignition, etc. In table 291 of FIG. 2, a circle indicates the item that is indispensable to select the program of a corresponding number. A hyphened item is not considered in selecting the program of a corresponding number.

Although FIGS. 2 and 3 describes the activity pattern (bow) to be represented in response to the igniting operation, various activity patterns are likewise defined in response to some operation. For example, push of a brake pedal to an extent greater than a predetermined level is regarded as a key operation, in response to which the agent may fall on his or her behind, take several steps backward, keep his or her foot, cries in surprise, etc. These responsive activities may be changed by the agent's study of sudden braking operation. For example, the program determines that the agent falls on his or her behind at the first to third times of sudden braking operation, takes several steps backward at the fourth to tenth times, and keeps his or her foot thereafter. Such program represents that the agent becomes experienced and accustomed to the driver's sudden braking operation. It may be that when a time of more than one week has been passed since the last time sudden braking operation, the agent's activity of one earlier stage is applied. For example, where the fifth time sudden braking operation occurs ten days after the last time (the fourth time) operation, the program determines such that the agent falls on his or her behind.

Study item data 292 and response 293 are stored and renewed by the agent's study, examples of which are shown in FIGS. 5 and 6, respectively. Study item data 292 shown in FIG. 5 includes the total number of ignition-on, the last ignition-off, today's ignition-on, the fuel remainder record, the skip record, the default value, etc.

The total number of ignition-on operation is increased by one each time the ignition switch is turned on to ignite the engine. Each time the ignition switch is turned off, its date and time is renewed at the last ignition-off data. Each time the ignition-on operation occurs, its number (in a day) and its ignition-off time are recorded in today's ignition-on data. When a day is over (at 24:00), this data is cleared to zero, awaiting the next ignition-on operation. The time for renewing the today's ignition-on operation data is normally 24:00, but may be changed upon the driver's demand.

The fuel remainder record stores fuel remainders at the last five times fill-up. Each time the fuel is refilled, the newest data is stored at the rightmost column, and the last four data are moved to the adjacent left columns, respectively. The oldest data in the leftmost column is deleted. From the last five fuel remainders may be obtained the average fuel remainder (G2). When the fuel sensor 415 detects the current fuel remainder (G1) is below the average fuel remainder (G2), the agent appears on display 27 to show a fill-up suggesting activity and says "I've got hungry. I want fuel." through speaker 25.

The skip record data is counted up each time the driver refuses or neglects the agent's recommendation or communication even when such program number has been selected under control of the present invention. The study item data 292 includes the skip record where the agent activities of the program number involves the driver's response, such as by Program No. 00123 wherein the agent suggests stop of operation of the air-conditioner.

The default value includes initial values such as time, number, temperature, vehicle speed, data, etc. The default value is used to initialize data when data has been changed by the driver, for example, when the driver has changed the ignition-on operation time from the initial value of 24:00 to his or her desired time, as described before.

The other data that may be included in the study item data 292 include, for example, birthdays of the driver and his or her relatives and friends (that can be inputted by the driver), national holidays and their histories, date of events such as Christmas Eve, St. Valentine Day, etc. Among the communication programs, there may be special menu for special day. In accordance with an example of the special menu communication program, the agent is appearing on display 27 while dressed as Santa Claus on Christmas Eve and Day.

The response data 293 in FIG. 6 stores the user's response history to the agent's activities for the communication programs which include the user's response as one of the study data. The response data have different contents for different communication programs. In an example shown in FIG. 6A, the response data for the programs of Nos. 00123 and 00125 store several latest data (time and content). The response data of Program No. 00124 stores the only one latest response content, which is renewed each time the driver makes a response. In other examples, the response data may be several latest response contents (not including response time), only one latest response data of time and content, only one or several latest response date (not including response contents, etc.

The symbols A, B and C in FIG. 6A indicate the response contents. As shown in FIG. 6B, the symbol A indicates "Neglected", B "Refused" and C "Accepted". The driver's response content may be discriminated by analyze of the driver's voice inputted through microphone 26 or of information inputted through input device 22.

Although in this embodiment the driver's response contents are classified into three patterns, "Neglected" (A), "Refused" (B) and "Accepted" (C), it may have more detailed classification. For example, "Resolutely Refused", "Angrily Refused", "Pleased", etc. may be added.

Figure 7:
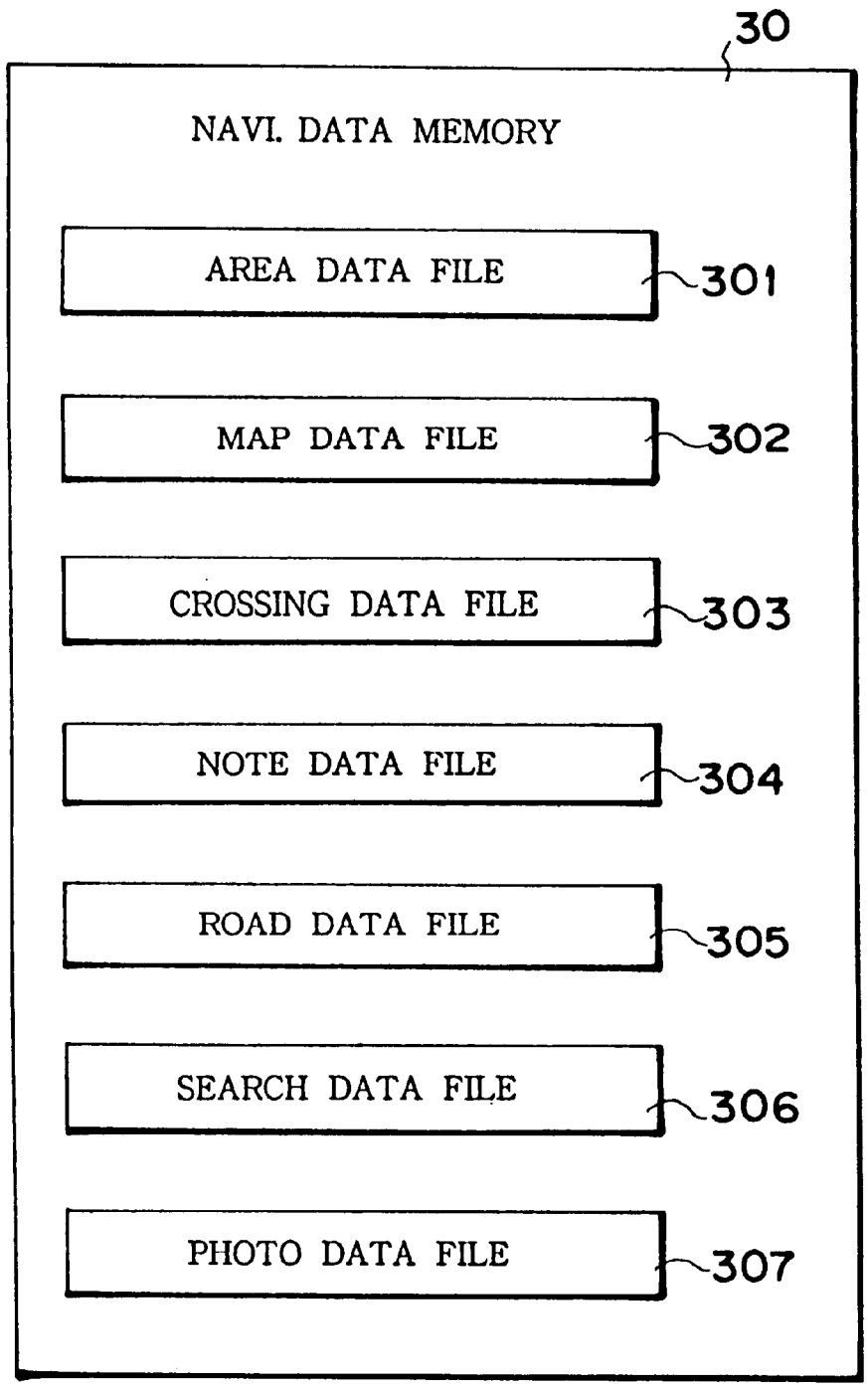
FIG. 7 shows various data files stored in a navigation data memory.

FIG. 7 represents data files stored in navigation data memory 30 (FIG. 1). As shown in FIG. 7, navigation data memory 30 stores communication area data file 301, map data file 302, crossing data file 303, node data file 304, road data file 305, route-finding data file 306 and photo data file 307. Navigation data memory 30 comprises one or combination of storage medium including a floppy disk, hard disk, CD-ROM, magneto-optical disk, magnetic tape, IC card, magneto-optical card, etc., and drive units therefor. For example, route-finding data file 46 is made of rewritable memory such as flush memory while other data files are stored in CD-ROM, and drive units therefor are respectively used.

Communication area data file 301 stores communication are data per handy phone types. Communication data is used for representation, on display 27, of communicatable area by the driver's handy phone connected or non-connected to communication control unit 24. This data is also used while finding out the drive route to the goal. The respective communication area data is assigned its peculiar number for easy access thereto. The communicative area is defined by continuity of short segments, so that the communicative area data may be specified by a plurality of coordinate data representing points connecting the segments. In another example, the communicative area is divided into plural rectangles, each rectangles being defined by two diagonal points thereof, in which case the communicative area data comprises a plurality of coordinate data representing diagonal points of the respective rectangles in the communicative area.

Data in communication area data file 301 is preferably renewable to conform with change of the communicative area of the handy phone. To meet this requirement, the handy phone is connected to communication control unit 24 for communication with an information center for updating of the contents of communication area data file 301. In another example, communication area data file 301 is made of rewritable and updatable memory such as a floppy disk and IC card.

Map data file 302 stores map data to be represented on display 27. Map data is stored in a tree construction. The uppermost layer stores map data of the broadest territory, and lower layer stores more detailed map data of smaller territories. The map data of the respective layers are assigned their peculiar map codes.

Crossing data file 303 stores crossing data such as crossing numbers specifying the crossing one by one, crossing names, crossing coordinates, road specifying numbers start or terminate with the crossings, existence of signals at the crossings, etc.

Node data file 304 stores node data specifying coordinates of respective points on the respective roads. Any road section may be defined by a plurality of node data thereon between the beginning and end of the section.

Road data file 305 stores road numbers specifying the road one by one, the crossing numbers at the beginning and end of the respective roads, other road numbers of the road that begins or terminates with the same point, road width, prohibition information (no parking, no entrance, one-way road, etc.), number of photo data, etc.

Data stored in crossing data file 303, node data file 304 and road data file 305 are particularly used for route-finding.

Route-finding data file 306 stores a series of crossing data and a series of node data which constitute the route found in the navigation system. A series of crossing data includes data regarding names and numbers of the crossings on the suggested drive route, numbers of the photos showing these crossings, names and numbers of the crossings at which the vehicle should turn to follow the suggested drive route, distances between the crossings, etc. A series of node data includes data regarding coordinates of the respective nodes on the suggested drive route.

Photo data file 307 stores photos showing the crossings, conspicuous landscape and buildings, for example, along the suggested drive route. Photos are assigned their peculiar photo numbers and stored in the form of digital, analog or negative films.

Figure 8:
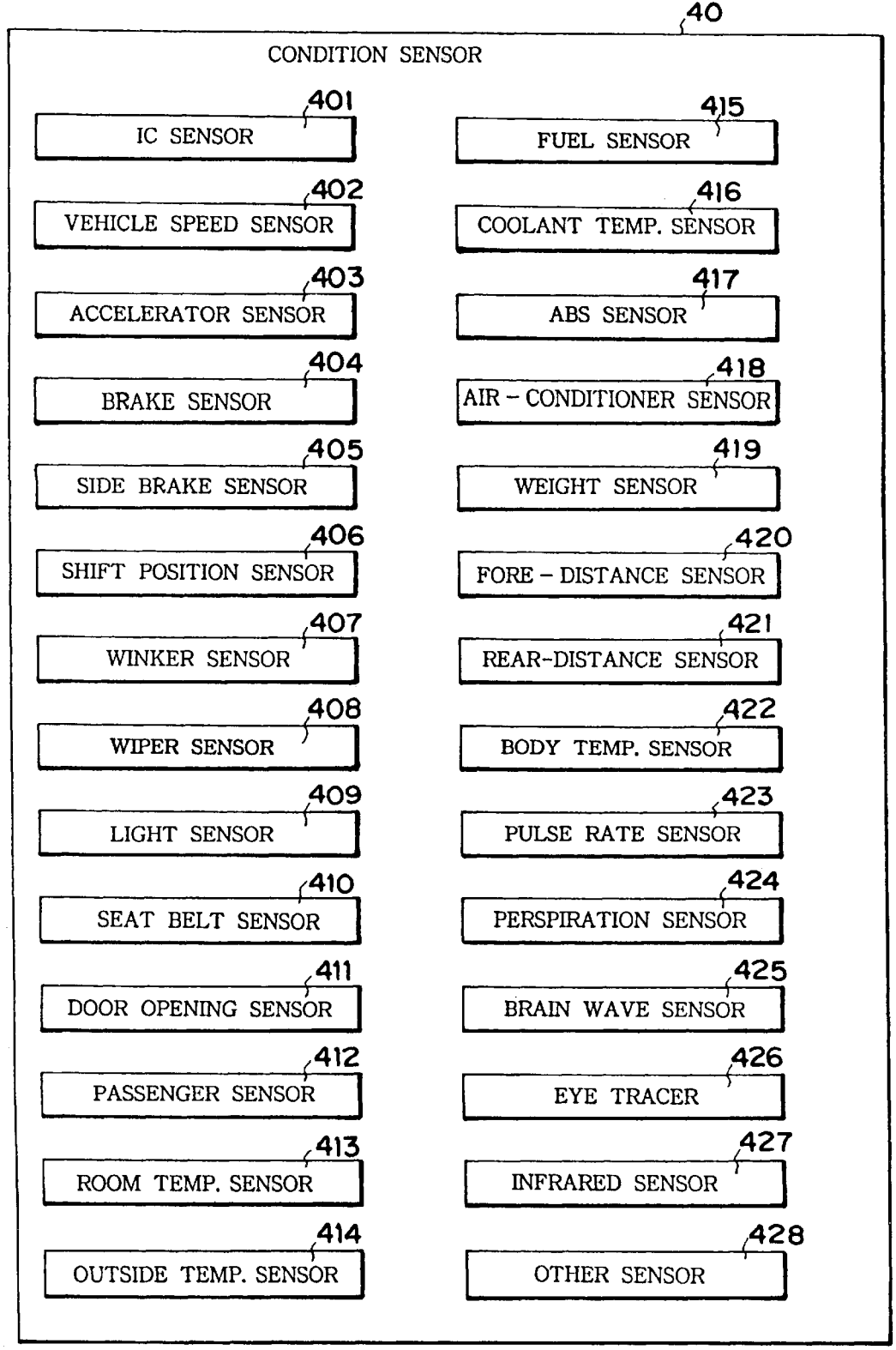
FIG. 8 shows various sensors in a current status sensor.

As shown in FIG. 8, current status sensor 40 includes an ignition sensor 401, a vehicle speed sensor 402, an accelerator sensor 403, a brake sensor 404, a side brake sensor 405, a shift position sensor 406, a winker sensor 407, a wiper sensor 408, a light sensor 409, a seat-belt sensor 410, a door opening sensor 411, a passenger sensor 412, a room temperature sensor 413, an open air temperature sensor 414, a fuel remainder sensor 415, a coolant temperature sensor 416, an ABS sensor 417, an air-conditioner sensor 418, a weight sensor 419, a fore-distance sensor 420, a rear-distance sensor 421, a body temperature sensor 422, a pulse rate sensor 423, a perspiration sensor 424, a brain wave sensor 425, an eye-tracer 426, an infrared sensor 427, and other sensors 428 for detecting, for example, decrease of air pressure of tires, loosening of belts, opening of windows, operation of horn, oil temperature, oil pressure, etc. As noted from the above, current status sensor 40 is used to detect various vehicle conditions and driver's conditions in this embodiment. In modification, only vehicle conditions or only driver's conditions may be detected by current status sensor 40. Sensors are mounted at suitable location inside or outside of the vehicle, respectively. Usually one sensor is used for one sensing purpose. However, it may be possible that some kind of sensor receives the detection signal from another sensor to carry out indirect sensing. For example, an air-pressure sensor may indirectly detect a decrease of an air-pressure of a tire in response to a change of a signal from a wheel velocity sensor.

Ignition sensor 401 detects ON and OFF of an ignition starter. Vehicle speed sensor 402 may be of any conventional type including one wherein a rotation angle velocity or revolution of a speed meter cable is detected to calculate a vehicle speed. Accelerator sensor 403 detects a degree of push stroke of an accelerator pedal. A brake sensor 404 detects a push stroke, push force or push speed of a brake pedal to discriminate if the driver makes an emergency brake. Side brake sensor 405 detects operation or non-operation of a side brake. Shift position sensor 406 detects the current position of a transmission shift lever. Winker sensor 407 detects which winker is lightened. Wiper sensor 408 detects wiper drive conditions (especially, wiper speed). Light sensor 409 detects various lights and lamps such as head lights, tail lamps, fog lamps, room lamps, etc. being lightened. Seat-belt sensor 410 detects if the driver and passengers are equipped with seat-belts. If at least one of them is not equipped with a seat-belt, the corresponding communication program is working such that the agent appears on display 27 to give warning, notice, advice, etc., one of which is selected by the results of study.

Door opening sensor 411 detects opening of vehicle doors. When detecting a half opening of the door, it is informed to the driver or passenger by the agent's activities (action and voice). Door opening sensor 411 may comprise plural sensors each detecting opening of doors at the driver's seat, at the assistant driver's seat, at opposite rear seats, etc., respectively. Passenger sensor 412 detects if there are any passengers in the vehicle, by the photo showing the interior of the vehicle taken by camera 28 or by pressure sensor or weight sensor mounted under the seat. Room temperature sensor 413 detects a room temperature of the vehicle, and open air temperature sensor 414 detects a temperature outside of the vehicle.

Fuel remainder sensor 415 detects a remainder in a fuel tank. As described before, the communication program is selected when the fuel remainder is decreased to the average of the last five records, so that the agent urges the driver to refill the fuel.

Coolant temperature sensor 416 detects a coolant temperature. When detecting that the coolant temperature is lower than a predetermined level at the time immediately after the ignition switch is turned on, the agent usually takes a sleepy action. On the other hand, when the coolant temperature is higher than another predetermined level, such communication program is selected that the agent looks weary and gives warning or notice to the driver to prevent overheating of the engine.

ABS sensor 417 detects if an ABS (anti-braking system) is in operative. As well known, ABS prevents the tires from being locked due to emergency braking to thereby improve drivablility and stability of the vehicle.

Air-conditioner sensor 418 detects the conditions of an air-conditioner mounted in the vehicle, including ON and OFF thereof, the set temperature and the set wind volume, etc. Weight sensor 419 detects the driver's weight, which is used solely or in combination with the photos by camera 28 to specify the driver so that the agent's activities can be determined in accordance with study item data 292 and response data 293 inherent to the said driver. When there are different agents selectable by plural drivers, one specific agent is determined by identification of the current driver.

Fore-distance sensor 420 detects a distance to another vehicle or obstacles ahead of the vehicle current position on the road, whereas rear-distance sensor 421 detects a distance to another vehicle or obstacles astern of the vehicle current position on the road.

Body temperature sensor 422, pulse rate sensor 423 and perspiration sensor 424 detects a body temperature, a pulse rate and perspiration of the driver, respectively. These sensors may be mounted on the surface of a steering to detect conditions of the driver's hand. Body temperature sensor 422 may be a thermography utilizing infrared sensor elements to detect the driver's body temperature distribution. Brain wave sensor 425 detects alpha wave or beta wave of the driver to discriminate the degree of awakening of the driver. Eye-tracer traces eye movement of the driver to the driver's intention and awakening. Infrared sensor 427 detects movement of the user's hands and head.

In reference to the flowchart of FIG. 9 showing the main routine of the agent control operation of the device of this embodiment, agent processing unit 11 first initializes the device after ignition sensor 401 detects that the ignition switch is turned on, at step S11. Initialization includes clearing of RAM, allocation of the respective working areas in RAM, loading of program select table 291 (FIG. 2) into RAM, set of flags to zero, etc. Although the operation starts with turning of the ignition switch in this embodiment, it may start in response to detection of opening or closure of any door by door opening sensor 411.

Next, agent processing unit 11 receives the current status data, stores them in their predetermined areas in RAM and analyzes them to confirm the current vehicle and user's status, at step S12. The current status data include data detected by the various sensors in current status sensor 40 and supplied therefrom to agent processing unit 11 through current status data processing section 15. The image data obtained by camera 28 is processed by image data processing section 13, which is also inputted to agent processing unit 11. The current vehicle position data detected by current vehicle position sensor 21 is also inputted to agent processing unit 11 through navigation processing unit 10. By way of example of the current status data, where coolant temperature sensor 416 detects a coolant temperature t1, agent processing unit 11 stores this temperature t1 in a predetermined area in RAM and, if the temperature t1 is below a predetermined temperature t2, discriminates that the coolant temperature is low (see the coolant temperature column in table of FIG. 2).

When the driver inputs any request through microphone 26, this is processed by agent processing unit 11 as a kind of the current status data. Such driver's request may be inputted by saying "Phone to Mr. Thingummy", "Show me restraints around here", "Play a CD", etc. The driver's request is processed by voice processing unit 14 with keywords such as "phone", "restraint", "play", "CD". These keywords are arranged on the abscissa of program select table 291 in FIG. 2.

Agent processing unit 11 then checked study data (study item data 292 and response data 293) in agent data memory 29 to confirm the agent's study regarding the obtained current status data, at step S13.

From the obtained current status data and the study data thereof, agent processing unit 11 discriminates if there is any communication program to be initiated, in reference to program select table 291, at step S14. If not (No at S14), the procedure is returned to step S12 where it awaits another current status data. Where there is a communication program to be initiated (Yes at S14), it confirms the program number thereof. It further reads out the driver's response record stored in response data 293 for the said program number to thereby determine if the communication program of the selected program number should be initiated or suspended, at step S15.

If the answer at S15 is No, agent processing unit 11 operates to initiate the selected communication program so that the predetermined agent's activities are shown on display 27 and outputted through speaker 25, at step S16. This enables good communication between the driver and the agent which reflects not only the vehicle and driver's current status but also the result of study of the past status data and the driver's response records.

When the driver shows any response to the agent's activities made at S16, such response data is obtained through microphone 26 or input device 22, at step S17.

Then, agent processing unit 11 discriminates if the communication program made at S16 involves any suggestion, proposal or question that awaits the driver's response or answer. For example, agent says "Do you want to hear any radio program?" or "Do you feel hungry? May I find any restraint near here?". The latter program may be initiated in response to detection of a hungry sound through microphone 26. Such a kind of communication program is hereinlater referred to as a "questioning program".

When the selected communication program is not a questioning program (No at S18), the procedure is advanced to a step S20. When it is a questioning program (Yet at S18), at a step S19, agent processing unit 11 controls the agent's activities in accordance with the driver's response already obtained at S17. For example, when the driver indicates the intention to accept the agent's proposal "Do you want to hear any radio program?" by answering "Yes", "OK", "Please", etc., agent processing unit 11 urges the agent to act accordingly and turns the radio receiver on to follow the driver's request.

Agent processing unit 11 accumulates data regarding the execution of the selected communication program to obtain the study data, at step S20. For example, when the selected communication program is not executed (Yes at S15), the number of skip of this program number stored in study item data 292 is increased by one. When the current number of skip is lower by one than a predetermined maximum number, all records now stored in study item data 292 and response data 293 for that program number should be cleared. Except this case, the current record in the study item data 292 is renewed when the current status data acquired at Step 12 includes some study item, and the response data obtained at Step 17 is stored in the response data 293 when the selected communication program is a questioning program that requests the driver's response. When a predetermined number of response records have already been stored in the response data 293, the oldest response data is disused.

After executing the above-described steps, at step S21, agent processing unit 11 confirm that a flag has become one in a flag area that was set in RAM at Step 11. When the flag is still zero (No at S21), it then discriminates if ignition sensor 401 detects that the ignition switch is turned off, at step S22). When not detected (No at S22), the procedure is returned to S12. When turning-off of the ignition switch is detected (Yes at S22), the flag in the flag area in RAM is set to one, at step S23, and then the procedure is returned to S12. When the flag is set to one, agent processing unit 11 controls such that the agent takes a farewell action that is the final activity in the selected communication program (at S16), and obtains the study data (at S20). It also execute the automatic extinguish any light that the driver has forgotten to turn off. Then, the control procedure terminates (Yes at S21).

FIGS. 10A–10C show an example of the agent activities that is controlled by agent processing unit 11 after the ignition switch is turned on. In this example, ignition sensor 401 detects that the ignition switch is on, current position sensor 21 detects the current vehicle position is other than the driver's home and rest positions. These data are supplied to agent processing unit 11 as the current status data (at S12). Regarding study item data 292 and response data 293, it confirms that this is the second ignition-on operation today, the last agent control operation was terminated at 10:05, on Jul. 12, 1997, and the total number of ignition-on operation amounts to 30 times, at S13.

From these data, agent processing unit 11 determines the communication program of No. 00004 should be executed, in reference to the program select table 291 shown in FIG. 2 (at S14). The agent activity to be outputted through display 27 and voice output device 25 is an "obeisance" that is a respectful bow, with saying "Hello, I'm Lisa. I will go with you again". After confirming that this communication program should not be suspended (No at S15), agent processing unit 11 starts this communication program (at S16), as shown in FIG. 10B. The agent's obeisance is represented by a series of stationary images or animation.

Since the program of No. 00004 is not a questioning program that awaits the driver's response (No at S18), the study data is stored and renewed as a result of execution of the program of No. 00004 (at S20). In this example, the number of today's ignition-on operation is changed from the previous value "2" to "3", and the total number of ignition-on operation is changed from the previous value "30" to "31". Since the flag is still zero at this time (No at S21) and the ignition is still on (No at S22), the procedure is returned to S12 so that this communication program continues.

Since the total number of ignition-on operation has reached "31", the communication programs of Nos. 00001–00006 can not be selected (see table 291 in FIG. 2), as far as all study data (study item data 292 and response data 293) are initialized. Until the total number of ignition-on operation reaches "300", one of the programs of Nos. 00007–00019 is selected in response to the current status data. The agent no more makes an "obeisance". The agent makes an ordinary "bow" when the coolant temperature is high, while a "sleepy bow" is applied when the coolant temperature is low. The agent's voice depends on the program number to be selected by data such as the place where the ignition switch is turned on, the number of today's ignition-on operation, etc.

FIGS. 11A–11C illustrate another example of the agent's activities that may be selected during driving. In this example, air-conditioner sensor 418 detects that the air-conditioner is in operation, and temperature sensors 413, 414 detects a room temperature T1 and an open air temperature T2, respectively. These data are supplied to agent processing unit 11 as the current status data. Agent processing unit 11 investigates the response data 293 to find that the driver's last twice response to the agent's activities of the program No. 00123 are both "C" indicating that the driver accepts the agent's suggestion or advice (see FIG. 6A), and reads out the default values (T3=2, T4=24) from study item data 292. From the default values T3, T4, it is confirmed that the temperature relationships of T1−T2≦T3 and T2≦T4 are satisfied (see FIG. 11A).

Agent processing unit 11 thus selects the communication program of No. 00123 in reference to the program select table 291 (at S14). After confirming that this program is not a questioning program that awaits the driver's response (No at S15), it starts executing this program (at S16) so that the agent's activities such as shown in FIG. 11B will be outputted through display 27 and speaker 25. More particularly, the agent appears with smile on display 27 and says "It becomes cool. May I suggest introducing the open air?".

Agent processing unit 11 then acquires the driver's response to the agent's activities (at S17). Since the program No. 00123 is a questioning program that awaits the driver's response (Yes at S18), it controls operation of the air-conditioner to follow the driver's request. When the driver's response is "acceptance", the air-conditioner is turned off and the front side windows are half-opened (at S19).

After executing control to follow the driver's response, agent processing unit 11 stores a result of study depending upon the driver's response pattern. Examples of the study are shown in FIG. 11C. In this case, when the driver neglects the agent's suggestion (response pattern A), application of the program No. 00123 is suspended one time. Moreover, the temperature default values T3 and T4 to be used in the next application of the program No. 00123 are respectively decreased by one, so that the next T3 should be 1° C. and the next T4 should be 23° C. When the driver refuses the agent's suggestion (response pattern B), application of this program is suspended five times, and the temperature default values T3 and T4 to be used in the next application of this program are respectively decreased by one, so that the next T3 should be 1° C. and the next T4 should be 23° C. When the driver accepts the agent's suggestion, the current default values T3, T4 remains unchanged, and this program is not suspended but executed when selected.

Although in the above description the front side windows are half-opened in response to the driver's acceptance to the agent's suggestion, it may be possible that agent processing unit 11 performs more detailed control for opening the windows as a result of study. More particularly, data regarding window position and degree of window opening are also subjected to the agent's study. For example, the driver may say "Too much opened", "Close a little bit more", "Open rear side windows too", etc. after half-opening the front side windows in response to the driver's acceptance to the agent's suggestion. Such response reflects the driver's favorite condition regarding the window opening and, therefore, are stored in the response data 293. The default values for window opening may be, for example. 1/2 for front side windows. When the driver says "Open rear side windows too", this is regarded as a kind of the current status data (at S12) so that a corresponding communication program is executed (at S16) to open the rear windows, with the corresponding agent's activities appearing on display 27 and outputted through speaker 25.

In accordance with a modified embodiment of the present invention shown in FIGS. 12–16, the agent is more personified by selectively controlling the agent's voice output pattern. In this embodiment, even if the same communication program is selected, the agent talks to the driver in a different voice pattern or tone, depending on the vehicle condition, the user's favorite to the agent, the weather condition, etc. The agent's activity or voice pattern may be determined by also taking his or her character into consideration.

Figure 12:
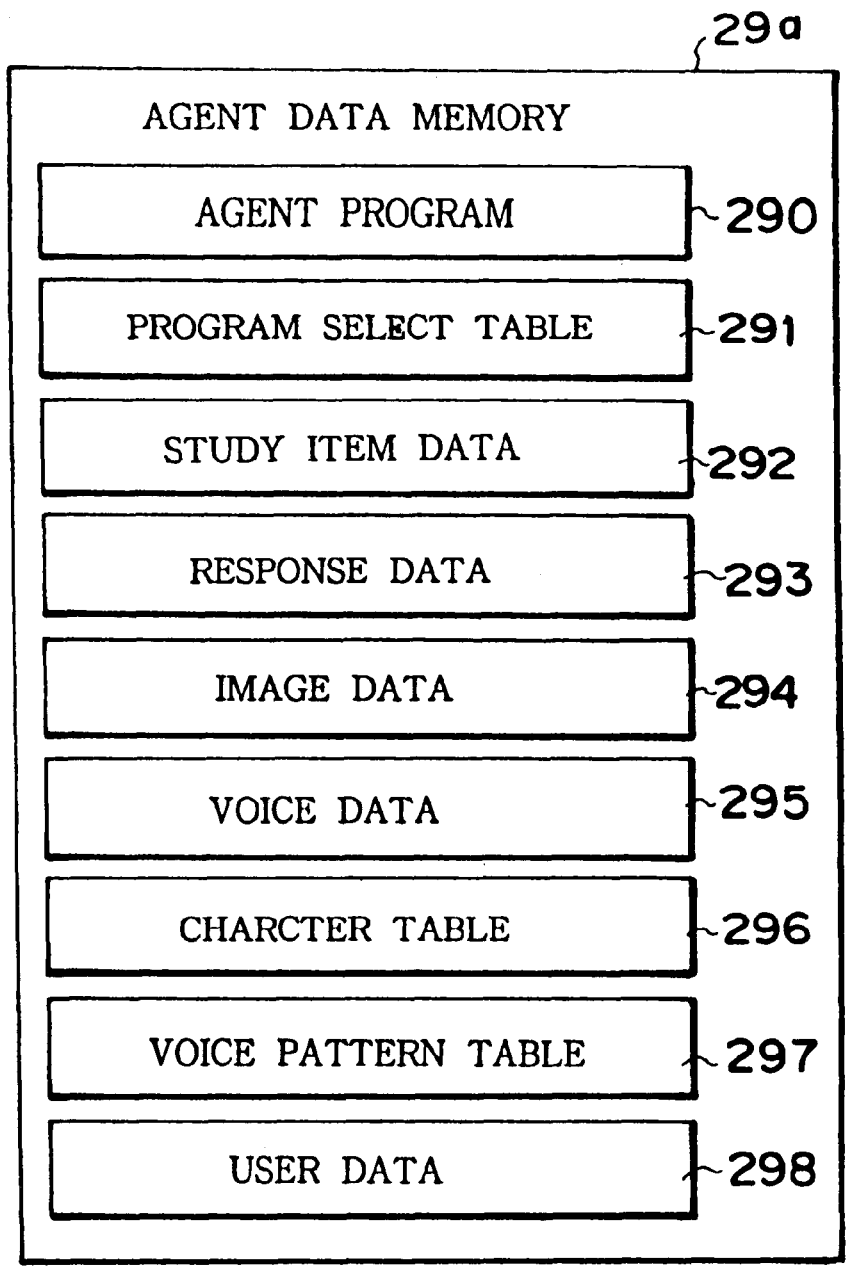
FIG. 12 shows contents of the agent data memory in a second embodiment.

In this embodiment, agent data memory 29 in FIG. 1 is replaced with another one 29a that stores voice data 295, agent's character select table 296, voice pattern select table 297 and user-related information 298, in addition to agent program 290, program select table 291, study item data 292, response data 293 and image data 294, as shown in FIG. 12. Except for difference in contents of agent data memories 29 and 29a, the device is almost similar to that shown in FIG. 1 and therefore no description of the other parts and elements of the device is given here to avoid tedious repetition.

Agent data memory 29a in this embodiment comprises one or plural memory medium that can be selected from floppy disk, hard disk, CD-ROM, magneto-optical disk, magnetic tape, IC card, magneto-optical card, etc. and drive unit for the memory medium used. It may be preferable that study item data 292, response data 293 and user-related data 298 are stored in removable memory medium such as floppy disk and IC card and other data are stored in a hard disk.

Voice data 295 is to output the agent's communication through speaker 25. A plurality of predetermined words and clauses stored in the voice data 295 may be combined upon demand to synthesize the agent's communication. The driver or user may select appearance and voice of the agent through input device 22. The agent's voice may be selected, for example, from man's voice, woman's voice, child's voice, mechanical voice, animal voice, famous actor's or actress's voice, etc. Once selected appearance and voice of the agent may be changed at any time the user so wishes. When some voice pattern is selected, it can be outputted through speaker 25 after being tuned by voice control unit 14 in accordance with the selected voice pattern.

Agent's character select table 296 is used to determine the agent's character in accordance with the user-related information 298. The agent's character selected in reference to the table 296 is used as data for determining the voice pattern.

An example of the agent's character select table 296 is shown in FIG. 13. As shown in the rightmost column of the table 296 in FIG. 13, the agent's character is determined as one selected from the group consisting of "obliging", "moderate", "crybaby", "strong sense of justice", "beautiful secretary", "competent manager", "high-school girl", etc. When a "beautiful secretary" agent is selected, her speaking tends to be placid. When a "high-school girl" is selected, she usually speaks cheerfully but soon become displeased when the vehicle is in a traffic jam or exposed to the weather. Of course, these are only examples.

The agent's character is selected based on the vehicle condition such as the vehicle type and the number of ignition-on operation, the user's own data such as the user's age, sex, hobby and character, the current weather condition, the current time, etc. These items may be inputted by the user through input device 22 and/or acquired from the user's response (inputted through microphone 26) to the agent's question (outputted through speaker 25). Some of the items may be automatically stored in the table 296 by the driver's vehicle operation and/or signals from sensors. Among these items thus obtained, the user's own data is also stored in a memory section of the user-related information 298 in agent data memory 29a.

The voice pattern select table 297 is to determine the voice output pattern for tuning of the agent's voice. An example of the voice pattern select table is shown in FIG. 14. As shown in the rightmost column of the table 297 in FIG. 14, the agent's voice pattern is determined as one selected from the group consisting of "loud", "placid", "cool", "respectful", "tender", "kind", "trembling", "angry", "reluctant", "cheerful", "out of humor", etc. The voice pattern is selected, in reference to the table of FIG. 14, from the type of the agent's communication, the vehicle condition, the agent's character, the user's favorite, the external factors, the current time, etc.

In this example, the agent's communication type on the abscissa of the table 297 in FIG. 14 is classified into at least A–F types, A means route-guidance, B warning message. C explanation, D greetings, E call-back, and F conversation. The agent's communication type depends on a specific communication program to be selected in reference to the program select table 291 of FIG. 2. In other words, each communication program has its data regarding the communication type, that is one of the above-described types A–F.

The vehicle condition on the abscissa of the table 297 in FIG. 14 includes whether or not the vehicle is in a high-speed (say, more than 80 km/hour) drive, whether or not the vehicle is out of the prescheduled route, whether or not the vehicle interior is noisy (than a predetermined noise level), the total number of ignition-on operation, etc.

The agent's character on the abscissa of the table 297 in FIG. 14 is determined in reference to the table of FIG. 13, in such a manner as described above.

The favorite on the abscissa of the table 297 in FIG. 14 is selected by the user's input through input device 22 or inputted from the user's response to the agent's question. The driver's favorite may be classified into "young lady", "placid lady", "showy lady", "cheerful girl", etc.

The external factors also on the abscissa of the table 297 in FIG. 14 include the current weather condition (fine, cloudy, rain, snow, etc.), whether or not the vehicle is in a traffic jam, whether or not the vehicle is driving on an uphill or downhill, etc. These external factors may be automatically inputted by detection of current status sensor 40.

The current time also on the abscissa of the table 297 in FIG. 14 indicates the current time is morning (e.g., from the sunrise to noon), daytime (e.g., from noon to the sunset), evening (e.g., from the sunset to 23:00) or midnight (e.g., from 23:00 to the next sunrise). The current time classification may be determined from detection by a timer equipped in agent processing unit 11 and a calender (that also stores each day's anticipated sunrise and sunset time) stored in agent data memory 29.

When the voice output pattern is determined in reference to the table 297, the agent's communication (speaking) is tuned accordingly by voice control unit 14. How to tune the agent's speaking in accordance with the determined voice output pattern is not limitative. For example, when the voice output pattern is determined as the loudly-speaking pattern, the agent's communication is outputted through speaker 25 with an increased volume. In case of the placidly- or respectfully-speaking pattern, voice control unit 14 controls such that the agent speaks slowly so that the driver clearly understands the agent's communication word by word. The respectfully-speaking pattern may be tuned for giving a silent interval at each punctuation mark a little bit longer than by the placidly-speaking pattern. In case of the cheerfully-speaking pattern, the agent's communication is tuned such that the agent speaks in a cheerful and higher voice. The agent speaks in a manner that the ending of each word is pronounced in a lower voice.

The user-related information 298 in agent data memory 29a stores the vehicle type of the user' possession, the user's age, sex, character, favorite to the agent, etc. These user-related data is used to determine not only the agent's character in reference to the table 296 of FIG. 13 but also the voice output pattern in reference to the table 297 of FIG. 14. The user-related data is stored for each driver and subject to the study.

Figure 15:
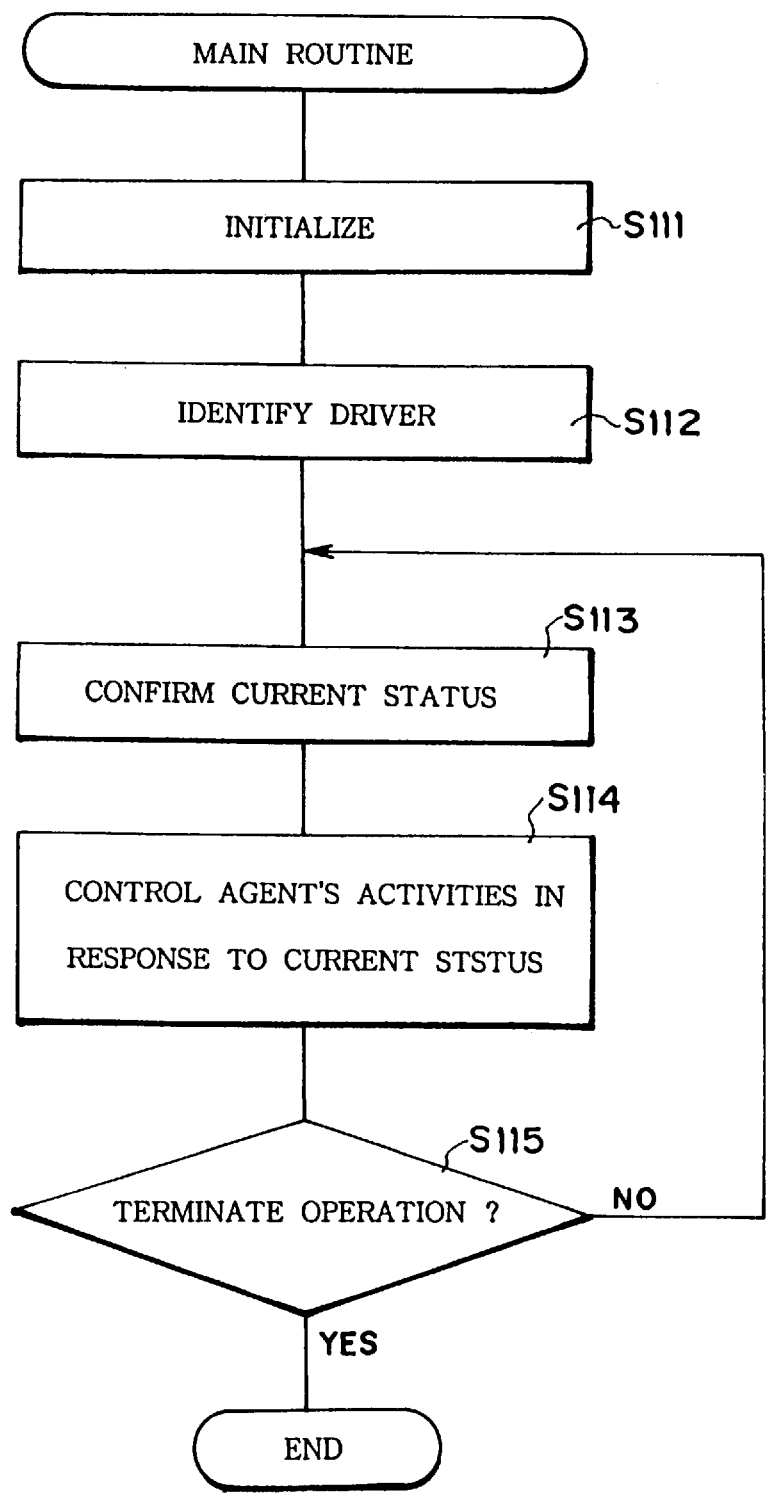
FIG. 15 is a flowchart showing a main routine of the agent control operation in the second embodiment.

FIG. 15 is a flowchart showing a main routine of the agent control operation in accordance with this embodiment. Agent processing unit 11 first initializes the device after ignition sensor 401 detects that the ignition switch is turned on, at step S11. This step is almost identical to S11 of the flowchart of FIG. 9, description of which is incorporated herein.

Agent processing unit 11 then identifies the current driver, at step S112. More particularly, when the driver's voice is inputted through microphone 26, it is analyzed by voice control unit 14 to identify who is the current driver. The current driver may be identified by photo taken by camera 28 and then analyzed by image processing unit 19. The weight detected by weight sensor 419, the driver's seat position, the angle of the room mirror may also be taken into consideration to identify the current driver. In a preferred embodiment, S12 includes a driver-identifying communication program (not shown) in which the agent appears on display 27 and speaks through speaker 25 for confirming that the current driver is just as identified.

Once the current driver is identified and confirmed, agent processing unit 11 obtains and confirms the current status, at step S113. This step is almost identical to S12 of the flowchart of FIG. 9, description of which is incorporated herein.

Figure 16:
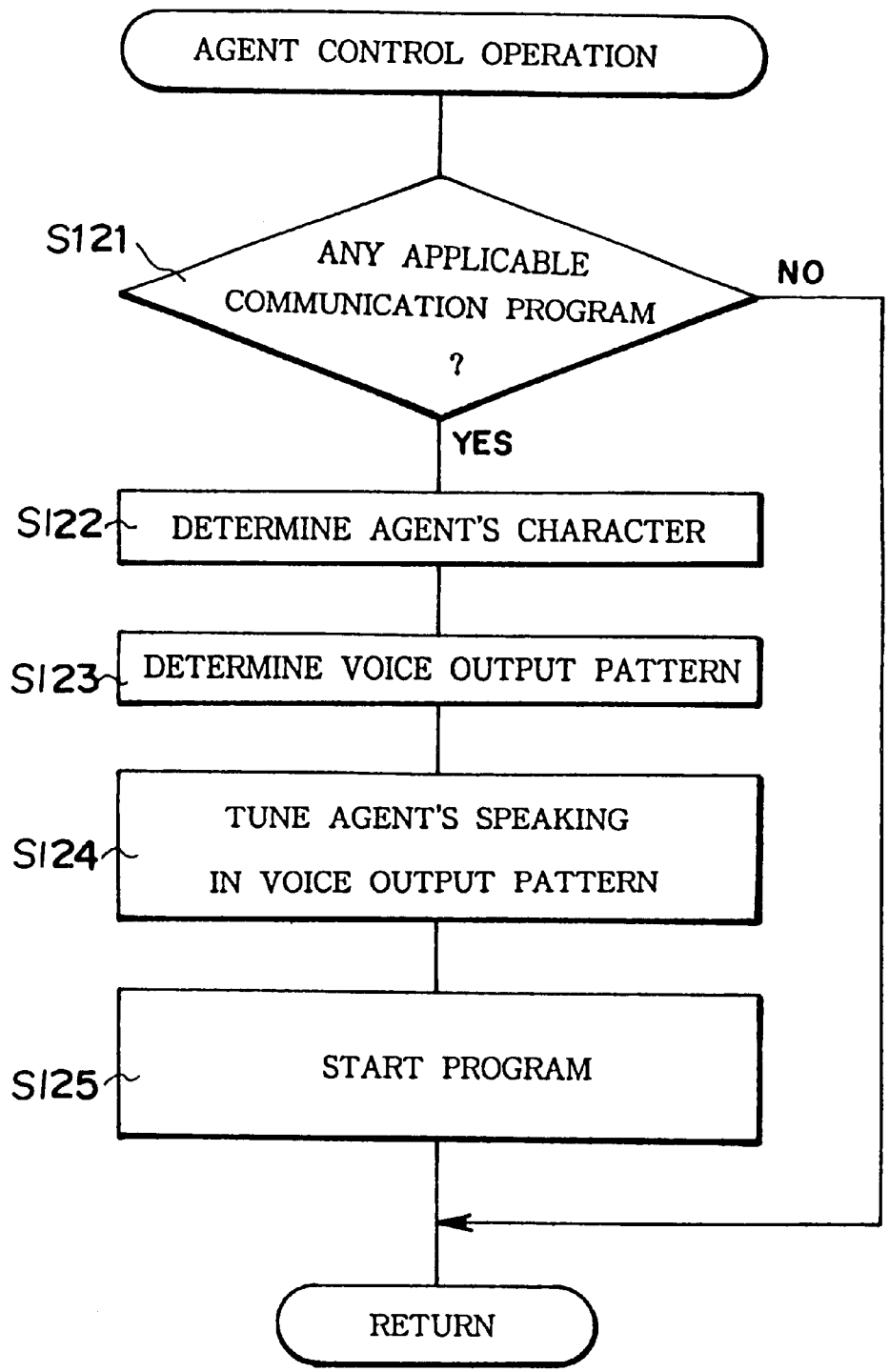
FIG. 16 is a flowchart showing a sub-routine executed at step S114 in FIG. 15.

Then, at step S114, agent processing unit 11 performs the agent control operation depending on the current status confirmed at S113, in a manner to be described hereinlater in reference to the flowchart of FIG. 16. As a result of the operation at S114, the agent makes some judgement, communication (action and speaking), control, study, inspection, etc. It may be possible that the agent do nothing when so controlled by the current status.

Then, agent processing unit 11 discriminates if the main control routine should be terminated, at step S115. If the main control routine should continue, the procedure is returned to S113 to repeat the operation through S113–S115. On the contrary, when ignition sensor 401 detects that the ignition switch is turned off (at S113), this means that the main control routine should be terminated (No at S115). In this case, after predetermined terminative operation such as turning-off of room interior lamps is made at S114, this routine of FIG. 15 is terminated.

FIG. 16 is a flowchart showing the agent control operation that is carried out in S114 of the main routine of FIG. 15. At step S121, agent processing unit 11 discriminates if there is any communication program to be initiated, in reference to program select table 291. This step is almost identical to S14 of the flowchart of FIG. 9, description of which is incorporated herein. If there is no communication program to be applied (No at S121), this sub-routine is terminated and returned to the main routine of FIG. 15.

When there is some communication program to be initiated (Yes at S121), it determines the agent's character by applying the current status (the number of ignition-on operation, current weather condition, time, etc.) that has been obtained at S113 of the main routine of FIG. 15 and the user-related information 298 in agent data memory 295 to the character select table 295 (FIG. 13), at step S122.

It further determines, at step S123, the voice output pattern of the agent's speaking from the communication type of the program that has been confirmed at S121, the agent's character that has been determined at S122 and the current status (vehicle status, external factors, time, etc.), in reference to the voice pattern select table 297 (FIG. 14).

Thus, at step S124, agent processing unit 11 reads out, from the voice data memory 295, voice data necessary to synthesize the agent's speaking contents (see FIG. 3) of the selected communication program and tunes the synthesized speaking contents in accordance with the determined voice output pattern. Suppose that the program No. 00011 was selected at S121, in which the agent says "Good afternoon, I'm Lisa. May I go with you?" (see FIG. 3). And, when the "respectfully-speaking" voice output pattern was selected at S123, agent processing unit 11 controls such that the agent (Lisa) says the above greetings relatively slowly. When the "cheerfully-speaking" voice output pattern was selected, the agent says the above greetings in a cheerful and a little bit higher tone.

After such tuning control operation at S124, the communication program selected at S121 is now initiated, at step S125. The prescribed agent's action of selected communication program is shown on display 27, while the prescribed agent' speaking thereof is outputted through speaker 25 after subjected to proper tuning at S124.

In accordance with this embodiment, the agent is more personified to make human communication with the driver. Even when the same communication program is applied, the agent's speaking pattern changes in response to the current status, for example. When the vehicle is driving with the windows opened, the agent speaks loudly. When the vehicle is in a traffic jam on a rainy day, the agent is out of humor, whereas the agent speaks cheerfully during driving at high speed along a seaside road (that can be detected by navigation processing unit 10) on a fine day.

In accordance with another embodiment of the present invention, the agent is personified by selectively controlling the agent's character depending upon the vehicle condition or other situation concerned. In this embodiment, even if the same communication program is selected, the agent's activity should be changed in response to change of situation. Moreover, the agent's activity is determined not only the situation but also the past record study.

Figure 17:
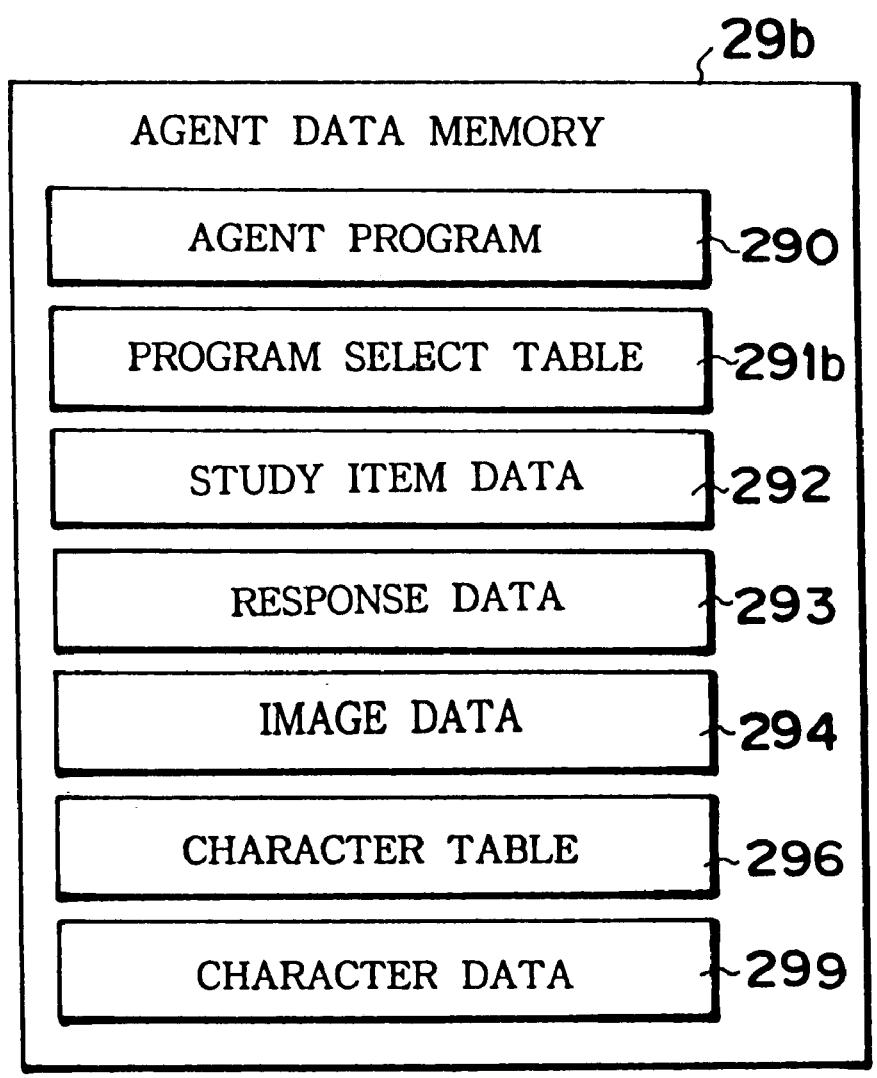
FIG. 17 shows contents of the agent data memory in another modified embodiment.

In this embodiment, processing unit 1 (FIG. 1) is connected to agent data memory 29b that stores agent program 290, program select table 291b, study item data 292, response data 293, image data 294, agent's character select table 296 and character-determining data 299, as shown in FIG. 17. Program 290 and data 292–294 are substantially identical to those stored in agent data memory 29 of the first embodiment of FIG. 1. Agent's character select table 296 is substantially identical to that stored in agent data memory 29a of the second embodiment of FIG. 12. Accordingly, explanation thereof is not repeated herein. Character-determining data 299 is basic data for use in determining the agent's character in reference to character select table 296. Such basic data includes the vehicle type, the user's birthday, sex, character for every driver who may use the present system.

Except for difference in contents of agent data memories 29 and 29a, the device is almost similar to that shown in FIG. 1 and therefore no description of the other parts and elements of the device is given here to avoid tedious repetition.

Agent data memory 29b in this embodiment comprises one or plural memory medium that can be selected from floppy disk, hard disk, CD-ROM, magneto-optical disk, magnetic tape, IC card, magneto-optical card, etc. and drive unit for the memory medium used. It may be preferable that study item data 292, response data 293 and character-determining data 299 are stored in removable memory medium such as floppy disk and IC card and other data are stored in a hard disk.

Program select table 291b is similar to table 291 of FIG. 2, but further includes the agent's character on the abscissa for some communication programs. This means that, in this embodiment, the agent's character that is determined in reference to character select table 296 comprises one of factors for determining a communication program to be applied.

In this embodiment, as described above, the agent activity of a specific communication program that is selected by table 291 may be represented in different manner depending on the agent's character determined by table 296. Suppose that a communication program designating the agent's activity of "falling down" is selected in response to the driver's emergency braking operation. Where the agent's character has been determined as like a "crybaby", the agent falls down behind her buttocks while snivelling or crying. A "beautiful secretary" do the substantially falls down but remains calm and says "Why?". An agent like a "high-school girl" screams in doing the action of "falling down".

The flowchart of FIG. 15 also describes the main routine of the agent control operation of this embodiment. Description regarding the flowchart of FIG. 15 should be referred to in understanding the agent control operation of this embodiment. In this embodiment, however, the agent control operation that is carried out at S114 of the main routine of FIG. 15 is processed as shown by the flowchart of FIG. 18.

Figure 18:
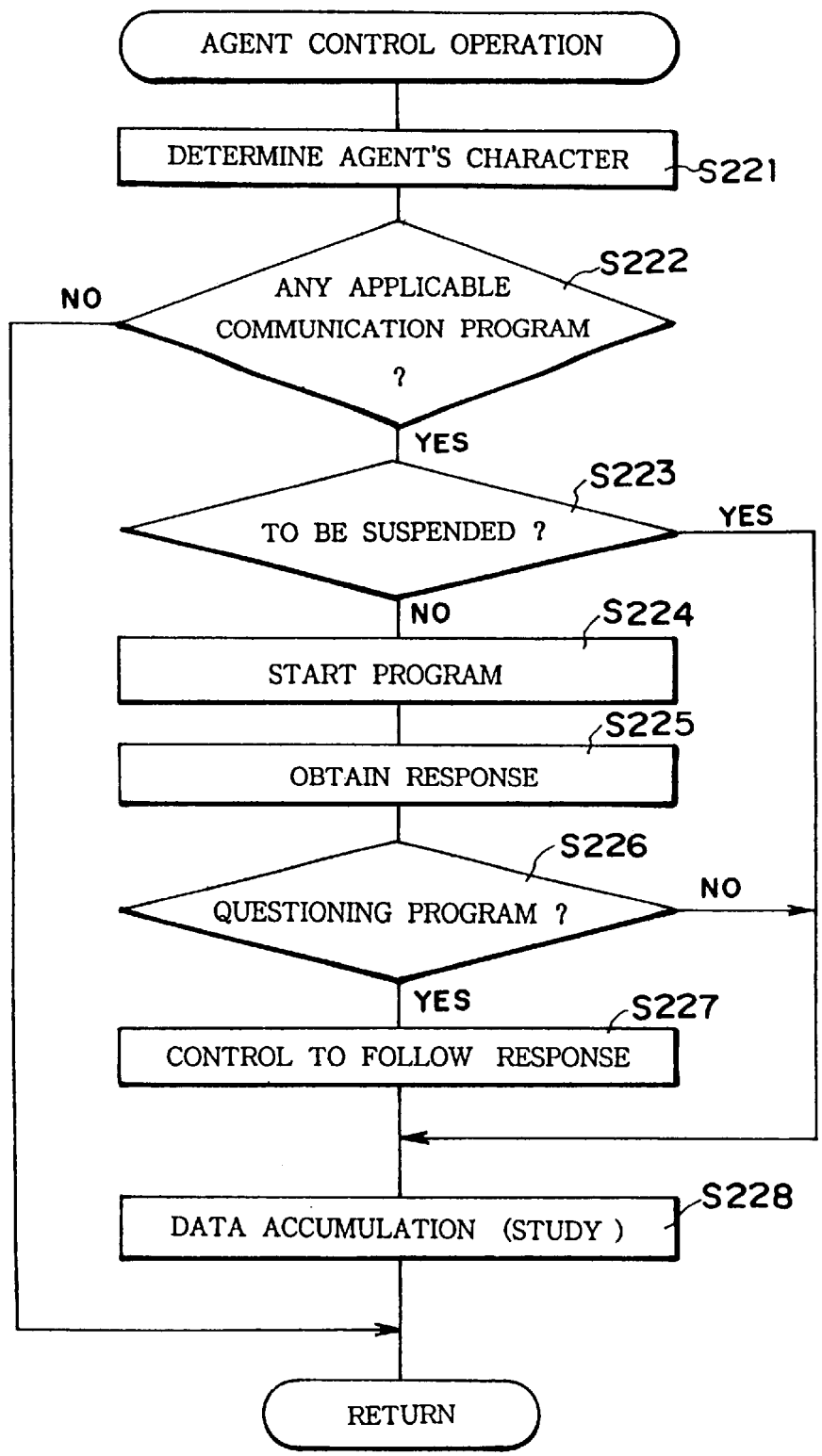
FIG. 18 is a flowchart showing the agent control operation to be carried out at S114 in FIG. 15.

Now in reference to the flowchart of FIG. 18, agent processing unit 11 determines the agent's character by applying the already obtained current status (e.g., the total number of ignition-on operation, the current weather, time, etc.) and basic data in character-determining data memory 299 to character select table 296, at step S221.

From the obtained current status data and the agent's character determined at S221, agent processing unit 11 discriminates if there is any communication program to be initiated, in reference to program select table 291b, at step S222. If not (No at S222), the procedure is returned to the main routine of FIG. 15. Where there is a communication program to be initiated (Yes at S222), it confirms the program number thereof. It further reads out the driver's response record stored in response data 293 for the said program number to thereby determine if the communication program of the selected program number should be initiated or suspended, at step S223.

If the answer at S223 is No, agent processing unit 11 operates to initiate the selected communication program so that the predetermined agent's activities are shown on display 27 and outputted through speaker 25, at step S224. This enables good communication between the driver and the agent which reflects not only the vehicle and driver's current status but also the result of study of the past status data and the driver's response records. When the driver makes any response to the agent's activities made at S224, such response data is obtained through microphone 26 or input device 22, at step S225.

Then, at S226, agent processing unit 11 discriminates if the communication program made at S224 involves any suggestion, proposal or question that awaits the driver's response or answer. For example, agent says "Do you want to hear any radio program?" or "Do you feel hungry? May I find any restraint near here?". The latter program may be initiated in response to detection of a hungry sound through microphone 26.

When the selected communication program is not a questioning program (No at S226), the procedure is advanced to step S228. When it is a questioning program (Yes at S226), at a step S227, agent processing unit 11 controls the agent's activities in accordance with the driver's response already obtained at S227. Regarding the example of operation at S227, the description of S19 should be referred to.

Agent processing unit 11 accumulates data regarding the execution of the selected communication program to obtain the study data, at step S228. In connection with S228, the description of S20 should be referred to. Further, in this embodiment, when the response at S225 includes any data that influences determination of the agent's character, it is stored in character-determining data section 299 in agent data memory 29. After executing the operation at S228, the procedure is returned to the main routine of FIG. 15.

FIGS. 19A–19C show an example of the agent activities that is controlled by agent processing unit 11 after the ignition switch is turned on. In this example, ignition sensor 401 detects that the ignition switch is turned on, current position sensor 21 detects the current vehicle position is other than the driver's home and rest positions. These data are supplied to agent processing unit 11 as the current status data at S113 of the main routine of FIG. 15. Regarding study item data 292 and response data 293, it has confirmed that this is the second ignition-on operation today, the last agent control operation was terminated at 10:05, on Jul. 12, 1997, and the total number of ignition-on operation amounts to 30 times.

From these data, agent processing unit 11 determines the communication program No. 00004 should be executed for "beautiful secretary" and No. 000xx for "high-school girl", in reference to the program select table 291b, at S222 of the flowchart of FIG. 18. The agent activity to be outputted through display 27 and voice output device 25 is an "obeisance" that is a respectful bow, with saying "Hello, I'm Lisa. I will go with you again" in the communication program No. 0004 and "Hi, I'm Lisa. Let's go with me" in the communication program No. 000xx. After confirming that the selected communication program should not be suspended (No at S223), agent processing unit 11 starts this communication program (at S224), as shown in FIG. 19B. The agent's obeisance is represented by a series of stationary images or animation.

Since the selected program of No. 00004 or No. 000xx is not a questioning program that awaits the driver's response (No at S226), the procedure is advanced to S228 where the study data is stored and renewed as a result of execution of the selected program. In this example, the number of today's ignition-on operation is changed from the previous value "2" to "3", and the total number of ignition-on operation is changed from the previous value "30" to "31". Then, the procedure is returned to the main routine of FIG. 15.

FIG. 20A represents a example of program select table 291b, and FIG. 20B represents the agent's activities to be outputted in the communication program selected by table 291b of FIG. 20A. The communication program Nos. 02000–02003 shown in FIG. 20A is selected when the driver changes the shift lever from the parking position (P) to the driving position (D) while the side brake is still in operation and then pushes the accelerator pedal to a certain degree. The accelerator pedal operation, the side brake operation and the shift lever position are detected by sensors 403, 405 and 406 (FIG. 8) in current status sensor 40 (FIG. 1), which agent processing unit 11 confirms at S113 of the main routine of FIG. 15. In the communication program 02000–02003, the agent calls the driver's attention to the current side brake position and immediate release thereof, which is accomplished by the agent's activities shown in FIG. 20B.

When the "obliging beautiful secretary" has been selected as the agent's character (at S221 of FIG. 18), the communication program No. 02000 is selected in reference to program select table 291b of FIG. 20A (at S222). As shown in FIG. 20B, this communication program designates the agent activity such that the agent warns by saying "The side brake is still in operation. Release it, please", in a persuasive tone. Also, the agent's activity is shown on display 27 just like such that her right hand is pulled back by the side brake.

When the "high-school girl" has been selected, the communication program No. 02001 is applicable. In this case, the high-school girl on display takes the same reaction while saying "Oh no! The side brake is still working. Release it, please" in a cheerful tone. When the "crybaby" has been selected, the communication program No. 02002 is applicable so that the crybaby takes the same reaction with a tearful face and says "Ouch! The side brake is still in operation. Release it, please" in a sadly and entreating tone. When the "placid" agent has been selected, the communication program No. 02003 is applicable. In this case, the agent takes the same reaction and says "May I suggest you releasing the side brake" in a placid tone.

In the foregoing embodiment, the agent's character changes depending upon the current status, the user-related data, the weather condition, time, etc. However, in a more simple manner, the agent's character may be selected from predetermined several characters depending on the driver's familiarity to the agent system. The driver's familiarity to the agent system is calculated in a manner to be described hereinlater. The agent is "placid" to the driver who is much familiar to the agent system, whereas an "obliging" agent appears to the unfamiliar driver. The obliging agent provides suggestion, advice, help, explanation, etc. in a meddlesome manner rather than by the placid agent.

Figure 21:
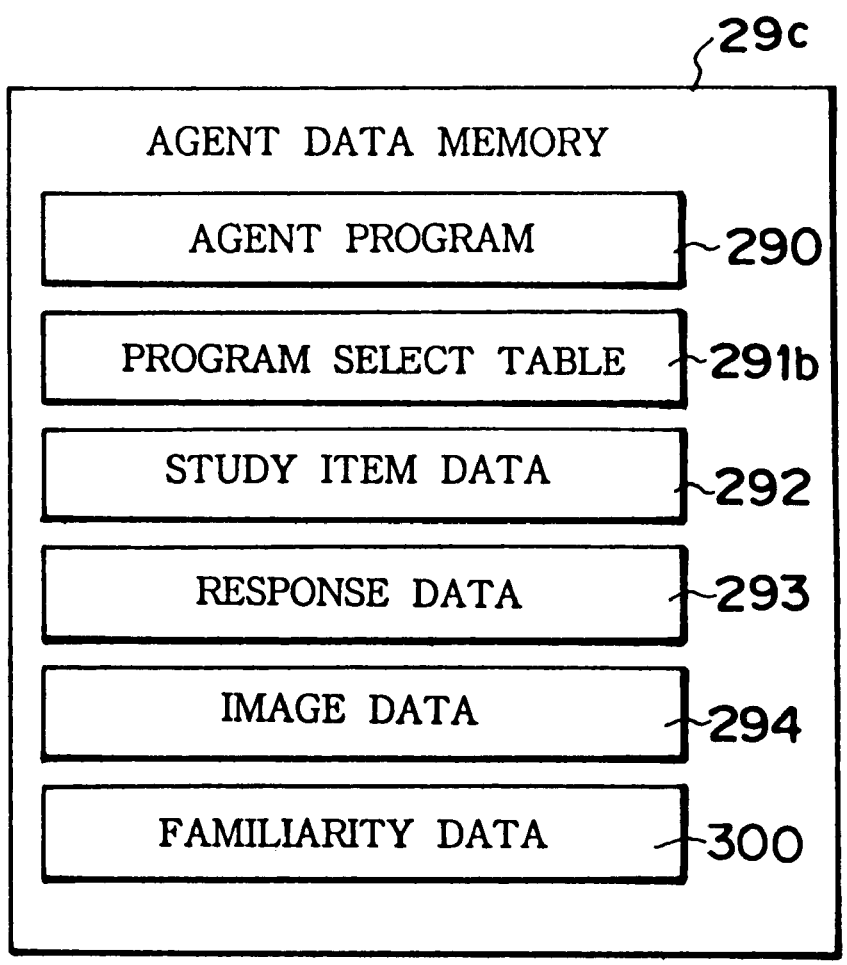
FIG. 21 shows contents of the agent data memory in still another modified embodiment.

In this modified embodiment, agent data memory 29c stores familiarity data 300, as shown in FIG. 21. Agent's character select table 296 and character-determining data 299 in agent data memory 29b are not present. Familiarity data 300 is stored for every driver who may use the agent system, and renewable by the past record study. In this modified embodiment, the agent character is "obliging" or "placid" so that only these two characters are included in the column of "Agent's Character" in program select table 291b (FIG. 20A).

FIG. 22 shows an example of familiarity data 300. As shown, familiarity data 300 describes the program number, the flag, the last five time response period, the average response period, the shortest response period and the number of response cancellation for each communication program. The response period means a period of time from when the agent makes some question until when the driver makes some response thereto, or a period of time when the driver is expected to make some operation until the said operation is actually taken. The response periods for the latest five time responses are recorded in familiarity data 300. The average response period is the average of the five records. The shortest response period is the shortest one of the five records. When the driver cancels his or her response or operation while the selected communication program is still working, it is accumulatively recorded as the number of response cancellation. The flag describes how many times this communication program has been selected. Familiarity data 300 is prepared for every communication program that requests the user's response, for every user of this agent system.

The familiarity level is calculated from these data and also described in familiarity data 300. Of course, the familiarity level is zero when the flag is zero. Each time the communication program is selected, the familiarity level is increased by 1 point. The average response period becomes shorter than a predetermined period, the familiarity level is increased by 2 point. The shortest response period becomes lower than a predetermined period, it is increased by 1.5 point.

On the other hand, when the average response period becomes longer than a predetermined period, the familiarity level is decreased by 2 point. The shortest response period exceeds a predetermined period, it is decreased by 1.5 point. It is decreased by 1 point, when the response cancellation is made by the driver. The respective points to be increased or decreased may be determined as desired.

In this modified embodiment, agent processing unit 11 determines the agent's character by confirming the familiarity level of the selected responsive program and of the current user, at S221 of FIG. 18. By way of example, when the familiarity level in familiarity data 300 (FIG. 22) is below 40, the agent' character is determined as "obliging", whereas it is 70 or more the agent's character is determined as "placid". In accordance with the agent's character thus determined at S221, a specific communication program is selected at S222 followed by the succeeding steps.

At S225, agent processing unit 11 confirms the driver's response to the agent's activity in the running program, which is made through microphone 26 or input device 22. It also confirms the response period from when the agent's activity is outputted through display 27 and speaker 25 until when the driver's response thereto is obtained. From these, agent processing unit 11 rewrite or renew the familiarity data 300. More particularly, in the column of the last five time response period, the oldest record is annulled, the remaining four records are moved to the older boxes one by one and the obtained response period is recorded as the latest one. Then, the average response period and the shortest response period are calculated and recorded. From the renewed records, the familiarity level is calculated by a predetermined formula and the newly obtained familiarity level is recorded in the familiarity data section 300 which should be used in the next determination of the agent's character.

In accordance with still another embodiment of the present invention, a plurality of agents may appear on display 27 and/or outputted through speaker 25 so that the user can easily understand the communication, message, suggestion, etc. from the agents.

Figure 23:
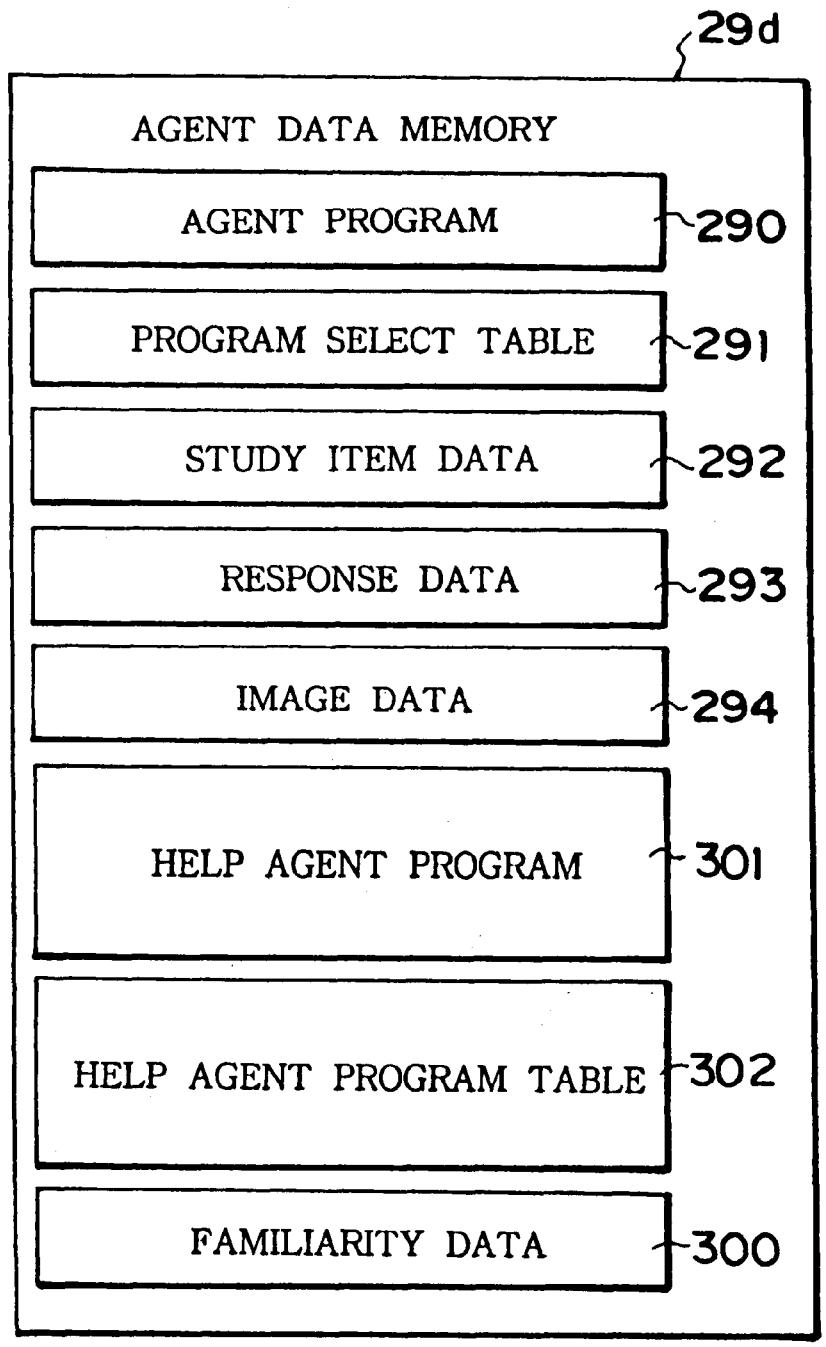
FIG. 23 shows contents of the agent data memory in still another modified embodiment.

In this embodiment, processing unit 1 (FIG. 1) is connected to agent data memory 29d that stores agent program 290, program select table 291, study item data 292, response data 293, image data 294, help-agent program 301, help-agent program table 302 and familiarity data 300, as shown in FIG. 23. Program 290, table 291 and data 292–294 are substantially identical to those stored in agent data memory 29 of the first embodiment of FIG. 1. Familiarity data is substantially identical to that stored in agent data memory 29c of the preceding embodiment of FIG. 21 and an example thereof is shown in FIG. 22. Accordingly, explanation thereof is not repeated herein.

Help-agent program 301 comprises help-agent processing program and help-communication program especially for each responsive communication program stored in agent program section 290. Help-agent processing program is used to carry out help-agent operation which provides explanation or other suitable communication for easier understanding of the main-agent's activity, while some responsive communication program is working. Help-agent communication program describes the help-agent's activities to be represented through display 27 and speaker 25.

Help-agent program 301 stores plural kinds of voice data for each main agent's voice of the main-communication program, one of which may be selected by the driver's operation through input device 22, for example, so that the driver distinguishes the main-agent's and help-agent's voices both outputted through speaker 25. For example, the main-agent is female, the help-agent should be male. In a preferred example, after the main-agent's voice is determined, agent processing unit 1 represents on display 27 a list of voice patterns for the help-agent which is distinguishable from the main-agent's voice, and the driver select one through input device 22. In the absence of the driver's instruction, agent processing unit 1 automatically determines the help-agent's voice that is distinguishable from the main-agent's voice. Likewise, the help-agent's appearance should be well distinguishable from the main-agent's appearance.

Help-agent program table 302 represents correspondence between the (main-) agent program number and the help-agent program number, and the familiarity level that is critical to carry out the help-agent program. An example of the help-agent program table 302 is shown in FIG. 24, and some of the help-agent's activities in the help-agent programs in FIG. 24 are represented in FIG. 25.

For example, when the agent's communication program No. 00123 (that suggests stop of the air-conditioner) is in operation, the help-agent program No. 50010 is applicable provided that the driver's familiarity to this communication program is 50 or lower. In this help-agent program, the help-agent points his or her forefinger at the main agent (Lisa) on display 27 and says "Lisa stops the air-conditioner and opens the front windows half" through speaker 25. Even when the same communication program No. 00123 is working, when the driver's familiarity is higher than 50, the corresponding help-agent program No. 50010 is not operative and no help-agent appears.

Figure 26:
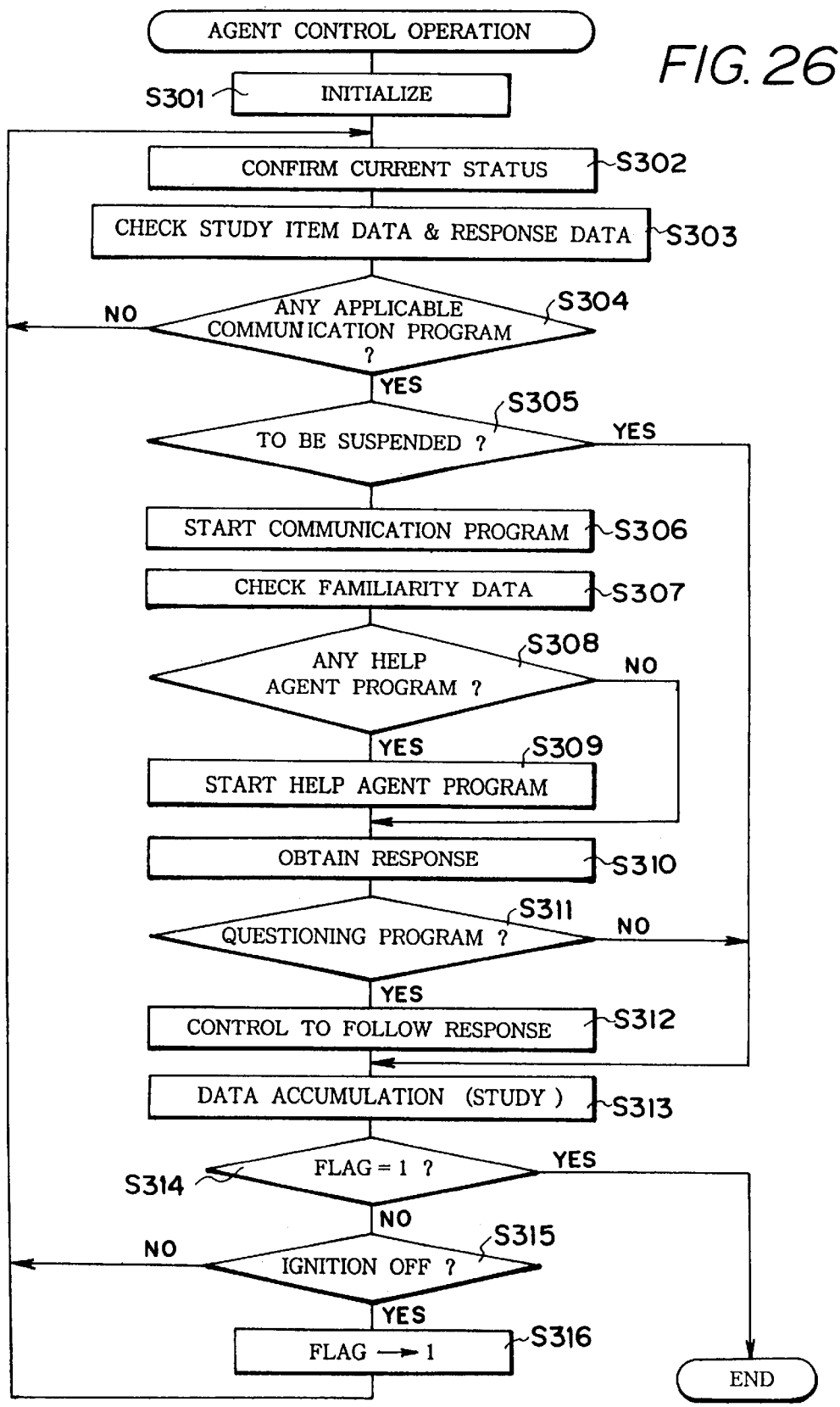
FIG. 26 is a flowchart of the main routine of the agent control operation in accordance with this embodiment.

FIG. 26 is a flowchart of the main routine of the agent control operation in accordance with this embodiment. Steps S301–306 of this routine are substantially identical to S11–16 of the flowchart of FIG. 9, so that description of the latter should be referred to as description of the former.

After initiating the applicable communication program at S306, agent processing unit 11 checks and confirms the familiarity data 300 of the said communication program in agent data memory 29, at step S307. At the same time, the familiarity flag is set to 1. Then, the program number of the selected communication program and the confirmed familiarity data are applied to the help-agent program table 302 (FIG. 24) to discriminate if there is any help-agent program to be initiated, at S308. If not (No at S308), the procedure is advanced to step S310 where the driver's response is obtained. Steps 310–316 are substantially identical to S17–23 of the flowchart of FIG. 9 and, therefore, no detailed description is given herein.

When some help-agent program to be initiated in the table 302 (Yes at S308), this is executed so that the prescribed help-agent's activity (action and utterance such as shown in FIG. 25) is outputted through display 27 and speaker 25, at step S309.

In accordance with this embodiment, the help-agent appears and supports the main-agent's activity when the driver is not so much familiar to the present agent system, whereby the driver can make more smooth communication with the agent and more suitable response to the agent's question or suggestion.

Figure 27B:
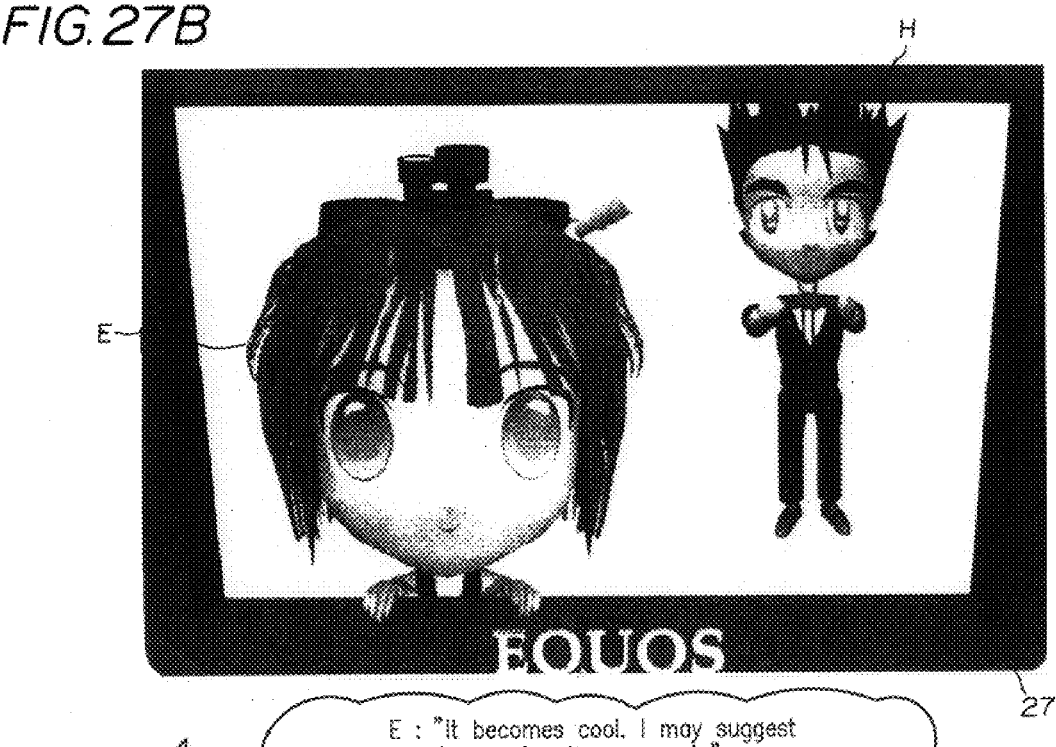

FIGS. 27A–27C illustrate an example of the agent control operation made by the flowchart of FIG. 26. This example is executed when the air-conditioner sensor 418 detects "ON", the room temperature sensor 413 detects the room temperature T1 and the open air temperature sensor 414 detects the open air temperature T2, as the current status obtained at S302. Operation at S303 reveals that the last two response to the communication program No. 00123 are both C indicating the driver's acceptance so that the default temperature values T3=2 and T4=24 have been read out from the study item data 292. Consequently, The relationship of (T1−T2)≦T3 and T2≦T4 are both satisfied, as shown in FIG. 27A.

From these operation at S302 and S303, agent processing unit 11 finally selects the communication program No. 00123 at S304. Then, after confirming that this program is not subjected to suspension at S305, it starts the communication program No. 00123 for representation of the (main-) agent's activity through display 27 and speaker 25, at S306.

Next, agent processing unit 11 confirms the driver's familiarity to the selected communication program at S307 and finds out an applicable help-agent program at S308. Since the driver's familiarity to the communication program No. 00123 is 25 (FIG. 27A) in this example, and the communication program No. 00123 has a corresponding help-agent program No. 50010 in the help-agent program table 302 (FIG. 24), this help-agent program No. 50010 is executed at S309. Accordingly, the help-agent H appears on display 27 in a predetermined appearance and speaks through speaker 25 in a predetermined manner and tone. In this example, the main-agent (Lisa) E says "It becomes cool. I may suggest introducing the open air." and then the help-agent H says "Lisa stops the air-conditioner and opens the front windows half". The help-agent's activity provides support and explanation of the main-agent's activity to the driver. Data necessary to display the help-agent activity is included in the image data 294.

At S310 agent processing unit 11 obtains the driver's response. Since the communication program No. 00123 is a questioning or responsive program (Yes at S311), it controls such that the air-conditioner is stopped and the front windows are opened half in response to the driver's acceptance to the agent's suggestion (FIG. 27B), at S312.

The driver's response is stored in response data 293 for the communication program No. 00123, at S313. Since response data 293 stores the latest two response, the older response data is deleted and the newly obtained response data is stored together with one remaining data. As shown in FIG. 27C, when the driver's response is "neglect", application of this communication program is suspended one time, and the default temperature values T3 and T4 to be next applied are decreased by one, respectively. When the driver shows "refusal", application of this communication program is suspended five times, and the default temperature values T3 and T4 to be next applied are decreased by one, respectively. In case of "acceptance", the same default values remain unchanged in the next application.

Operation at S312 also includes re-calculation of the driver's familiarity to this communication program No. 00123. More particularly, the familiarity data 300 (FIG. 22) is rewritten such that the oldest response period is deleted and the newly obtained response period (i.e., a period of time from when the agent appears on display 27 and until any driver's response is obtained). From the rewritten five response period data, new average response period, new shortest response period and new familiarity level are calculated and recorded in the respective memory areas.

When the driver's familiarity to the communication program No. 00123 is grown to above 50, agent processing unit 11 discriminates there is no applicable help-agent program at S308, because the help-agent program table 302 teaches that the help-agent program No. 50010 corresponds to the communication program No. 00123 but should be executed only when the driver's familiarity is lower than 50. In this case, only the main-agent (Lisa) appears on display 27 while saying the prescribed suggestion to introduction of the open air, in accordance with the communication program No. 00123. Then, agent processing unit 11 obtains the driver's response at S310, make suitable control in conformity to the driver's response at S311 and rewrites the response data 293 and the familiarity data 300, as in the above-described manner.

The above-described embodiment may be modified as follows. In this modification, a plurality of sub-agents may appear depending on the driver's trend. A typical example of the sub-agent is a short-cut agent who appears, when the driver is much familiar to a specific communication program, for short-cut or skip of a part of the agent's lengthy activity of the same communication program.

Figure 28:
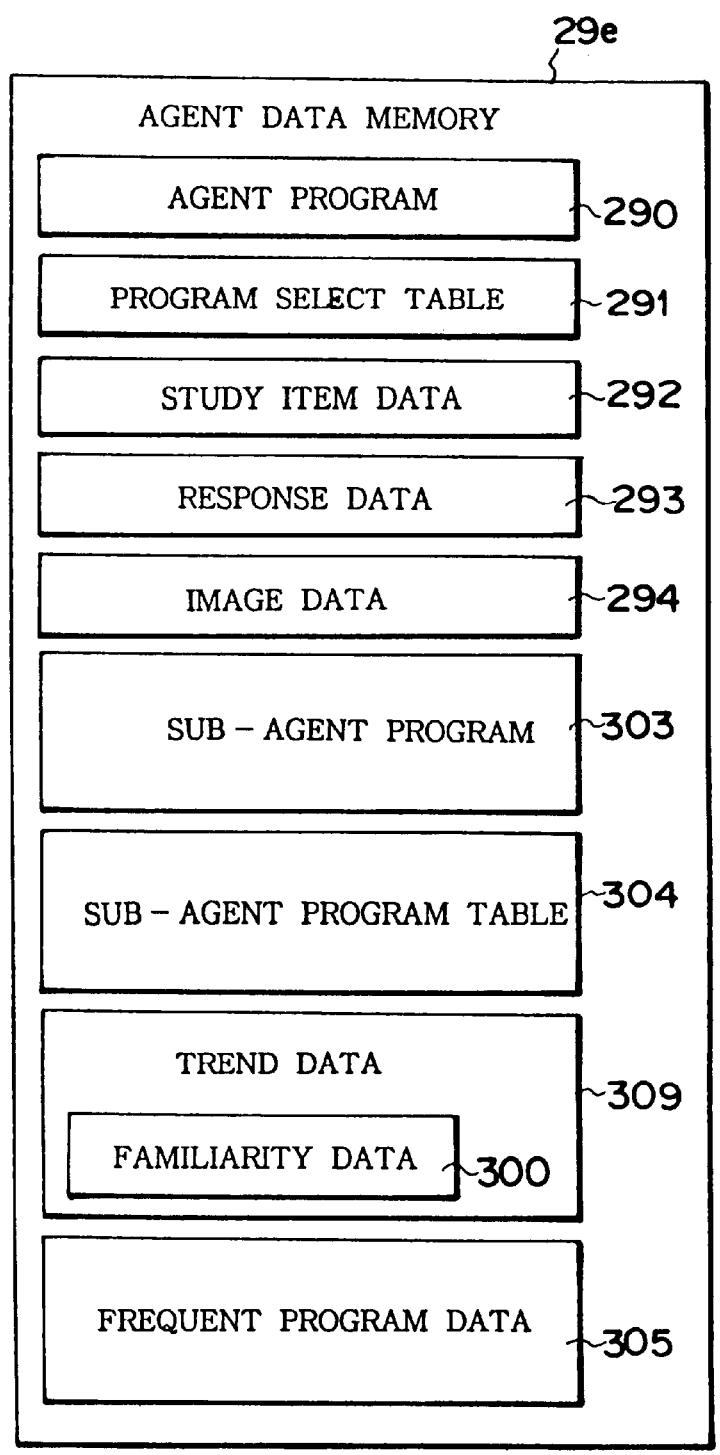
FIG. 28 shows contents of the agent data memory in still another modified embodiment.
Figure 32:
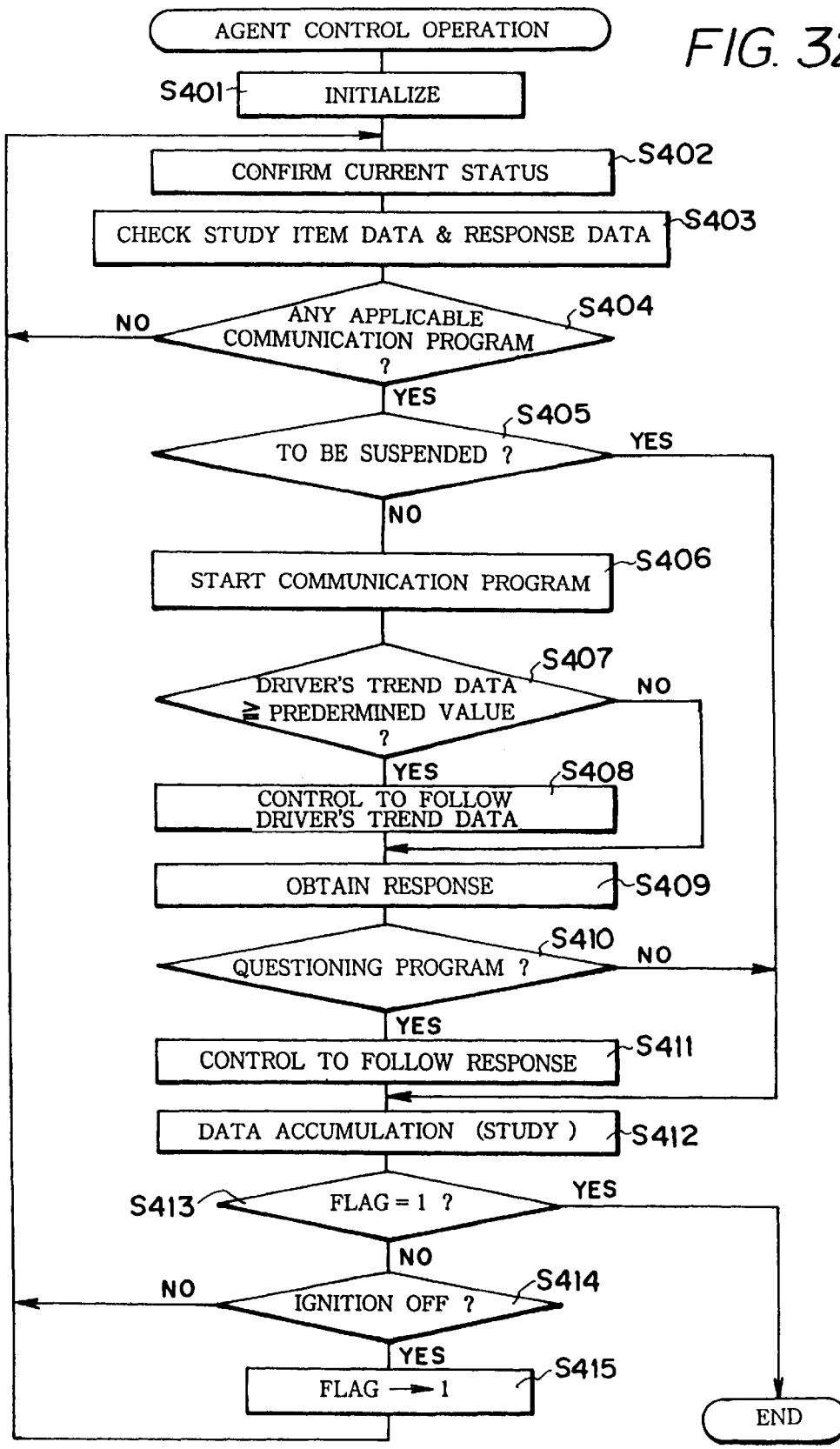
FIG. 32 is a flowchart of the main routine of the agent control operation in accordance with this embodiment.

In this modification, agent data memory 29d of FIG. 23 is replaced with agent data memory 29e of FIG. 28. In agent data memory 29e are stored agent program 290, program select table 291, study item data 292, response data 293, image data 294, sub-agent program 303, sub-agent program table 304, trend data 309 and frequent program data 305, as shown in FIG. 28. Since the former five memory contents have been described in connection with the preceding embodiments, the last two will be described in detail.

Sub-agent program 303 comprises sub-agent processing program and sub-agent communication program especially for each communication program stored in agent program section 290. Sub-agent processing program is used to carry out sub-agent operation wherein a sub-agent appears together with a main agent depending on the driver's trend during operation of some communication program. Sub-agent communication program describes the sub-agent's activities to be represented through display 27 and speaker 25. Sub-agent processing program at least includes a program for achieving the short-cut agent operation that short-cuts or skips the main-agent's lengthy activity when the driver is so familiar thereto.

In another example, a specific trend value is obtained from the driver's birthday and the traffic jam condition so that the today's fortune is noticed to the driver when the vehicle is in a heavy traffic jam.

In still another example, data regarding the driver's favorite professional baseball team and the radio program broadcasting the said team's games are stored as the driver's trend data 309. The sub-agent program is executed at the time when the radio program is to start, so that the sub-agent announces the radio program and the opponent team and ask if the radio receiver should be turned on. The radio program data may be inputted by the driver or automatically received from communication control unit 24.

Another driver's trend data may be determined from the current vehicle position and the places of the driver's interest so that the sub-agent draws the driver's attention to some recorded place near the current vehicle position. Still another driver's trend data may be determined from the driver's driving career and the current vehicle position so that the sub-agent announces "Be careful, you are driving on a winding road", for example.

Most typical example of the sub-agent program will be the short-cut agent program to be described in more detail.

After executing the sub-agent program at S408, agent processing unit acquires the driver's response, at S409. As described before, if the driver's trend data is lower than the predetermined value (No at S407), no sub-agent program is executed and the driver's response is obtained at S409. The following steps S410–S415 are substantially identical to S18–S23 of FIG. 9.

Figure 33:
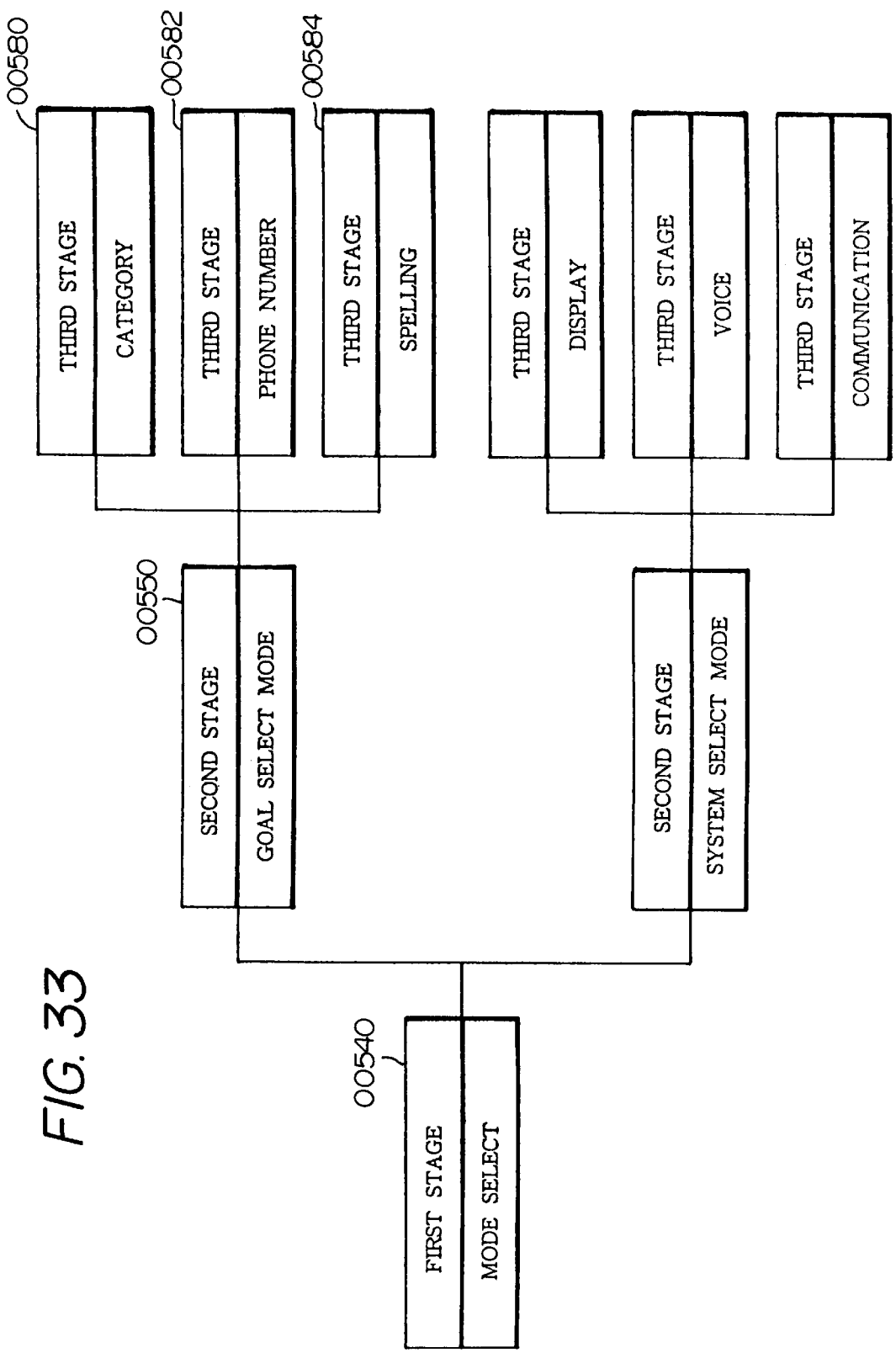
FIG. 33 is an explanatory view showing multi-stage operation of the communication program for menu selection.

The activity in the sub-agent program will now be described in detail. In the following description, the sub-agent is the short-cut agent. As shown in FIG. 33, the communication program for menu selection comprises multi-stage operation. The first-stage operation is mode select operation. The second-stage operation includes goal select mode and system select mode, one of which may be selected by the driver's operation through input device 22 when the first stage operation is working. When the goal select mode is selected, then the driver may select and enter one of third-stage operation, that is, how to select the goal, from its category (highway lamps, railroad stations, hotels, restraints, golf courses, etc.), from its phone number or from its spelling. When the system select mode is selected, then the driver may select one of third-stage operation for setting display, voice or communication in the agent system. In the normal operation, operation begins with at the first stage, proceeds through the second stage and terminates at the third stage.

Figure 34:
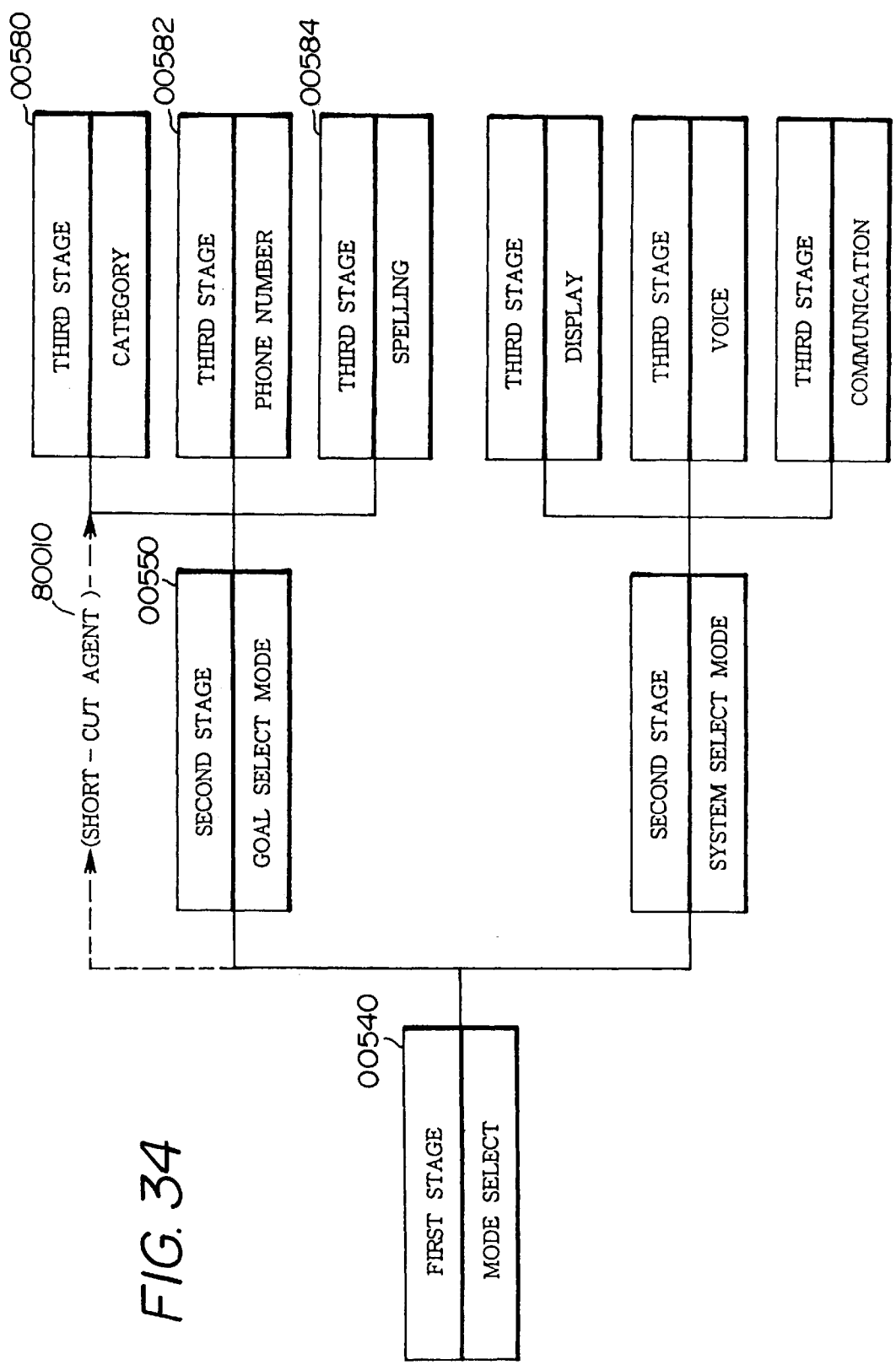
FIG. 34 is an explanatory view showing the short-cut agent activity incorporated into the multi-stage operation of FIG. 33.

FIG. 34 is similar to FIG. 33 but different in that there is a short-cut program shown by dotted lines. In this embodiment, after selecting the first-stage operation for mode selection, the driver may skip over the second-stage operation to select one of the third-stage operation by using the short-cut program. The short-cut program is applicable when the driver is so familiar to the communication program, or when the driver's familiarity to the communication program is 75 or more in this example.

When the driver so operates to start the navigation system, agent processing unit 11 first performs the first-stage operation, that is the mode select operation. The communication program No. 00540 now becomes operative (at S406) so that the main agent appears on display 27 and says "May I soon start navigation program or provide you system select program?". Since this communication program has no corresponding short-cut program (No at S407), it awaits the driver's response at S409. When the driver requests navigation program in reply to the agent's activity of this program No. 00540 through input device 22 or microphone 26, this is confirmed at S409. This program No. 00540 is not subjected to the short-cut control (No at S410), and agent processing unit 11 carries out the following operation at S411–415, then the procedure is returned to S402.

Figure 36:
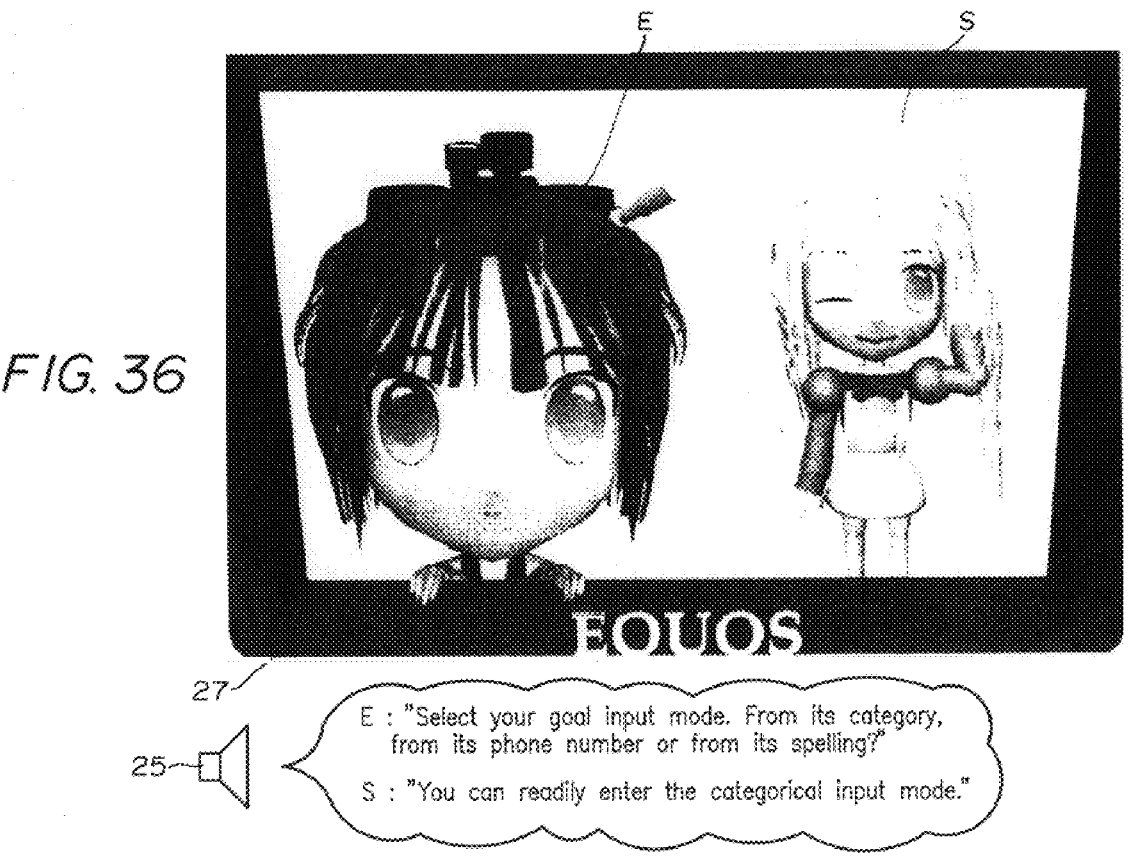
FIG. 36 shows an example of the display when the short-cut agent appears thereon together with the main agent.

The communication program No. 00550 for selecting the goal input mode is now executed at S406. This means that the operation proceeds to the second-stage operation of FIG. 33. In this program No. 00550, the main agent appears on display 27 and says "Select your goal input mode. From its category, from its phone number or from its spelling?", as shown in FIG. 36. Agent processing unit 11 then compares the driver's familiarity (75) with the predetermined critical value (70 in FIG. 29) at S407. Since the former is larger than the latter in this example (Yes at S407), in reference to the short-cut program table 304 in FIG. 29, agent processing unit 11 executes the short-cut operation in accordance with one of the short-cut programs selected in accordance with the frequent program of the last five program selection (at S408).

Figure 35:
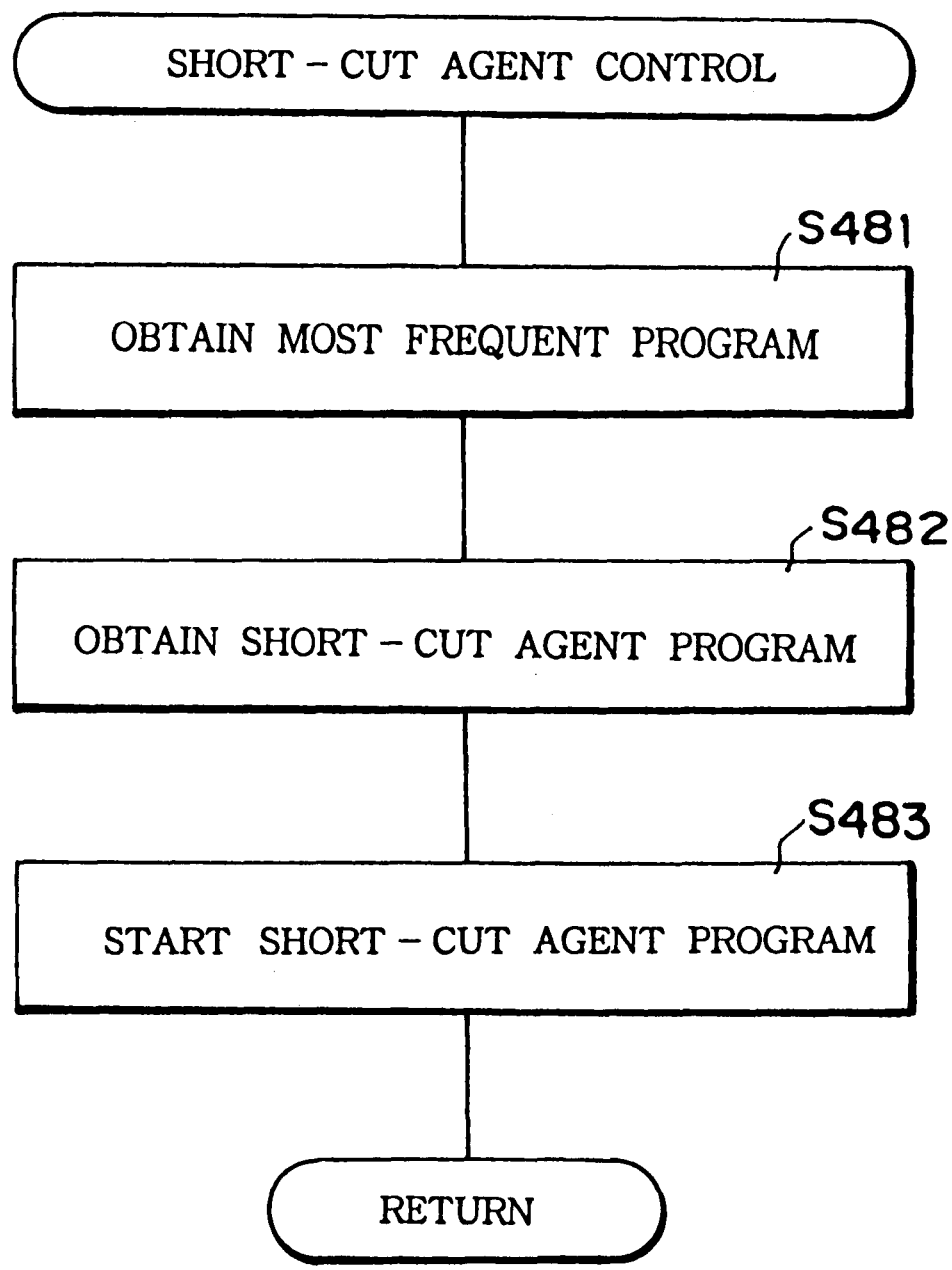
FIG. 35 is a flowchart of the short-cut agent operation that is a sub-routine branched from the main routine of FIG. 15.

FIG. 35 is a flowchart of the short-cut agent control operation at S408. As shown, agent processing unit 11 obtains which is the most frequent program, at S481 from the frequent program data 305 in agent data memory 29. Since the most frequent program is No. 00580 in the example of FIG. 31, which means that the driver normally inputs the goal from its category in response to the agent's activity of the mode select program No. 00540, agent processing unit obtains the short-cut program No. 80010 in reference to FIG. 30, at S482, and then executed the same at S483. By executing the short-cut program No. 80010, the short-cut agent S appears on display 27 beside and behind the main agent E, and says "You can readily enter the categorical input mode." following the main agent's speaking, as shown in FIG. 36. The short-cut agent then awaits the driver's response.

When the driver responsively says "Restraints", this is confirmed by the short-cut agent. In this case, agent processing unit 11 compulsory terminates the main agent communication program No. 00550 without reeving any response from the driver, and execute another communication program No. 00600 (at S404). The communication program No. 00660 is prepared as the fourth-stage operation after selecting the categorical input mode operation 00580 as one of the third-stage operation (FIGS. 33 and 34). Thereafter, the current vehicle position is detected and the restraint map near the detected current vehicle position is shown on display 27 for selective input by the driver.

The driver may say "Category" in response to the main- and sub-agent's activities at S483. In this case, the procedure is advanced to the categorical input mode operation of the program No. 00580 which is executed at S404. The list of selectable categories is represented on display 27 and the main agent says "Select category of the goal". When the driver selects a specific input mode, the operation proceeds in the above-described manner.

Figure 37:
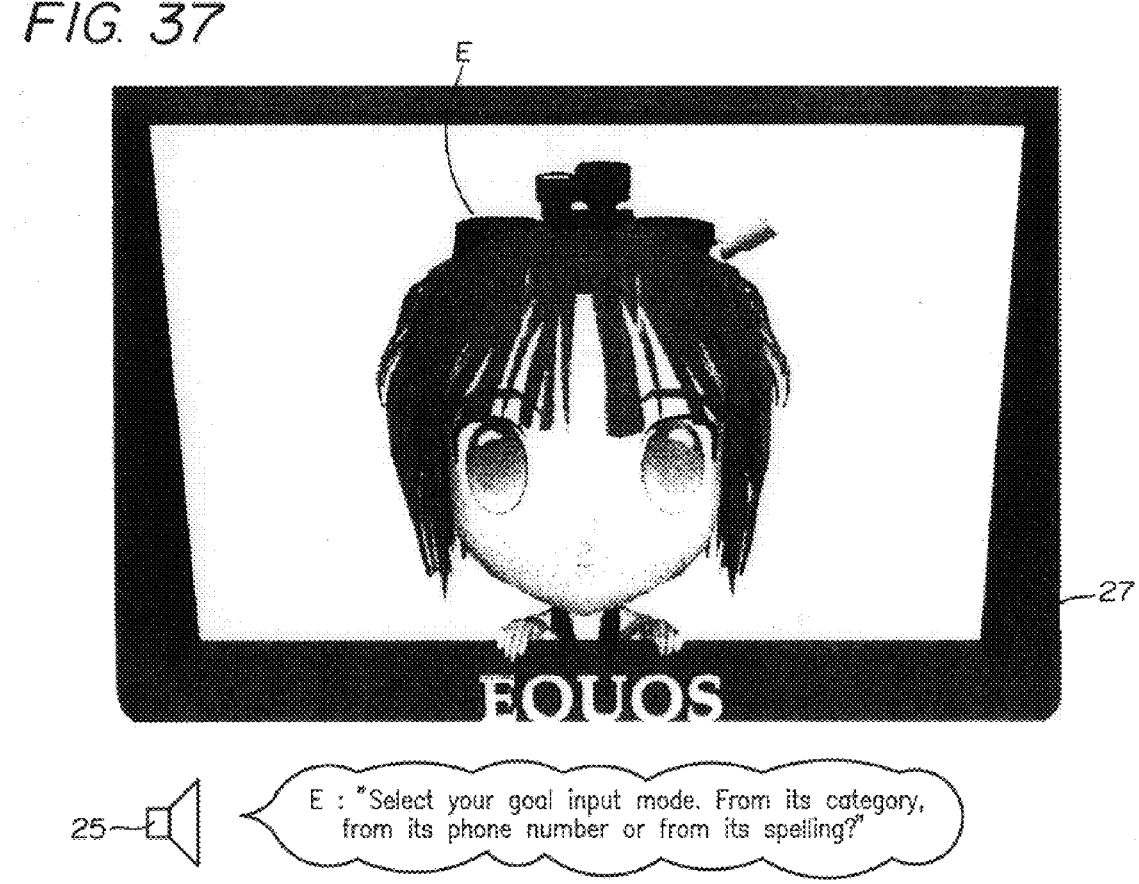
FIG. 37 shows an example of the display when only the main agent appears thereon.

On the other hand, if the agent's familiarity is smaller than 70 (No at S407), agent processing unit 11 does not execute the short-cut program. In this case, only the main agent appears and says in accordance with the main agent communication program that has been determined at S404, as shown in FIG. 37.

In this embodiment, the short-cut agent appears together with the main agent to suggest the short-cut operation to the driver familiar to the agent system. When the driver forgets the short-cut operation, he or she may follow the main agent's activity to successively carry out the multi-stage operation stage by stage.

The sub-agent may act independently of the main agent's activity. For example, the main agent acts as a guide or navigator whereas the sub-agent notices the current vehicle condition to the driver, and the vice verso.

In accordance with yet another embodiment of the present invention, one or more of personified agent appears on display 27 together with a predetermined background so that the user can easily understand the communication, message, suggestion, etc. from the agents. The agent's activity and the background are determined depending on the current status of the vehicle, the driver and passengers, etc. as well as the driver's response.

Figure 38:
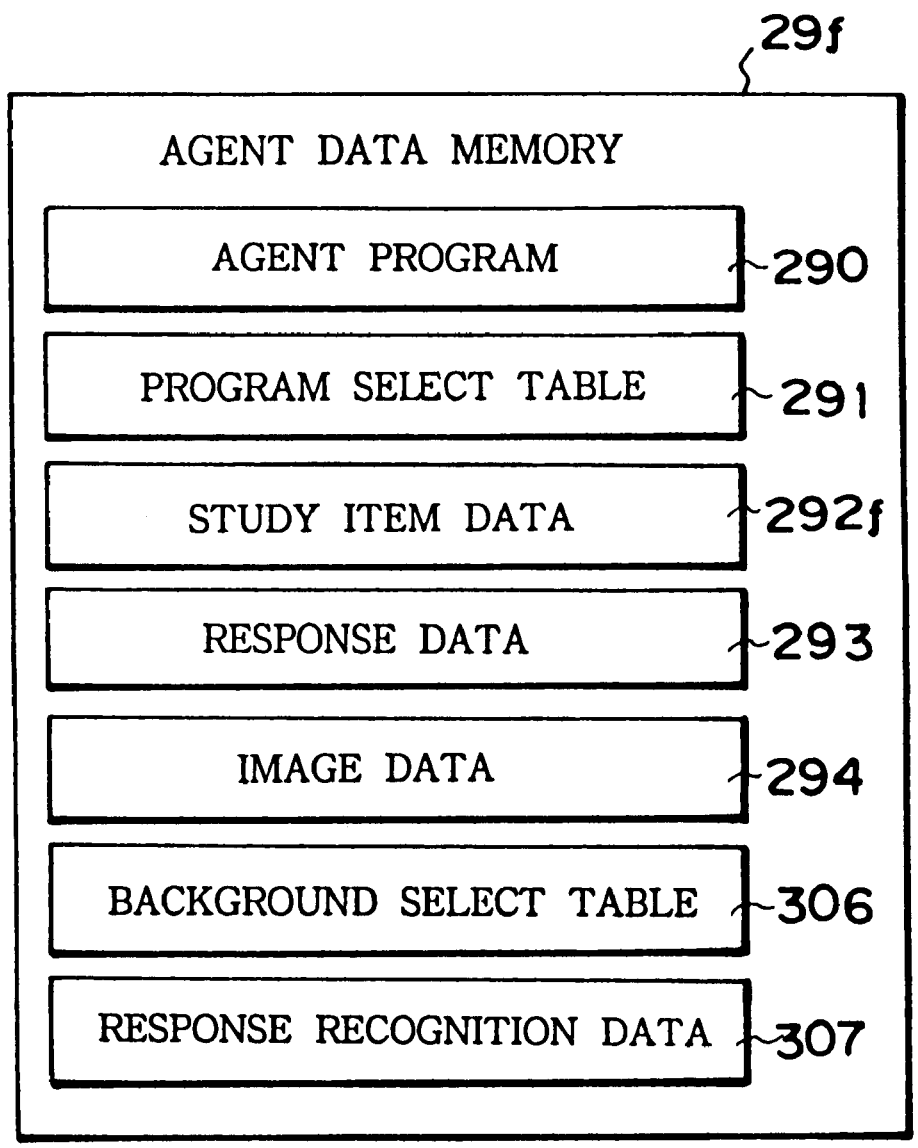
FIG. 38 shows contents of the agent data memory in still another modified embodiment.

In this embodiment, processing unit 1 (FIG. 1) is connected to agent data memory 29f that stores agent program 290, program select table 291, study item data 292f, response data 293, image data 294, background select table 306 and response recognition data 307, as shown in FIG. 38. Program 290, table 291 and data 293–294 are substantially identical to those stored in agent data memory 29 of the first embodiment of FIG. 1. Accordingly, explanation thereof is not repeated herein.

The study item data 292f in agent data memory 29f is shown by example in FIG. 5 which is slightly different from the study item data 292 (FIG. 5) in agent item data 292 (FIG. 1). That is, the study item data 292f also includes audio instruments equipped in the vehicle and their operating condition. Audio instruments may comprise a radio receiver, a CD player, a MD player, a cassette tape player, a TV set, etc. The audio instrument operating condition describes when and where any audio instrument is turned on. If the radio or TV is turned on, the selected channel is also recorded. The audio instrument operating condition have five time records. The remaining items in the study item data 292f have been described in connection with the first embodiment.

In this embodiment, image data 294 include data for representing the background on display 27, as well as data for the agent's appearance and activity. The photo image taken by camera 28 is analyzed by image processing unit 13 to be used to represent the agent's activity or the background. The background image data 294 may be photo, animated or any other image data representing sunrise, sunset, starlight night, snowy mountain, autumnal tints, golf course, plateau, etc. Among these, sunrise, sunset and starlight night backgrounds may represent the current time, snowy mountain and autumnal tints may represent the current season and golf course and plateau background may represent the goal inputted by the driver in the navigation system. The background may also be the agent's belongings, such as nameboards showing the driver's selectable response or answer "YES" and "NO", which is applicable when some questioning communication program is in operation. When the driver is listening to the music through CD or radio, a background like a musical note may be shown on display 27.

Figure 40:
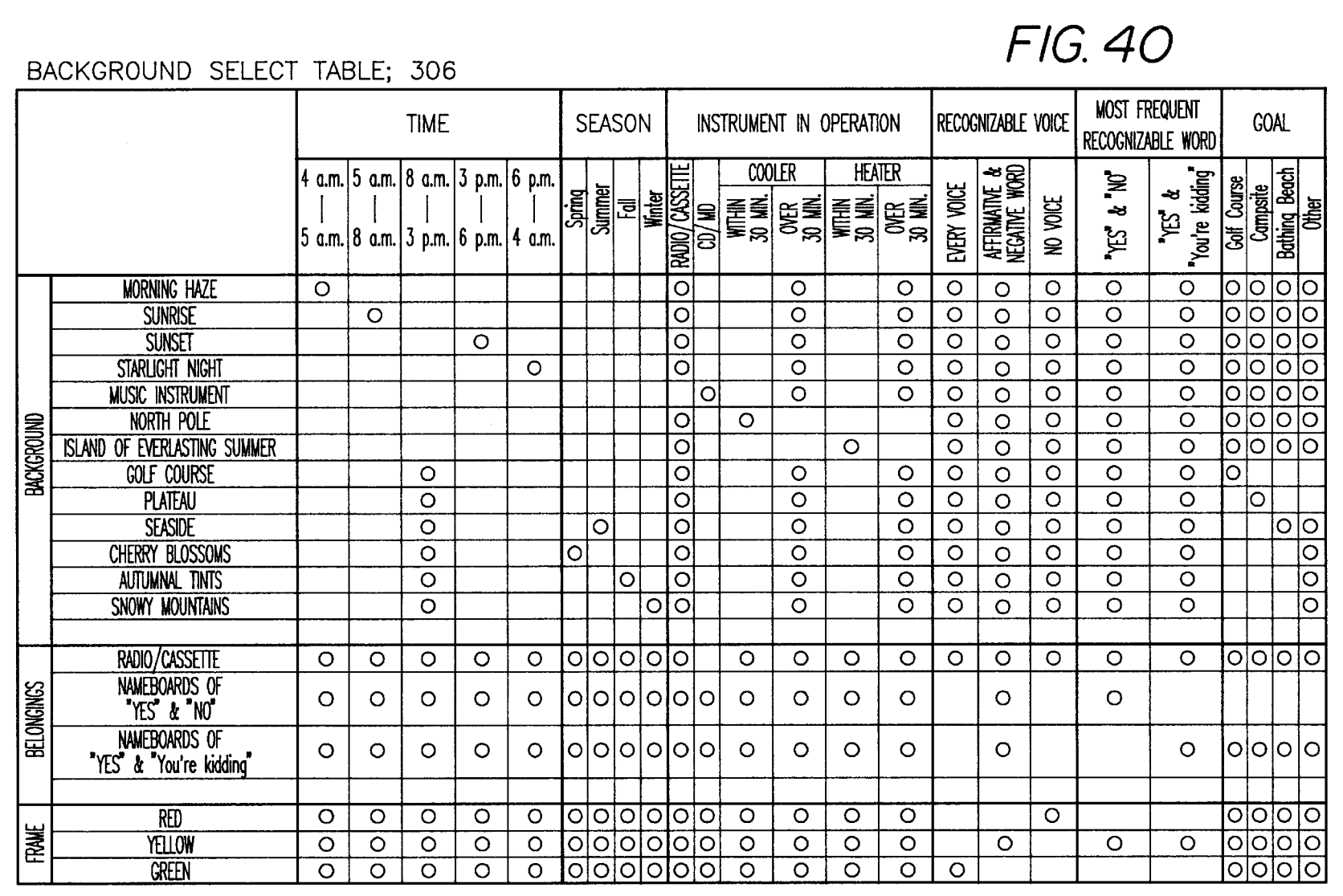

An example of the background select table 306 is shown in FIG. 40. The items on the ordinate are various background, among which one or more of specific background is selected by the items on the abscissa. The items on the abscissa include, in this example, the current time, the current season, the instruments now in operation, the voice recognition status, the most frequent recognized word, the goal, etc. These items may be detected by various sensors included in status sensor 40, alone or in combination with the contents in the study item data 292 and/or response data 293. In this table, the item symbolized by "○" is a necessary condition for selecting the background on the ordinate. The item with no symbol should not be satisfied to select the background on the ordinate.

Figure 41A:
FIGS. 41A–41D show examples of the selected background that is shown on the display together with the prescribed agent's activity.
Figure 41B:
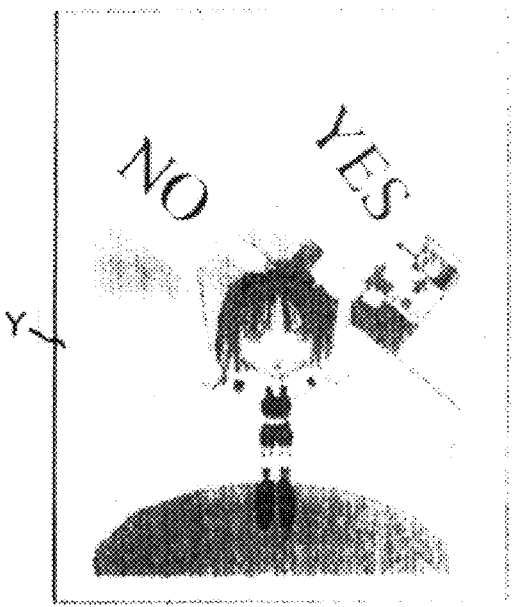
Figure 41C:
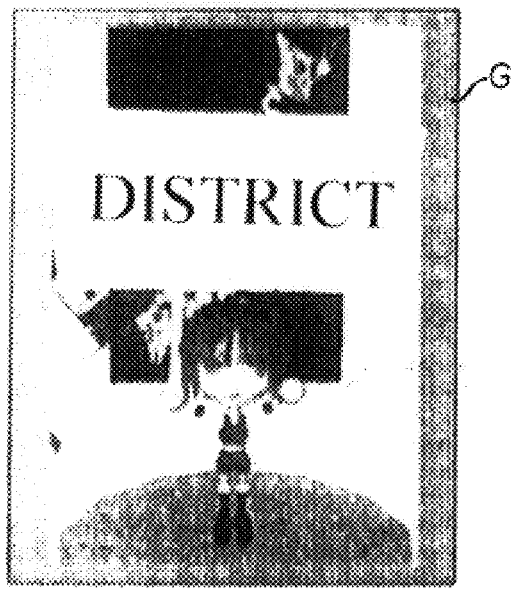
Figure 41D:
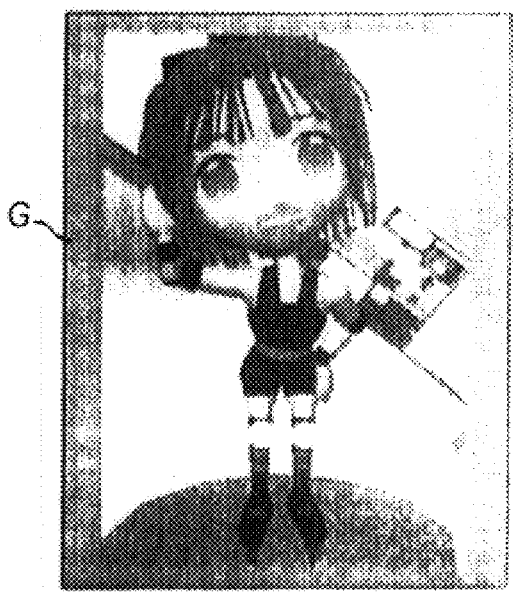

FIGS. 41A–41C show examples of the background to be selected by the background select table 306, which is represented together with the agent's activity on display 27. In FIG. 41A, the background with a red frame (see FIG. 40) is selected when the driver's voice is not recognizable by the agent. The agent in FIG. 41A is sitting down, which represents that the vehicle is now at a standstill. The background is shown in FIG. 41B with a yellow frame (see FIG. 40) which indicates that the agent awaits the driver's answer by saying "YES" or "NO". In this background condition, the driver's voice other than "YES" and "NO" can not be recognized by the agent. The agent in FIG. 41B carries two nameboards of "YES" and "NO" while saying "Please answer by saying "YES" and "NO" to my question", for example. This agent's activity is outputted when some questioning communication program that request the driver's answer. The agent's belongings such as the above nameboards should be a kind of the background, as noted from FIG. 40.

When the communication program for goal input is running and the driver selects to input the goal by its category and then by its distinct, the agent appears on display 27 with a nameboard of "DISTRICT" for urging the driver to input a specific name of the distinct of the goal, as shown in FIG. 41C. The driver's input may be by voice through microphone 26 or by operation of input device 22. At the same time, a pertinent map is shown on display 27, and the frame of display 27 is colored green for indicating that any driver's voice is recognizable. In this example, the "DISTINCT" nameboard, the background map and the green frame are represented as the backgrounds that have been selected by the table 306 (FIG. 40). FIG. 8D merely shows another example of the background with a green frame indicating voice recognizable condition, as above described. The agent is standing upright in FIGS. 41B–41C which indicates that the vehicle is running.

The response recognition data 307 represents a result of the agent' study of the response from the driver. The response recognition data 307 is prepared for each driver and rewritten as the driver makes some fresh response.

An example of the response recognition data 307 is shown in FIG. 42. As shown, the response recognition data 370 includes the response recognition results, distribution of the recognized response patterns and the most recognizable response pattern, respectively for affirmative and negative responses. The affirmative response may be "Yes", "OK", "Well", "Certainly", "Sure", etc. and the negative response may be "No", "You're Kidding", "Not at all", etc. The response recognition results records in respective answer columns "○" or "X" symbols indicating if such driver's answer could be correctly recognized in the agent system, for past 10 times recognition. The driver's answer inputted through microphone 26 is processed by voice processing unit 14, and a signal after voice processing is supplied to agent processing unit 11 for executing some control operation. If the driver's answer has been recognized in error, the driver's should make any surprising response to the executed control operation. From this, it could be judged that the last time voice was recognized in error.

The distribution percentage is determined by dividing the total number of voice acquisition by the number of correct voice recognition, followed by being multiplied by 100. The driver's answer having the greatest distribution percentage is recorded as the most recognizable answer. Thus, two nameboards describing the most recognizable affirmative and negative answers in their response recognition data 307 (FIG. 42) are shown as the background of display 27, in case of FIG. 41B, for example.

The main routine of the agent operation of this embodiment is the same as shown in FIG. 15 and, therefore, description regarding the flowchart of FIG. 15 should be referred to in understanding the agent control operation of this embodiment. In this embodiment, however, the agent control operation that is carried out at S114 of the main routine of FIG. 15 is processed as shown by the flowchart of FIG. 43. In he flowchart of FIG. 43, steps S501–502 are substantially identical to S14–15 of the flowchart of FIG. 9, so that description of the latter should be referred to as description of the former.

After confirming that the applicable communication program should be executed in this operation (No at S502), agent processing unit 11 discriminates if the applicable communication program is an instrument control program, at step S503. The instrument control program means a program to be executed to control operation of the vehicle or any instrument mounted to or equipped in the vehicle. If this is the case (Yes at S503), the said program is executed to carry out necessary operation under control, at S509. The result of the control operation is stored in the study item data 292.

When the applicable communication program is not an instrument control program (No at S503), at step S504, agent processing unit determines a display background, in reference to the background select table 306 (FIG. 40), from the current status (the current time, season, instruments in operation, status of driver's voice recognition, goal inputted in the navigation system, etc.) and the response recognition data 307 in agent data memory 29. The applicable communication is executed by displaying the selected background, together with the prescribed agent's activity, on display 27, at S505. The agent may also talk to the driver through speaker 25 in accordance with the contents of the applicable communication program. Thus, the agent's activity (action and voice) such as shown in FIGS. 41A–41D is shown on display 27 with a suitable background that is pertinent to the agent's activity.

When this communication program is not a questioning or responsive one requiring the driver's any response (No at S506), the procedure is returned to the main routine. When this is the case (Yes at S506), agent processing unit 11 acquires the driver's response or answer through microphone 26 and voice processing unit 14 or through the driver's operation of input device 22, at step S507. The acquired response is incorporated into response data 293 at step S508, then the procedure is returned to the main routine. The data accumulation or the past record study at S508 has been described in connection with the preceding embodiments. In this embodiment, when the driver's response acquired at S508 is any reaction to the agent's activity that is executed in response to the last time driver's affirmative or negative answer in reply to the agent's questioning activity, this reaction is stored in the response recognition data 298 so that the distribution and the most recognizable answer are rewritten when necessary, as having been described.

FIGS. 44A–44C show examples of the agent's activities shown on display 27, with the pertinent background, in the communication program executed at S505. FIG. 44A represents the current status data acquired at S113 of the main routine of FIG. 15 and contents of the study item data 292 and the response data 293 in agent data memory 29. The acquired current status data includes the current time (17:00), the current vehicle position (Tokyo) that is detected by the vehicle position sensor 21. The study item data 292 and the response data 293 storing the past record study represents in this example that the driver has most frequently been listening to the FM radio program "J-WAVE" during 17:00–18:00.

From these data in FIG. 44A, agent processing unit 11 selects a communication program in reference to the program select table 291 at S501. In this case, the communication program No. 00501 in which the agent suggests the driver listening the radio program is selected at S501. This program is not subjected to suspension or skip, which is confirmed at S502. Then, it is confirmed that this program is not an instrument control program at S503. Agent processing unit 11 then determines a background to be displayed together with the agent's activity in the selected communication program No. 00501, at S504. The background selection is made in reference to the table 306 of FIG. 40. For instance, since the current time is between 15:00–18:00, a sunset background is selected. Further, this program No. 00501 involves the agent's speaking, and the driver's voice spoken at the same with the agent's speaking would hardly be recognized. Accordingly, when executing the program involving the agent's speaking, display 27 has a red frame indicating the voice unrecognizable situation now. Thus, a red frame background is also selected at S504.

After one or more background has been selected in this way, the communication program No. 00501 is executed at S505 so that the agent's activity and the selected background are shown on display 27, as shown in FIG. 44B. More particularly, the agent appears on display 27 with a sunset background and says "You may listen to the radio program?". This communication program does not need the driver's response (No at S506) so that the procedure is returned to the main routine of FIG. 15.

In the next application of the main routine of FIG. 15, the driver's answer awaiting condition created by the program No. 00501 is newly confirmed at S113 of FIG. 15 as one of the current status. As a consequence, another communication program is selected at S501 for obtaining the driver's answer in response to the agent' speaking (FIG. 44B). Through S502 (No) and S503 (No), at S504, agent processing unit 11 determines the background to be applied in executing this program, in reference to the background select table 306 (FIG. 40). In this case, the current time is within the period 15–18, the program to be executed requires recognition of the driver's affirmative or negative answer, and the most recognizable answers (in the response recognition data 307 of FIG. 42) are "Yes" and "No". Accordingly, a sunset background, two nameboards of "YES" and "NO" as the agent's belongings and a yellow frame (indicating that only the driver's affirmative and negative answers can be recognized) are selected as backgrounds, which are shown on display 27, together with a silent agent, as shown in FIG. 44C, when this program is actually executed at S505. Since this program is a questioning program (Yes at S506), the driver's answer is obtained at S507. In this example, it is supposed that the driver says "Yes" in response to the agent's activity of FIG. 44C. This response data 293 is renewed accordingly at S508, and the procedure is returned to the main routine of FIG. 15.

In the next application, the fact that the driver made an affirmative answer in response to the agent's activity in the previously executed communication program is confirmed at S113 as one of the current status. As a consequence, still another communication program is selected at S501 for turning the radio receiver on and selecting the radio channel (FIG. 44B). This program should not be suspended (No at S502). Since this is an instrument control program (Yes at S503), the radio receiver is controlled accordingly at S509. In execution of this program, the radio receiver is automatically tuned to the most frequently selected channel in the current area and at the current time in accordance with the study item data 292. Thereafter, data regarding the radio in the study item data 292f (FIG. 39) is rewritten to include data in the latest operation.

Unless the driver makes any reaction to ask interruption of operation of the radio receiver by saying "No" or "Stop", for example, agent processing unit 11 discriminates that the driver's answer ("Yes") has been correctly recognized. Thus, the response recognition data 307 (FIG. 42) should be renewed by incorporating this answer at S508, and the procedure is returned to the main routine of FIG. 15.

In the next application, the operating condition of the radio is confirmed at S113 as one of the current status. Still another communication program may be applied to represent the current vehicle status (the status of the radio, in this case) at S501. Through S502 and S503, one or more pertinent background is selected at S504. In this case, the present time is 17:00, the radio is in operation and any voice is recognizable, so that a sunset background with a green frame (indicating any voice recognizable condition) is shown on display 27 together with a silent agent carrying a radio/cassette, at S505. Since this program is not a questioning program (No at S506), the procedure is soon returned to the main routine of FIG. 15.

In accordance with the above-described embodiment, not only the agent but also the background pertinent to the current status and/or the agent's activity are represented on display 27. This enables more information to be displayed at the same time and more message to be given to the driver. The agent and the background may represent different information or message. The background may represent where and how the vehicle is driving. For example, a tree shown as a background may be bent to the wind (to the left). In anther example, where the vehicle is running on an uphill or downhill, such a road condition may be represented as a background.

In accordance with yet another embodiment of the present invention, even when the same communication program is executed, the agent's appearance and/or activity will be changed depending on the current status of the vehicle, the driver and the passengers, etc. and as a result of the study of the current status and the driver's response, so that the user can make more friendly communication with the agent.

Figure 45:
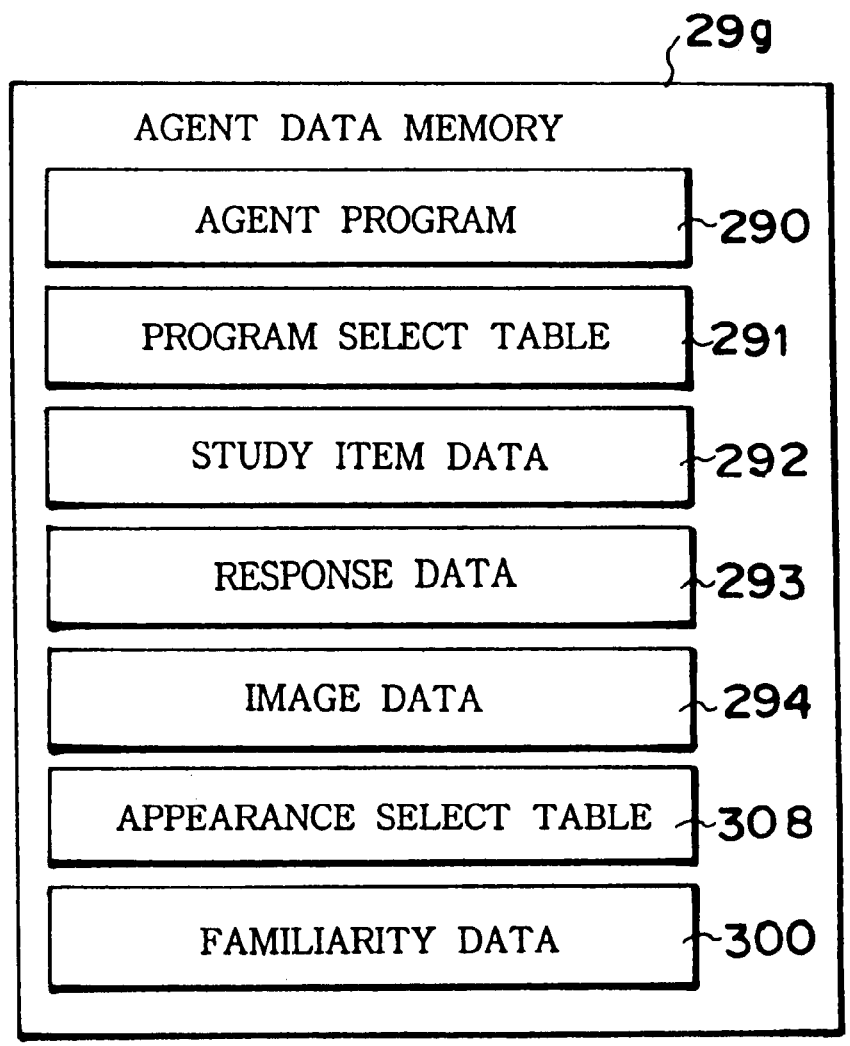
FIG. 45 shows contents of the agent data memory in still another modified embodiment.

In this embodiment, processing unit 1 (FIG. 1) is connected to agent data memory 29g that stores agent program 290, program select table 291, study item data 292f, response data 293, image data 294, appearance select table 308 and familiarity data 300, as shown in FIG. 45. Program 290, table 291 and data 292–294 are substantially identical to those stored in agent data memory 29 of the first embodiment of FIG. 1. Accordingly, explanation thereof is not repeated herein. The familiarity data 300 has also been described in detail in reference to FIG. 22. The image data 294 in this embodiment stores a great number of appearance such as looks, features, wears, belongings, situation, posture, altitude, etc. to be applied to the agent appearing on display 27. When the driver selects his or her favorite character through input device 22 or any other input means, the selected agent appears on display 27 with appearance selected in reference to the appearance select table 308.

FIG. 46 is an example of the appearance select table 308. When the vehicle current status such as described in the left-hand columns of the table 308 is detected by a corresponding sensor of the current status sensor 40 (FIG. 1), a specific appearance of the agent at the neighborhood center column should be selected. The agent's appearance may also be determined by the past record study stored in the study item data 292 and/or the response data 293, in which case such data contents should be described in the left-hand columns. Each appearance selectable in the table 308 has the order of priority. When a plurality of appearances are applicable which can not be executed at the same time, one of them having the earlier order of priority is selected. For example, when the wiper is working on Christmas Eve, appearances of "wearing a raincoat", "wearing a sweater" and "dressed as Santa Claus" are applicable as the agent' wear, in which case the appearance of "wearing a raincoat" is selected according to priority so that the agent wearing a raincoat appears on display 27. If the wiper is turned off, the appearance of the next priority is selected so that the agent appears under the disguise of Santa Clause.

The contents of the appearance select table 308 shown in FIG. 46 is only example and of course not limitative. For example, it may be possible that the type of the vehicle is detected when the ignition switch is turned on, and the agent wears a formal suit when the vehicle is a high-grade sedan whereas the agent wears a T-shirt when the vehicle is a RV (recreation vehicle) or SUV (sport utility vehicle). In another example, the agent's height changes with the fuel remainder. The agent may jump up when VSC or ABS becomes operative. The agent may be inclined while excessive acceleration, deceleration or lateral gravity is applied to the vehicle. The agent may appear with a card indicating television or radio channels when the driver turns the television or radio on. The agent may become tall or fat as the driver becomes more familiar to the navigation system. The agent's wear or other appearance may be changed depending on the goal. The agent may perspire when the room temperature is higher than the open air temperature by a predetermined difference. The agent' shoes may be changed depending on the road condition, more particularly the agent wears a pair of mountaineering or trekking boots while the vehicle is running on an unpaved road. The environmental data at the left-hand column may include the traffic jam, rainfall, snowfall, sunshine, the number of passengers, etc. The user's data may include the driver's occupation. For example, the agent wears a while overall when the driver is a doctor. The user's data may also include the driver's or passenger's birthday, payday, blood type, annual income, family members, nationality, native language, religion, favorite music, favorite sport, etc. Data regarding date and time may include anniversary, holidays, lunch time, coffee brake time, dinner time, etc. which is known to the driver by a pertinent agent's appearance.

Figure 47:
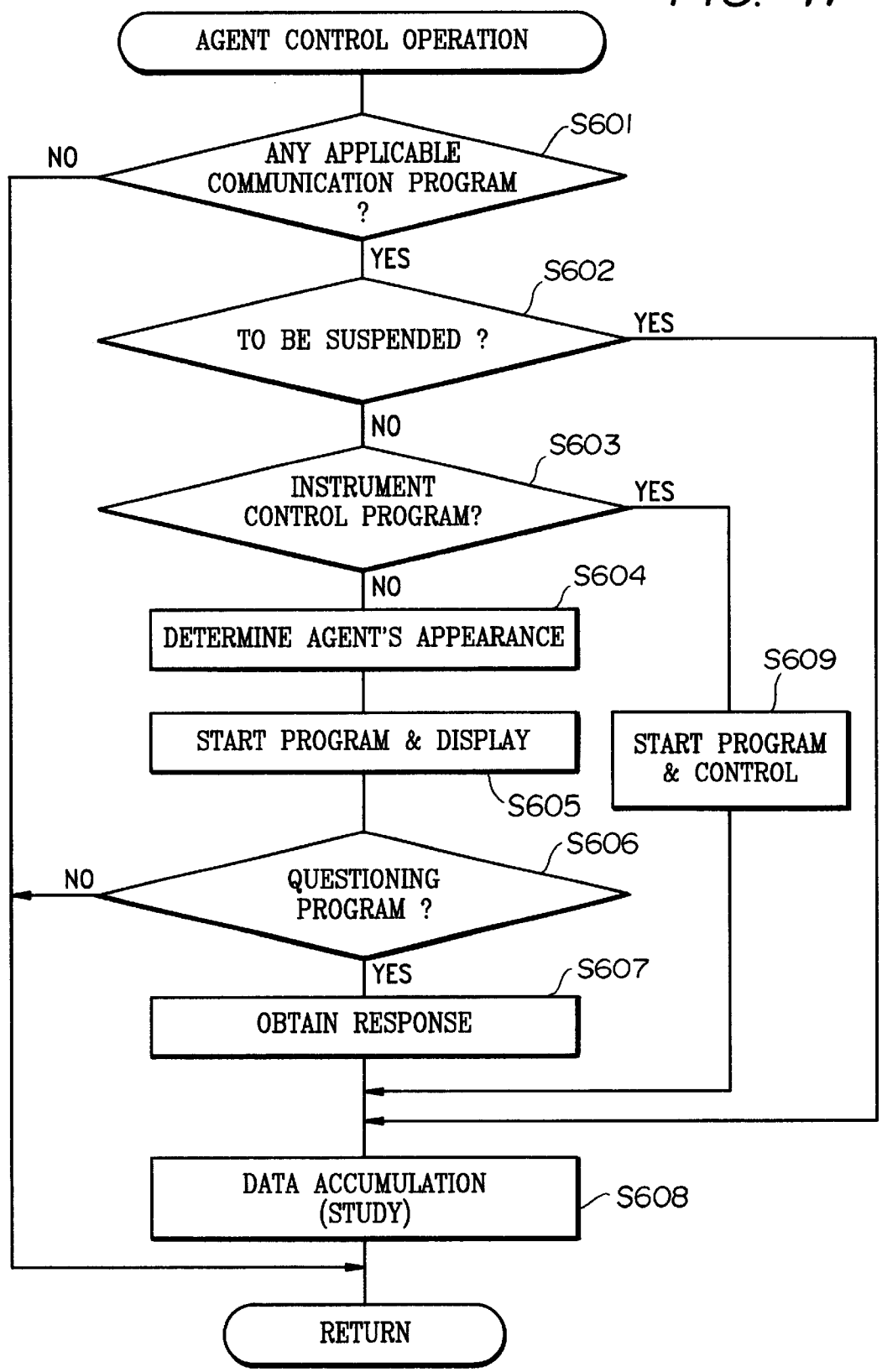
FIG. 47 is a flowchart of the agent control operation to be executed in this embodiment as a sub-routine branched off from the main routine of FIG. 15.

The main routine of the agent operation of this embodiment is the same as shown in FIG. 15 and, therefore, description regarding the flowchart of FIG. 15 should be referred to in understanding the agent control operation of this embodiment. In this embodiment, however, the agent control operation that is carried out at S114 of the main routine of FIG. 15 is processed as shown by the flowchart of FIG. 47. In the flowchart of FIG. 47, steps S601–602 are substantially identical to S14–15 of the flowchart of FIG. 9, so that description of the latter steps should be referred to in understanding the S601–602 of this flowchart.

After confirming that the applicable communication program should be executed in this operation (No at S602), agent processing unit 11 discriminates if the applicable communication program is an instrument control program, at step S603. The instrument control program means a program to be executed to control operation of the vehicle or any instrument mounted to or equipped in the vehicle. If this is the case (Yes at S603), the said program is executed to carry out necessary operation under control, at S609. The result of the control operation is stored in the study item data 292.

When the applicable communication program is not an instrument control program (No at S603), at step S604, agent processing unit determines an agent's appearance, in reference to the appearance select table 308 (FIG. 46), from the current status (vehicle data, navigation data, environmental data, user's data, current date and time, result of driver's voice recognition, driver's familiarity to the agent system etc.). The applicable communication is executed by displaying the agent with the selected appearance, on display 27, at S605. The agent may also talk to the driver through speaker 25 in accordance with the contents of the applicable communication program. Thus, the agent's activity (action and voice) such as shown in FIGS. 48B, 49B and 50 is shown on display 27 with a suitable appearance that is pertinent to the agent's activity or the current status.

When this communication program is not a questioning or responsive one requiring the driver's any response (No at S606), the procedure is returned to the main routine. When this is the case (Yes at S606), agent processing unit 11 acquires the driver's response or answer through microphone 26 and voice processing unit 14 or through the driver's operation of input device 22, at step S607. The acquired response is incorporated into response data 293 at step S608, then the procedure is returned to the main routine. In this embodiment, especially, agent processing unit 11 acquires at S607 the driver's response to the agent's activity in the executing communication program and a time elapse from when the agent' activity is outputted until when the driver's response is confirmed. The data accumulation or the past record study at S608 has been described in connection with the preceding embodiments. In this embodiment, when the executed communication program is a questioning or responsive program that needs the driver's response, the response obtained at 608 is incorporated into the response data 293. When the response data 293 already has full records, the oldest record is deleted and replaced by the newly obtained record. Further, the familiarity data 300 (FIG. 22) is renewed to a new value, as in the manner having been described hereinbefore in connection with the preceding embodiments.

The agent's appearance and activity in this embodiment will be described hereunder in reference to FIGS. 48A–50 by way of example. FIGS. 48A–48C illustrates an example of the agent control operation executed after the ignition switch is turned on. As shown in FIG. 48A, agent processing unit 11 acquires, as the current status, a time elapse T1 from the ignition-on from a detection signal from a timer (one of sensors 40). It has also been confirmed that current vehicle speed is 35 kg/h, the driver's voice is recognizable, the wiper is working, the current season is summer, the current driver's familiarity is 27, etc. Further, agent processing unit 11 make reference to the response data 293 to confirm that the driver showed "acceptance" to the agent's activity in the latest two application of the program No. 00123. The current default value T0 stored in the study item data 292 is 120 minutes. Then, it has also been confirmed that the elapsed time $T1 \geq T0$.

From these data obtained and confirmed, agent processing unit 11 finds the applicable communication program No. 00123 (Yes at S601) and confirms that application of this program should not be suspended at this time (No at S602). It also confirms that this program is not an instrument control program (No at S603).

Then, agent processing unit 11 determines the agent's appearance from the current status of FIG. 48A, at S604. The appearance select table 308 of FIG. 46 teaches that, in these current status, the appearances of "hair falls down naturally", "full face", "wear a swimsuit", and "tall" should be selected. Accordingly, when executing the program No.

00123 at S605, a tall agent wearing a swimsuit (or a sportswear) stands naturally with her full fact, on display 27. At the same time, she talks to the driver "Will you have a rest?" through speaker 25.

Since this program is a questioning program (Yes at 606), the driver's response is obtained at S607, as shown in FIG. 48C. The driver's response "neglect", "refusal" or "acceptance", together with date and time of the response, is stored in the response data 293 of the program No. 00123 at S608. The oldest response data is replaced with the newly acquired response data. When the driver shows "neglect", the default value increased by 10 minutes is applied in the next but one application of this program. In case of "refusal", the default value increased by 20 minutes is applied in the next but five application of this program. In case of "acceptance", the same default value is applied in the next application without suspension. These are the result of the past record study to be incorporated in the response data 293. Then, the procedure is returned to the main routine of FIG. 15.

FIG. 49A illustrates the different current status, in which case the agent's appearance such as shown in FIG. 49B is selected in reference to the table 308 of FIG. 46. In this case, the appearance of "hair falls down naturally", "face in profile", "wear a sweater", and "short" should be selected. Accordingly, when executing the program No. 00123 at S605, a short agent wearing a sweater faces in profile, on display 27, and says "Will you have a rest?" through speaker 25. Operation at other steps will be substantially the same as in the examples of FIGS. 49A–49C.

In the above-described embodiment, a plurality of selectable agent's appearance has respective image data stored in the image data memory section 294. However, it may be possible that one or several image data is prepared for one communication program and changed by image processing unit 13 in accordance with the current status. Change of the agent's appearance may include change or the agent itself. For example, the agent is a rabbit when the vehicle is running at a high speed whereas the agent is a turtle during low-speed drive. When the current status is that the driver's voice is recognizable, the agent may appear on display 27 carrying a nameboard of "PLEASE" or two nameboards of "YES" and "NO" (FIG. 50) for urging the driver to make a suitable response to the agent's activity in the last communication program.

What we claim is:

1. A guidance device for mounting in a vehicle, said guidance device comprising:
   first sensor means for detecting vehicle conditions;
   communication program storage means containing, stored therein, a plurality of different communication programs individually correlated with the vehicle conditions, each of said communication programs synthesizing at least one personified agent and providing communication between the personified agent and a user in the vehicle by at least one of voice and action;
   study data storing means for storing study data indicating the number of times said first sensor means detects the same vehicle condition;
   communication program select means for selecting one of said communication programs stored in said communication program storing means in accordance with said study data stored in said study data storing means;
   agent control means for controlling said at least one of voice and action of said personified agent in accordance with said communication program selected by said communication program selecting means; and
   agent output means for outputting at least one of said agent's voice and action determined by said agent control means.

2. A guidance device according to claim 1 wherein said first sensor means detects at least one vehicle condition selected from the group consisting of a current vehicle position, a current vehicle speed, a current shift position, blinker operation, wiper operation, a coolant temperature, an engine oil temperature, an engine oil pressure, a passenger compartment, an ambient air temperature, ignition switch operation, a brake pedal depressing stroke, an accelerator pedal depressing stroke, hand brake operation, horn operation, belt loosening, a fuel remainder, light or lamp operation, seat belt operation, door opening, window opening, ABS operation, air-conditioner operation, distance to the preceding and succeeding vehicles and decrease in tire, air pressure.

3. a guidance device according to claim 1 wherein user-related data describing a specific user is included in said vehicle conditions detected by said first sensor means.

4. A guidance device according to claim 1 further comprising second sensor means for detecting user's response to the agent's voice and action output by said agent output means, and response storing means for storing user's response data detected by said second sensor means.

5. A guidance device according to claim 4 wherein said study data in said study data storing means is renewed in response to entry of the latest user's response data in said response storing means.

6. A guidance device according to claim 1 wherein said agent output means comprises at least one of display means and speaker means.

7. A guidance device according to claim 1 wherein said agent output means includes speaker means for outputting one of multiple voice patterns of the personified agent, said one voice pattern being selectively determined by said agent control means.

8. A guidance device according to claim 1 wherein said agent output means includes display means for displaying the personified agent as an animated subject in accordance with one of multiple appearance patterns for said animated subject said one appearance pattern being selectively determined by said agent control means.

9. A device according to claim 8 wherein said animated subject is a pictorial representation of a human, animal or robot.

10. A guidance device according to claim 8 wherein said animated subject is a human caricature.

11. A guidance device according to claim 1 further comprising agent's character select means for determining a specific character for said personified agent from among a plurality of different characters, said agent control means determining at least one of the agent's voice and action in consideration of the agent's character determined by said agent's character select means.

12. A guidance device according to claim 1 further comprising familiarity storing means for storing data indicating user's familiarity with agent operation of the guidance device, said agent control means determining at least one of the agent's voice and action in consideration of the agent's familiarity stored in said familiarity storing means.

13. A guidance device according to claim 1 wherein said communication programs synthesize a plurality of different personified agents.

14. A guidance device according to claim 13 further comprising an agent data memory containing user-related information including identification of one of said personified agents as a favorite of the user.

15. A guidance device according to claim 1 further comprising sub-agent storing means for storing sub-agent programs, one of said sub-agent programs being selected in correspondence to a specific communication program stored in said communication program storing means so that a sub-agent of the selected sub-agent program is output by said agent output means together with said personified agent output by execution of said selected communication program.

16. A guidance device according to claim 15 wherein said sub-agent explains the activity of said personified agent.

17. A guidance device according to claim 15 wherein said sub-agent allows short-cut of operation executed by said selected communication program for said personified agent.

18. A guidance device according to claim 15 wherein said one sub-agent program becomes operative when data indicating user's familiarity with operation of the guidance device is greater than a predetermined critical value.

19. A guidance device according to claim 1 wherein said agent output means at least includes display means, a background of said display means being selectively determined so that said personified agent appears on said display means together with the selected background.

20. A guidance device according to claim 1 wherein said communication program store din said communication program storing means include suggestion programs by which said personified agent makes some suggestion to the user.

21. A guidance device for mounting in a vehicle, said guidance device comprising:

first sensor means for detecting vehicle conditions;

communication program storage means containing, stored therein, a plurality of different communication programs individually correlated with the vehicle conditions, each of said communication programs synthesizing at least one personified agent and providing communication from the personified agent to a user in the vehicle by voice and action of the personified agent;

study data storing means for storing study data indicating the number of times said first sensor means detects the same vehicle condition;

communication program select means for selecting one of said communication programs stored in said communication program storing means, in accordance with said study data stored in said study data storing means;

agent control means for controlling voice and action of said personified agent in accordance with said communication program selected by said communication program selecting means; and agent output means for outputting said personified agent's voice and action determined by said agent control means, said output means comprising display means for displaying the personified agent animated to show the action as controlled by said agent output control means and speaker means through which a voice for the personified agent is output as controlled by the agent output control means.

22. A guidance device according to claim 21 wherein said first sensor means detects at least one vehicle condition selected from the group consisting of a current vehicle position, a current vehicle speed, a current shift position, blinker operation, wiper operation, a coolant temperature, an engine oil temperature, an engine oil pressure, a passenger compartment temperature, an ambient air temperature, ignition switch operation, a brake pedal depressing stroke, an accelerator pedal depressing stroke, hand brake operation, horn operation, belt loosening, a fuel remainder, light or lamp operation, seat belt operation, door opening, window opening, ABS operation, air-conditioner operation, distance to the preceding and succeeding vehicles and decrease in tire air pressure.

23. A guidance device according to claim 21 wherein user-related data describing a specific user is included in said vehicle conditions detected by said first sensor means.

24. A guidance device according to claim 21 further comprising second sensor means for detecting user's response to the agent's voice and action output by said agent output means, and response storing means for storing user's response data detected by said second senor means.

25. A guidance device according to claim 21 wherein said study data in said study data storing means is renewed in response to entry of the latest user's response data in said response storing means.

26. A guidance device according to claim 21 further comprising agent's character select means for determining a specific character to be given to said personified agent, said agent control means determining the agent's activity in consideration of the agent's character determined by said agent's character select means.

27. A guidance device according to claim 21 further comprising familiarity storing means for storing data indicating user's familiarity with agent operation of the guidance device, said agent control means determining at least one of the agent's voice and action in consideration of the agent's familiarity stored in said familiarity storing means.

28. A guidance device according to claim 21 wherein said communication programs synthesize a plurality of different personified agents.

29. A guidance device according to claim 21 further comprising sub-agent storing means for storing sub-agent programs, one of said sub-agent programs being selected in correspondence to a specific communication program stored in said communication program storing means so that a sub-agent of the selected sub-agent program is output by said agent output means together with said personified agent output by execution of said selected communication program.

30. A guidance device according to claim 29 wherein said sub-agent explains the activity of said personified agent.

31. A guidance device according to claim 29 wherein said sub-agent allows short-cut of operation executed by said selected communication program for said personified agent.

32. A guidance device according to claim 29 wherein said sub-agent program becomes operative when data indicating user's familiarity with operation of the guidance device is greater than a predetermined critical value.

33. A guidance device according to claim 21 wherein said agent output means at least includes display means, a background of said display means being selectively determined so that said personified agent appears on said display means together with the selected background.

34. A guidance device according to claim 21 wherein said communication program stored in said communication program storing means include suggestion programs by which said personified agent makes some suggestion to the user.

35. A guidance device for mounting in a vehicle, said guidance device comprising:

first sensor means for detecting vehicle conditions;

communication program storage means containing, stored therein, a plurality of different communication programs individually correlated with the vehicle conditions, each of said communication programs synthesizing at least one personified agent and providing communication between the personified agent to a user in the vehicle, including communication from the personified agent to the user by action of the personified agent;

communication program select means for selecting one of said communication programs stored in said communication program storing means, in accordance with at least one of the detected vehicle conditions;

agent control means for controlling the action of said personified agent in accordance with said communication program selected by said communication program selecting means; and display mans for displaying the personified agent animated in accordance with the action under control of said agent control means.

36. A guidance device according to claim 35 wherein said agent output means includes display means for displaying the personified agent as an animated subject matter in accordance with one of multiple appearance patterns for said animated subject said one appearance pattern being selectively determined by said agent control means.

37. A device according to claim 35 wherein said animated subject is a pictorial representation of a human, animal or robot.

38. A guidance device according to claim 35 wherein said communication programs synthesize a plurality of different personified agents.

39. A guidance device according to claim 35 further comprising:

an agent data memory for storing items of user-related information, each item of user-related information being associated with one of a plurality of different drivers;

means for identifying a current driver as one of the plurality of different drivers.

40. A guidance device according to claim 39 wherein said communication programs synthesize a plurality of different personified agents and wherein said user-related information includes identification of one of said personified agents as a favorite of one of said different drivers.

* * * * *